(12) United States Patent
Lewis

(10) Patent No.: US 8,994,925 B2
(45) Date of Patent: Mar. 31, 2015

(54) OPTICAL DISTANCE MEASUREMENT DEVICE

(75) Inventor: Robert Alden Lewis, Bend, OR (US)

(73) Assignee: PulsedLight, Inc., Bend, OR (US)

( * ) Notice: Subject to any disclaimer, the term of this patent is extended or adjusted under 35 U.S.C. 154(b) by 267 days.

(21) Appl. No.: 13/431,625

(22) Filed: Mar. 27, 2012

(65) Prior Publication Data

US 2013/0258312 A1 Oct. 3, 2013

(51) Int. Cl.
*G01C 3/08* (2006.01)
*G01S 7/486* (2006.01)
*G01S 17/10* (2006.01)

(52) U.S. Cl.
CPC .............. *G01S 17/10* (2013.01); *G01S 7/4865* (2013.01)
USPC ............. 356/4.01; 356/3.01; 356/9; 356/625; 342/82; 342/91; 342/118; 342/186; 367/118; 367/138; 367/178

(58) Field of Classification Search
CPC ........ G01C 3/08; G01C 15/002; G01S 17/89; G01S 7/4817; G01S 17/42; G01S 7/487; G01S 17/08; H04N 5/35572
USPC ........ 356/3.01, 4.01, 9, 625; 342/82, 91, 118, 342/186; 367/118, 138, 178
See application file for complete search history.

(56) References Cited

U.S. PATENT DOCUMENTS

| | | | |
|---|---|---|---|
| 4,716,805 A * | 1/1988 | Deutsch | 84/604 |
| 5,757,320 A | 5/1998 | McEwen | |
| 5,966,215 A * | 10/1999 | Markoya et al. | 356/400 |
| 6,111,926 A * | 8/2000 | Imamura et al. | 375/360 |
| 6,307,622 B1 | 10/2001 | Lewis | |
| 6,411,664 B1 | 6/2002 | Usui et al. | |
| 6,950,177 B2 | 9/2005 | Lewis | |
| 7,272,178 B2 * | 9/2007 | Rahman et al. | 375/240 |
| 7,764,222 B2 * | 7/2010 | Tyree et al. | 342/89 |
| 8,125,620 B2 | 2/2012 | Lewis | |
| 2004/0070746 A1 * | 4/2004 | Lewis et al. | 356/5.01 |
| 2004/0190913 A1 * | 9/2004 | Seo et al. | 398/202 |
| 2006/0000967 A1 | 1/2006 | Kuijk et al. | |
| 2006/0157643 A1 | 7/2006 | Bamji et al. | |
| 2007/0025738 A1 * | 2/2007 | Moore | 398/189 |
| 2008/0170782 A1 * | 7/2008 | Ogi | 382/173 |
| 2010/0265491 A1 | 10/2010 | McDonald et al. | |
| 2011/0058153 A1 | 3/2011 | Van Nieuwenhove et al. | |

OTHER PUBLICATIONS

International Search Report and Written Opinion dated Jul. 11, 2013, from International Application No. PCT/US2013/033876, 5 pp.

* cited by examiner

*Primary Examiner* — Luke Ratcliffe
*Assistant Examiner* — Samantha K Abraham
(74) *Attorney, Agent, or Firm* — Klarquist Sparkman, LLP

(57) ABSTRACT

Optical range finders are configured to transmit optical bursts toward a target and detect a corresponding received burst. DC offset in the received burst due to square law detection can be offset based on a difference between high pass and low pass filtered portions of the received burst. Edge records associated with bursts can be obtained, and correlated with a reference signal or waveform to obtain a range estimate.

22 Claims, 43 Drawing Sheets

OPTICAL DISTANCE MEASUREMENT DEVICE

FIELD

The present invention is directed towards time-of-flight distance measurement and proximity sensing.

BACKGROUND

Detection and ranging systems using radio frequency energy, normally referred to as Radar systems, typically emit a modulated burst of radio frequency energy that is reflected off a target back towards an associated radio receiver. The receiver system, through a variety of demodulation and detection techniques, detects the time-of-arrival of the return signal. The difference between the time of emission and reception, often referred to as the time-of-flight or propagation delay, is used to calculate distance. At emission, these systems typically modulate a high frequency RF carrier. At reception, the carrier is mixed with a lower frequency to down-convert or frequency shift the signal to a lower, more convenient intermediate frequency. Once at the lower frequency many techniques are used to demodulate and detect the signal including direct analog-to-digital conversion and digital signal processing.

A key attribute separating RADAR systems from most optical counterparts, often referred to LIDAR systems, is ability of RF systems to coherently demodulate the RF carrier. Coherent detection allows RADAR systems the flexibility to trade the requirement for high peak power, short duration RF pulses most desirable for time-of-flight measurement for low average power, long duration signals amenable for practical implementation. The possibility of using RF transmitters that spread out RF energy bursts in time has led to a wide variety of pulse compression techniques using frequency modulation to first temporally spread the signal at transmission and at reception, time-frequency compresses the returned pulse. One popular method of signal pulse compression modulates the RF carrier with a series of frequencies or phase shifts based on a binary coding sequence. The binary encoding of the RF carrier allows the detection of a bipolar binary sequence at reception which can then be mathematically matched or correlated with a stored reference to estimate delay. The correlation process involves sweeping a signal reference pattern progressively through a signal return to generate an autocorrelation function verses time. The autocorrelation function response forms a spiked central peak with a periodic pattern of slide lobes on either side. Specific binary sequences with desirable autocorrelation properties are well known to obtain the best performance for a specific requirement. A key requirement for the implementation of these correlation sequences is the need to detect the orthogonal states of the transmitted signal in order to allow mathematical cancelation of sidelobes outside the central waveform peak. Without sidelobe cancelation, the resulting correlation forms a comb pattern with stronger correlation function peaks as the central peak is approached.

The relative lack of use of correlation techniques for time-of-flight LIDAR systems results from complexities and limitations from incoherent detection and the prohibitive cost and complexity of receivers incorporating analog-to-digital conversion. In coherent signal detection, information contained in the electromagnetic carrier can be preserved in the detection process. Preserving this carrier information allows both the efficient averaging of the received signal, the proportional increase in signal-to-noise with integration time, along with the ability to preserve the transmitted phase state. The coherent detection of the RF carrier allows the effective transmission of orthogonal carrier states, essentially allowing the transmission of the +1 or −1 states necessary for the effective use in demodulating correlation coded waveforms. Incoherent signal detection associated with typical optical receivers, such as those using a photo conductive diode results in the loss of carrier information due to the square law characteristic of the detector. With only the ability to detect the presence or lack of presence of the return signal based on a detection threshold, measurement of correlation coded waveforms is ineffective. Analog-to-digital conversion of the detector output with supporting digital post processing can be used to remove the unwanted DC component present in the optical detector signal output to allow correlation processing. Unfortunately, analog-to-digital convertors at hundreds of megahertz sample rates are still too expensive and power hungry for use in low cost optical distance systems.

A variety of approaches have been applied to adapt Radar correlation processing to direct detection optical rangefinders. U.S. Pat. No. 6,307,622 to Lewis describes the transmission of a preamble, prior to the transmission of the binary encoding correlation sequence, to allow the establishment of a detection reference level. For a period before pattern transmission, the transmitter emits a half-power output pedestal level to allow the band-pass response low-frequency cut-off of the optical receiver to return to its baseline detection level. The transmitted binary sequence has a 50% average duty cycle to prevent the baseline detection level from drifting during the burst. U.S. Pat. No. 6,411,644 to Takashi et al. describes the use of the scaled output of a signal amplitude detector to establish a detection threshold level for the received correlation sequence.

Analog-to-digital conversion of the received signal with digital post processing can be used to remove the DC offset introduced by the square-law detection of the received signal by envelope detection of the received binary correlation sequence. Once the signal envelope is known, the DC offset can be subtracted from the waveform allowing either zero crossing detection or analog correlation using a stored zero delay reference.

Excessive cost, power consumption, and complex interface requirements are often issues prohibiting the use of monolithic analog-to-digital converters in high-frequency sensor applications. At digitization rates in excess of 100 megasamples per second, A-D converters typically cost several tens of dollars and as digitization rates approach a GHz, costs increase sufficiently to be unsuitable for many applications. Power consumption, often in excess of one watt, can be a significant limitation for battery-powered devices. Finally the interfacing of digital processing circuitry to a high-speed A-D converter dictates the use of large numbers of parallel I/O channels creating the potential for system noise issues and increased hardware complexity.

For high-speed repetitive sampling, various analog sample-and-hold methods have been used. At signal bandwidths of a GHz or more, diode samplers are often used to synchronously sample the analog signal voltage. Effective signal capture times as low as 10's of picoseconds make this method practical for direct signal digitization into the gigahertz. Historically this approach has been used in high-speed sampling oscilloscopes to digitize a waveform by scanning a narrow signal acquisition window over a larger time period. At each time point one or more analog samples are taken and subsequently the analog value is digitized using a lower-speed analog-to-digital converter. A class of low cost samplers exemplified by U.S. Pat. No. 5,757,320 to McEwen has been applied to impulse radar based distance measurement along with a variety of specialized applications.

U.S. Pat. No. 6,950,177 to Lewis et al. teaches a method to achieve high measurement accuracy using a low-cost signal digitization approach using on a single-bit comparator with an adjustable threshold reference. The sampling and processing is suitable for implementation in high performance FPGA's (field-programmable-gate-arrays) allowing a high level of hardware integration at low system cost. The method is based on the storage of a succession of histograms representing the cumulative statistics of the one/zero logical state of the comparator output. After the accumulation of data at a threshold level, the histogram data is combined with previous data. Following each series of acquisitions, the threshold level is increased and the histogram acquisition and accumulation process repeats until the threshold is swept through the entire waveform in a stepwise fashion. The method weights the most accurate data at each comparison level allowing the generation of a composite waveform with good signal fidelity. Since the incoming bit rate is significantly faster than the base clock rate of the system, a period after each signal acquisition window is required to perform a bit summation and signal reconstruction process. The use of a transmit reference waveform is disclosed to maintain measurement accuracy. The receive signal strength is measured and a transmit reference signal is matched using an adjustable optical attenuator so that the reference is roughly equal to the received signal so that both the reference and return signal experience equal propagation delays in the receiver electronics.

U.S. Pat. No. 8,125,620 to Lewis, which is incorporated herein by reference, discloses a signal reconstruction method based on signal detection using single-bit quantization processed to accumulate edge crossing states. The accumulated signal crossing statistics are processed to obtain signal shape by using the difference between rising and falling edges to estimate signal slope. Under strong signal conditions, this approach adds the feature of sweeping of the threshold detection level through the extent of the signal to prevent large signal distortion and clipping. As the slicing threshold level moves close to signal at a given sampling point, random noise produces a difference of rising and falling edge transitions proportional to the slope of the signal in that region. As the threshold matches the signal level at the sampling point, the rate of crossings disproportionately increases, effective weighting of edge data provides optimal signal to noise ratio. The estimated slope can be integrated to recover the signal waveform.

SUMMARY

In some described examples, edge crossing based signal reconstruction method is applied to a correlation processing receiver using binary codes with desirable autocorrelation characteristics and associated processing gain. Such a simplified edge processing approach can eliminate the need to measure return signal strength that is typically required to control the sweep rate of threshold detection reference which moves through the signal envelope.

The present disclosure pertains to methods and apparatus for the application of edge sampling detection to correlation based optical distance measurement. A range finding device emits one or more code sequence modulated optical bursts into one or more transmission channels with a transmitter, and a receive signal produced from the transmitter signal interacting with an object is detected and processed by a receiver. Representative receivers generally include a detector to convert the optical signal into an analog signal, an analog filter to move the envelope of the signal negatively until the positive peak of envelope reaches ground potential, a zero-crossing detector to convert the signal into binary logic states at successive sample points, an edge detector to detect a positive or negative edge transition at a sample points based on the previous and present logic state of the zero-crossing detector, a correlator configured to compare a transmitted code sequence with one or more edge decoded signal records to produce the derivative of a delayed autocorrelation function, and a delay estimator using a zero-crossing point of the correlation function.

A significant improvement provided by some embodiments is the elimination of the need to sweep a threshold through the signal envelope during signal acquisition. The use of a single waveform acquisition was not previously practical at higher signal-to-noise ratios since the threshold level was stepped between signal acquisitions and thus a single acquisition would result in slicing the received signal envelope at single voltage level. Knowledge of the received signal strength was also previously necessary to set up a threshold comparator sweep rate to allow the sampling of the signal envelope over the desired number of signal acquisitions required at a given signal strength and required measurement accuracy. The development of a signal filtering approach that takes advantage of the known characteristic of the transmitted signal pattern to allow a low frequency modulation or sweep of the effective threshold level over the duration of the received signal burst improves the flexibility for the application of the edge based signal processing into a wide range of measurement applications. This approach has an added advantage of being compatible the requirements associated with the use of correlation signal processing.

Analog filtering to move the detection threshold through the envelope of the signal negatively until the positive peak of envelope reaches ground potential is based on the transmission of an optical signal burst with a fifty percent average duty cycle. The outputs of high and low pass filters are differenced at the differential inputs of the signal detector resulting in the movement of the effective threshold crossing level through the signal envelope over the duration of the received signal. The received signal with a fifty percent average duty cycle causes the low-pass filter output to approach half of the signal envelope during the duration of received signal. Correspondingly the high pass filtered signal envelope decays to the middle of the signal waveform by the end of the signal return. The combination of these high and low pass filter responses results in a detection threshold offset that sweeps through the complete extent of the received waveform. This filter response in combination with the use of edge processing to extract signal slope allows the accurate extraction of signal shape over more than a five hundred-to-one dynamic range of the received signal.

Representative receiver circuits are disclosed that address a typical specification of the edge detection processing to maintain the receive detection threshold in the center of the received noise distribution prior to signal reception. An analog switch is used to minimize or reduce the voltage difference between comparator inputs prior to signal reception. Imbalanced resistance loading of the input terminals of the comparator introduces offset voltages due to input bias currents. The average comparator output pulse duty cycle, monitored by the DC offset cancelation control circuitry, indicates the voltage offset between the input nodes. The offset cancelation control varies in response to the measured comparator duty cycle to maintain the desired 50% duty cycle indicating that the voltages at the input terminals are balanced. Under closed loop, steady state conditions, no current flows across the analog switch and when the switch opens during a signal reception cycle, minimal or reduced signal offsets are introduced across the comparator inputs. This approach allows the dc offset to quickly stabilize the detection level into the middle of the receiver noise envelope in a few microseconds, typically to less than one standard deviation of the noise, corresponding to roughly ½ a millivolt offset between the comparator inputs.

The use of short signal bursts at transmission can be provided with an optical transmitter with a high current drive capability and the ability to reproduce consistent, high frequency, burst modulated waveforms. A unique circuit approach relative to laser and LED drivers presently used in commercial and military distance measurement applications can be used. Typically lasers used in longer range applications, such a sporting rangefinders and lower performance military systems, generate short duration single pulses at 10's of watts or more with pulse durations in the range from ten to one hundred nanoseconds. These high peak power system use high power switches such as avalanche transistors, high speed thyristors or power MOSFETs to produce a single pulse wave shape based on the characteristics the pulse forming network. These high power drivers typically have high operating voltages and can be sensitive to temperature. Laser drivers used in shorter range, high accuracy phased based distance measurement systems can produce high duty cycle, high frequency modulated signals at power levels of 10's of milliwatts only. Representative disclosed transmitters achieve a unique hybrid of the performance features of these two classes of optical rangefinder transmitters: high power, wideband, multiple pulse optical burst modulation at low supply voltages using low cost commercial components.

Transmitter subsystems are disclosed which can produce optical waveforms for one or more transmission paths, typically a reference path fed directly into the receiver and an external transmission path to and from a remote target. The driver uses a high-side current limiter rather than a low-side switched current source for lower complexity and improved switching performance. The transmitter produces a modulated current which is converted to light by an optical source such as a light emitting diode (LED) or laser diode. LEDs can operate at variety of wavelengths ranging from ultraviolet to longer wavelengths out into the infrared at 2 µm or more. Laser diodes are typically chosen for low beam divergence and increased power output. A differential driver produces complementary drive signals to alternatingly drive a pair of differential switches, one sinking current through an optical source while the other bypasses current around the optical source and series switch. A voltage controlled current limiter establishes the maximum current delivered to optical source which can be adjusted by a processor. The driver circuit is extended to allow the driving of two optical sources to support transmission through an external path or along the reference path to allow the direct feeding of a zero delay timing reference directly to the receiver input.

An embodiment of an edge-based sampler and edge accumulator is disclosed which stores the difference between edges to reduce memory storage and logic complexity. The approach is based on incrementing or decrementing an edge difference total stored in a dual port or single port memory. The edge difference data can be stored in separate sections in the signal memory allowing the accumulation and storage of multiple signal waveforms prior to processing. Processor data interface allows an internal or external processor to access data stored in the memory at the completion or during the acquisition of signal data.

A representative embodiment is disclosed with an internal reference path to maintain a zero delay reference supporting correlation processing. The correlation of a reference waveform and the received signal slope generated by the summation of multiple edge difference records produces the derivative of a typical autocorrelation waveform. The derivative of the correlation is used to allow the estimation of the zero crossing point of the maximum excursion of correlation wave shape rather than using conventional peak estimation. The maximum peak of the correlation derivative is located and an associated positive to negative zero crossing is used to estimate delay. An interpolation is performed on the positive and negative correlation values to estimate a zero crossing delay. The delay is converted to distance using the speed of light in the medium of the external optical signal path.

Maintaining proper normalization and symmetry of the reference waveform is typically important for measurement accuracy. Non-symmetrical positive and negative signal excursions and drift of the reconstructed reference waveform relative to zero result from accumulating integration errors of the edge difference data reflecting signal slope. The reconstructed waveform may not be symmetrical around ground and there can be positive or negative drifts of the signal envelope due to slight imbalances in the accumulated edge values. This limitation in DC waveform stability of the reproduced reference is resolved by storing the locations of the positive and negative reference datum's within the expected receive waveform. These reference datum's, located approximately in the middle of the positive and negative portions of the waveform, are used to establish an offset error which can be subtracted from the reconstructed reference to eliminate DC offsets. Offset waveform is generated by taking the difference between reference waveform signal values at successive pairs of positive and negative reference points The offset error correction waveform can be least-squares linear fit to the subtracted offset error values or reflect a higher order polynomial approximation.

An autocorrelation waveform exhibits a central peak with periodic side-lobe ripple. The correlation peak corresponds to zero delay between two identical signal patterns in accurate time alignment. As the autocorrelation function shifts to shorter or longer delays, the peak value drops off. Peak detection and processing are used to find the peak inflection point indicating differential delay. The derivative of the correlation waveform produces a sinusoidal signal swinging between positive and negative peaks which occurs at the maximum slope points of the central peak standard autocorrelation waveform. The zero-crossing occurs at the maximum inflection point of the correlation waveform and indicates a point of best match between the waveforms. The zero-crossing can be determined by a simple linear interpolation between the two points or a curve fit using a larger number of points above and below the crossing can improve the accuracy of the crossing estimate.

An incoherent, direct detection receiver cannot decode optical carrier modulation and thus baseband encoding is needed to remove DC content and allow the transmission of two orthogonal states. Concatenation of a three bit convolution code with DC content with a two-state pulse position can eliminate or reduce DC content and to provide phase modulation of these plus or minus one states in the correlation code to allowing proper decoding at reception for acceptable side-lobe cancelation. Optimal binary code sequences, such as Barker codes possessing the minimum peak side lobe ripple for a given code length are used as an example binary pattern.

The filter network used prior to threshold detection moves up through the waveform over the duration of the burst resulting in the capture of different portions of the signal envelope. Under large signal conditions, slope information is only valid near the effective threshold detection level resulting in degraded signal fidelity. To compensate for this problem, the base signal pattern can be repeated multiple times during a burst to allow capture of the entire signal envelope. The 6-bit concatenated binary sequence is repeated to allow improved waveform reproduction using a self-sweeping threshold. A circular memory with a length matched to the length of the repeated binary code segment can be used for data storage. Data stored in the circular memory folds back to the back to the beginning of the block as signal segment as the signal experiences increased propagation delay.

Correlation calculations are computationally intensive and for long range operation this overhead can significantly reduce the measurement update rates. Implementation of the signal correlation function embedded within an application specific digital signal processor or field programmable gate array FPGA used for signal acquisition and storage can significantly reduce required correlation processing times.

An implementation of a correlation module is disclosed for implementation in a field-programmable gate array or application specific IC. A correlation engine performs multiplication and accumulation of data stored in the edge accumulation memory using a reference waveform stored in a reference memory. The data stored in the reference memory represents a template or shape signature of the transmitted signal and is assumed to have zero propagation delay. The reference waveform may be based on the integral of signal slope data acquired from the difference of accumulated edges or it may be based on stored comparator logic levels from the reception of a large amplitude reference signal. An accumulation of edge differences from multiple signal acquisitions is stored in sequential elements of a signal memory. The correlation process involves the multiplication and accumulation of this reference transmit pattern stored within the reference memory by a corresponding windowed portion of signal slope data stored in a signal memory. As the correlation proceeds, the base of the windowed section of the signal memory moves up one memory location per cycle until the desired number of correlation data points are reached or when the last element of the signal memory is reached. Correlation data is then stored in a dedicated memory within the correlation engine for future processing using an imbedded processor core or accessed externally through a processor data interface.

A correlation processor with parallel processing cores is disclosed offering the advantage of the processing of multiple correlation data points in parallel. This can decrease the correlation processing time or offer the option to reduce the required clock rate necessary to support a given measurement rate. For parallel processor implementations, the reference and signal memories are organized with a wider word size to allow the storing of two successive reference waveform elements at a specific address. The storing of packed data can be implemented using dual-port memories with a write word size half the read size or the data can combined into a larger word size using a data multiplexer and a pair of signal or reference storage latches to create a larger word size. Operation is similar to the previous single channel example, with the contents of the reference memory and a block of data within the signal memory read sequentially, multiplied, and accumulated until the terminal count of the reference memory is reached. Accommodations are necessary to maintain the proper alignment between the reference and signal memory datasets when the signal memory has an odd numbered base address due to the loss of alignment between associated elements of the reference and signal memories. Signal selection multiplexers in reference data path reverse element order passed to the multipliers. A signal path multiplexer takes a one cycle delayed value of the signal memory except for the first cycle where has stored the data value from the previous base memory address.

A correlation processor is disclosed using four multipliers and two associated adders to process product terms associated with two correlation data points. Implementation of more than two parallel processing cores requires a change in the processing architecture to avoid a significant increase in complexity needed to add data pipelining and multiplexers to swap elements within the addressed signal and reference words to maintain proper alignment of associated product terms. Two words are packed into each memory address for both the reference and signal memories as in the two-channel embodiment. Four product terms associated with the addressed memory locations are calculated resulting in the simultaneous calculation of two successive correlation data points. Each multiplier cell take the product of a reference data value and a signal data value associated with the partial product terms for two pairs of correlation data points. A reference memory counter cycles through the elements in the reference memory and while a corresponding block or window within the signal memory signal memory is accessed. Sequential memory elements are addressed and passed to the multiplier where product terms are accumulated and at the end of a sweep of the reference memory, two data points of correlation data are produced. These data points are latched and ultimately stored in two sequential locations in a correlation memory.

An embodiment consisting of sixteen multiplier cores and four accumulators is disclosed to process four correlation values simultaneously. The four parallel data values from the signal storage memory, packed in the as four signal data elements in each word, are latched and combined to provide seven sequential data values updated by four data values per clock cycle. Four reference data elements from the reference memory pass to the four groups of multiplier arrays, each accumulating a correlation data point. Four partial products associated with each correlation data point are added and accumulated over the duration of a sweep through the reference and a windowed portion of the reference memory. The accumulated result reflecting four successive correlation data points are latched at the completion of the cycle which are ultimately written to the correlation memory through a four input multiplexer.

The logic complexity associated with parallel implementations of correlation processors increase proportionally with the number of multiplier cores, rapidly increasing the cost of implementation using an application specific IC or field programmable gate array. The primary driver of the correlation processor cost and complexity is the need for multiplier cells to handle the signed 8-bit words resulting from the accumulation of edge data prior to performing the correlation process. The product of the 8 bit signal and reference words result in 16 bit multiplicands, which after accumulation of multiple acquisition cycles result in a word lengths of 24 bits or more at each correlation data point. A substantial reduction in the complexity of correlation processor can be achieved by performing the correlation at the completion of each signal acquisition and accumulating the correlation results. The logic complexity performing a multiplication roughly goes up with the square of the word size. A simple 2-bit multiplier required for multiplying a normalized +/−1 value of a reference signal with a positive rising value or negative falling edge value of the external signal results in a roughly thirty-fold reduction in multiplier core complexity. The multiplying the reference and signal on each acquisition reduces the size of signal and reference memories by four times assuming 2 bits are required for each reference and signal value. An additional factor-of-two reduction in signal memory size can result from storing the raw comparator data rather than performing the signal edge determination prior to memory storage.

A reduced complexity embodiment of edge-based sampler incorporating a correlation processor capable of performing a correlation after each signal acquisition cycle is disclosed. In this implementation, the sampled received signal is directly stored to either a single-bit width signal or reference memory. The reference memory may be updated during the beginning of the signal acquisition process and maintained as constants over multiple acquisition periods or updated prior to each signal acquisition. At the completion of each signal acquisition, the signal memory and reference memories are read into the correlation processor to provide data values for the correlation process. Data outputted from the signal memory are translated into edge transition states by edge detect logic while data from the reference memory is mapped from 0 and 1 binary states to plus and minus one valued signed 2-bit data. Within the correlation processor, reference values are multiplied by the signal edge states and accumulated to generate partial product term sums associated with multiple correlation data points. These acquisitions are then added and stored with previous correlation data sets until all the signal acquisitions are complete. Correlation memory output allowing the processor to download the correlation record to determine the delay and range information from the correlation waveform zero crossings.

The single-bit quantization of the reference signal only results in a small decrease in measurement accuracy. The reference signal is introduced into the optical receiver at a relatively high signal levels to minimize edge jitter of the detected binary pattern. The accuracy impact of digitizing a small region moving through the signal dynamic range over the duration of the reference waveform burst is explored. At high signal-to-noise ratios, the rising detection level effectively moves up the rising and falling edges of the signal waveform introducing added edge delay throughout the burst relative to the acquired signal pattern, which at low signal-to-noise ratios, reflects slope information contained over the entire rising or falling edge. This time delay variation has relatively small impact on accuracy because the effective time delay decreases and increases in roughly equal proportion relative to the center of the signal burst. The net time delay change in the resulting correlation is minimized. When the received signal is large, both the reference and signal exhibit similar large signal delay effects, and as such, exhibit negligible overall delay changes.

A modified reference decoding process to introduce sloped edge transitions is disclosed to reduce high-frequency reference signal content prior to correlation. An inadvertent effect of the single-bit encoding of the reference is the introduction of high frequency component into the correlation waveform, increasing the noise floor and decreasing the probability of identifying the correct correlation peak and its associated zero crossing at low signal-to-noise ratios. Added frequency content can by removed by manipulating the rising and falling edge of the reference signal to soften the edges or this added noise can be filter prior or during the processing of the correlation waveform. The interpolation of data values at the edge transition can be produced using a state-decoder which uses the present and previous reference data values to determine the location for value substitution. In practice, the interpolated waveform is amplitude scaled to pulse or minus two so the interpolated values can be scaled to pulse or minus one.

State reduction techniques can be used to reduce the complexity of the multiplier arrays by combining multiplier output states with the functionality associated with edge extraction the pre-processing of reference data. State reductions can be of great benefit due to a reduced number of binary output states based on the characteristics of the reference and external signals. The use of edges transitions rather than logic levels offers an inherent data compression due to a lower rate of average signal crossings relative to the logic state transitions.

A reduced complexity correlation processor is disclosed using reduced state decoders to process signal edge status, reference waveform transition softening and partial product multipliers. Reference memory data points are split into two groups of four data points and feeding two reference decoders. Each reference decoder processes two reference data points, but require a data point before and after to properly decode the waveform state. The reference decoder compresses these four consecutive reference data points into 3-bits or 8 unique output states. The reference decoders feed two associated partial multiplier product decoders. The partial product decoders have 3-bit outputs and 6-bit inputs produced formed from the combination of a three-bit reference decoder outputs and three-bits of the signal memory data. Consecutive data states of the signal memory are split into two groups to feeding two edge state and partial product multiplier decoders. Each decoder generates the sum of two partial products that are summed together by an addition cell.

The derivation of the reference decoder input and output states are based on the analysis of the binary reference signal input with intermediated edge softening data points added to produce sloped edge transitions reflecting the desired output after decoding. A four bit input, consisting of two central reference data samples are combined with a previous and the following reference states, provide sixteen possible input states for the decoder. Three bit output binary states are assigned to the input states based on desired behavior.

The derivation of the edge state and partial product multiplier decoder output states are based on the output states associated the 3-bit reference decoder multiplied by the possible edge states reflected in the three bit segment of the signal input. The decoder input is formed by combining into a single 6-bit value, the 3-bit edge state value and the 3-bit reference decoder output state.

A method for the identification of the correlation peak can limit the likelihood of detecting low received signal-to-noise ratio signals. Side-lobe spurious peaks are often sufficiently large to obscure the location of the central autocorrelation peak or its derivative. A bipolar filter function is introduced to implement a matched filter for the sinusoidal wave shape typically observed in the derivative of the central autocorrelation peak. The filter function wave shape is passed through the length of the signal detection widow and for each position the products of matching elements in the correlation waveform and filter wave shape are the accumulated. The maximum value of this matched filter response is used to identify the correct delay peak.

A process flow and hardware embodiment for identifying the correct correlation peak and finding its associated delay is disclosed. The process of locating to correlation peak is broken into the steps of locating the correlation peak within the extent of the signal delay uncertainty and finding the zero-crossing associated with that peak. In the beginning of the correlation peak processing process, the correlation memory address is initialized and the filter sum and maximum register output are cleared. The bipolar filter function is multiplied and accumulated element-by-element with a corresponding section of correlation memory. The summation value at completion is compared with the previously stored maximum value and if the new value is larger, the present sum is stored as a new maximum. In the vicinity of the peak, the last positive and flowing negative value of the raw correlation are stored. The index associated with the last positive value is stored. If the summation value peak value was not higher than the previous maximum value, the storing of peak values, zeros crossings and index values are skipped. At the completion of value storage or determination that a new peak was not reached, the filter sum is cleared and the correlation memory base address is incremented. If the final memory is reached the filter process is terminated and the peak value, positive and negative crossing values and the crossing index are passed to the next processing step for delay estimation. If final correlation address is not reached, the process returns to multiplication and accumulation of the next filter window within the correlation memory.

Electronic crosstalk between the transmitter and receiver can be the limiting factor to achieving improved processing gain with increasing signal integration time at short ranges. At shorter ranges, electronic noise coupled from the transmitter overlaps with the signal return. Transient electronic noise, coincident with the rising and falling edges of the transmitted optical signal, introduce positive and negative noise transients on the received signal waveform. During correlation this energy generates spurious correlation spikes at short ranges, at typically a few meters or less. System operation at low received signal-to-noise ratios of one tenth to one or less, push the limit of signal isolation techniques with a signal board solution due to the short physical separation between the between the transmitter and receiver elements. The physical separation of the transmitter and receiver to separate modules for improved electronic cross-talk isolation is often the best solution to improved low signal operation.

The separation of the transmitter and receiver is desirable in many applications however separation can result in ground loops and inadvertent coupling noise coupling mechanisms degrading performance over a single board implementation. The primary cause of this problem are ground loops caused by the inadvertent noise coupling to high-speed signals control signal between transmit and receive boards. This problem can be avoided by generating the transmit correlation sequence and control signals at the transmitter board, however this can cause added timing jitter due to synchronization errors between the clocks on the two boards.

A system embodiment is described in which a transmitter with separate control circuitry to produce a reference and signal pattern in succession is only partially synchronized with a receiver store the received signals with the correlation process performed on each acquisition to remove common mode timing error between the modules. A transmitter, operating at or a different frequency from the receiver, is triggered by the receiver to initiate a transmission of a reference burst followed after a fixed delay with the transmission of a signal burst. Upon triggering the transmitter, the receiver initiates the acquisition and storing data in the reference and signal memories within the correlation processor. A control element within the receiver provides a delay between these two storage operations such that the two acquisition windows are delayed the same amount. At the completion of the reference and signal acquisitions, correlation processing is initiated with accumulation with previous acquisitions and storage in the correlation memory. The transmitter and receiver effectively operate independently with separate clocks and control circuitry. Isolated functionality allows the transmitter and receiver to be packaged in separate modules if desired with only a trigger signal between the elements.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Figure 1:
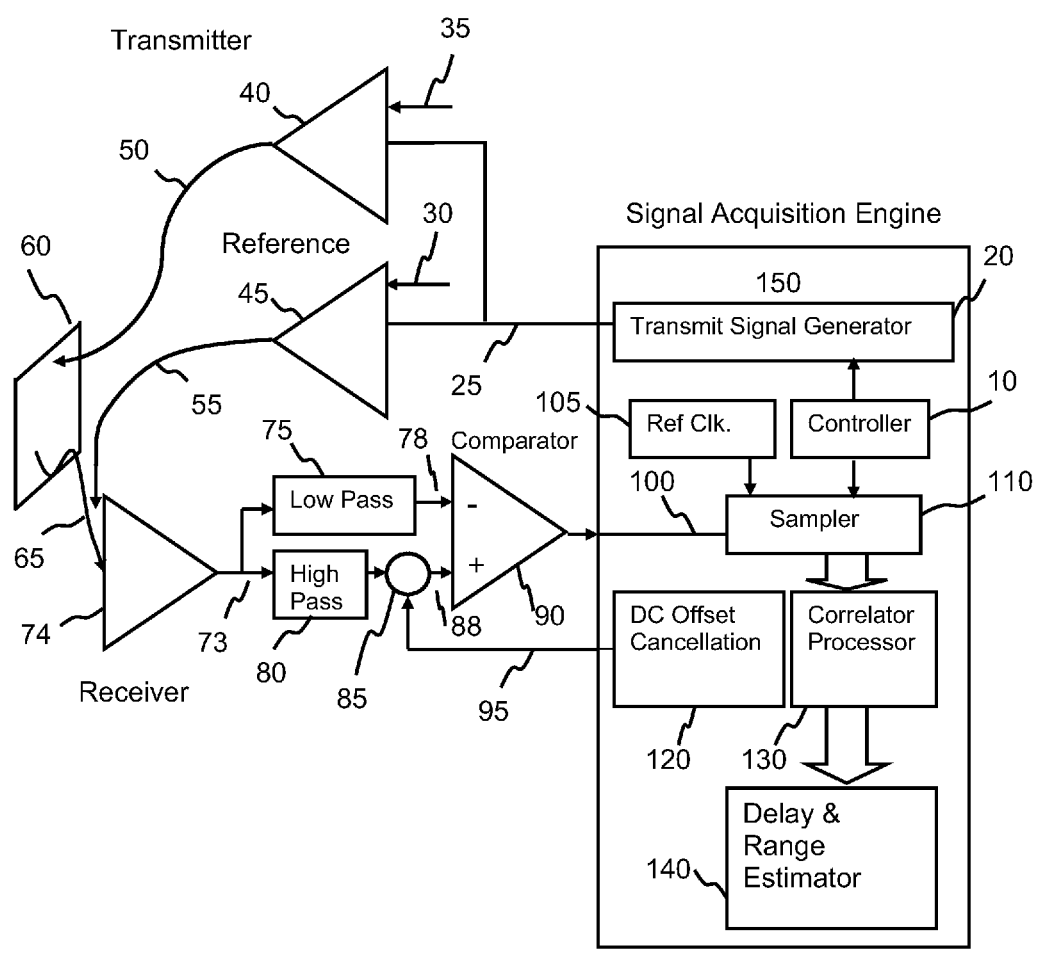
FIG. 1 details a top level block diagram for a rangefinder system incorporating edge based signal reconstruction.

FIG. 1 details a top level block diagram for a rangefinder system incorporating edge based signal reconstruction. The transmit signal generator 20 produces a modulated digital signal 25 which is fed to a pair of transmitter components consisting of reference transmitter 40 and external path transmitter 45. The reference and external path transmitters produce optical signals of closely matched delay and waveform shape although the reference channel may produce significantly less optical power than the external transmitter. Enable signals 30 and 35 select the operation of the reference transmitter or external path transmitter respectively. Only one transmitter can be operated at a time. The propagation path for the reference channel 55 passes directly to an optical receiver 74 through an optical waveguide or through free space transmission and provides a zero propagation delay reference for the distance calculation. An external beam path 50 terminates on a reflective target 60. A small portion of the signal reflecting off the target 65 is collected by the receiver. The optical signal entering the receiver is amplified and exits as received signal 73. The received signal passes to low-pass filter 75 and high-pass filter 80. These two filters function to move the effective threshold reference level for the detected signal through the received signal envelope over the duration of the signal burst. The signal from the high pass filter feeds summing node 85 is combined with DC level 95 produced by DC offset cancellation circuit 120. The DC offset cancellation functions to null the difference between the inverting and non-inverting nodes of comparator 90 prior to the reception of a signal pulse. The signal output of the low pass signal filter 78 feeds into the inverting input of the comparator while the signal from the summing node 88 feeds the non-inverting input. Comparator output signal 100 passes to sampler 110. The sampler captures the binary state of the comparator input at or a multiple of a master clock 105. Within the correlation processing block 130, the sampled signal or reference data is stored, edge transition information is extracted and a correlation process is performed using the stored transmit reference and a signal return waveform based on accumulated edge transition reflecting signal slope. The output of the correlation is the derivative of a delayed autocorrelation waveform with the maximum pulse and its following zero crossing point representing signal delay. The delay and range estimation block 140 processes the autocorrelation waveform to determine the difference between the round-trip propagation delay time of the received signal and the reference path delay.

The time delay difference is used to calculate the distance based on the index of refraction of the signal propagation path.

Figure 2:
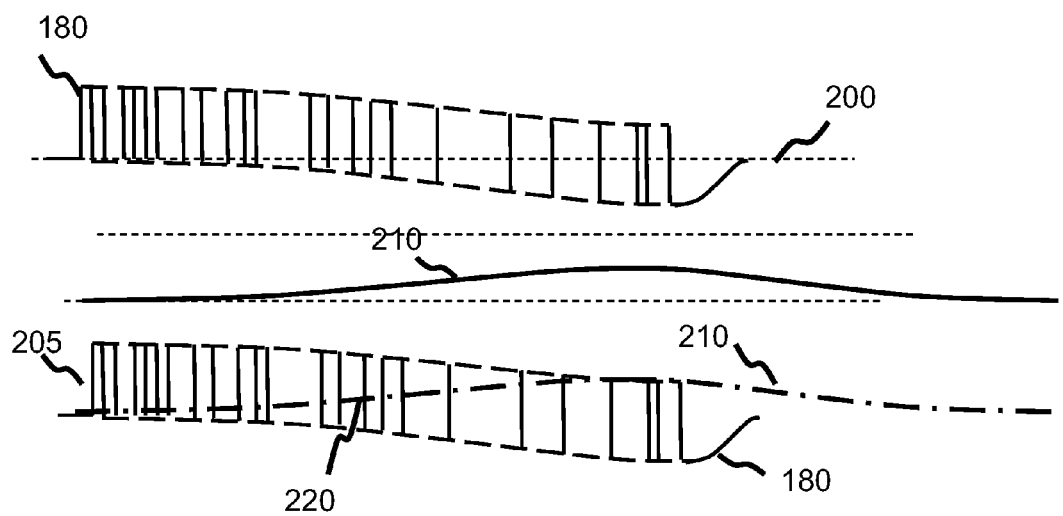
FIG. 2 show the signal outputs of the high and low pass filter due to a representative received signal waveform.

FIG. 2 show the signal outputs of the high and low pass filter due to a representative received signal waveform. The purpose of these two filters is to move the effective threshold crossing level as sensed by the inverting and non-inverting inputs of the comparator through the envelope of the signal wave shape during the duration of the received signal. The time constant of both filters is set to achieve approximately 90% of the full transient filter response over the expected duration of the pulse. Waveform 210 shows the signal output of the low pass filter. The received signal has been encoded at the transmitter to have an average of a 50% duty cycle so the low-pass filter output will approach 50% of the signal envelope during the duration of received signal. The high pass filter output 180 initially rises to full amplitude of the return signal, but then decays to the middle of the waveform by the end of the signal return. The two waveforms are shown superimposed in the lower portion of the figure labeled as 205. It can be seen that the low pass filter response, dotted line 210 slices through the entire envelope of the high passed return signal 180 during the signal duration.

Figure 3:
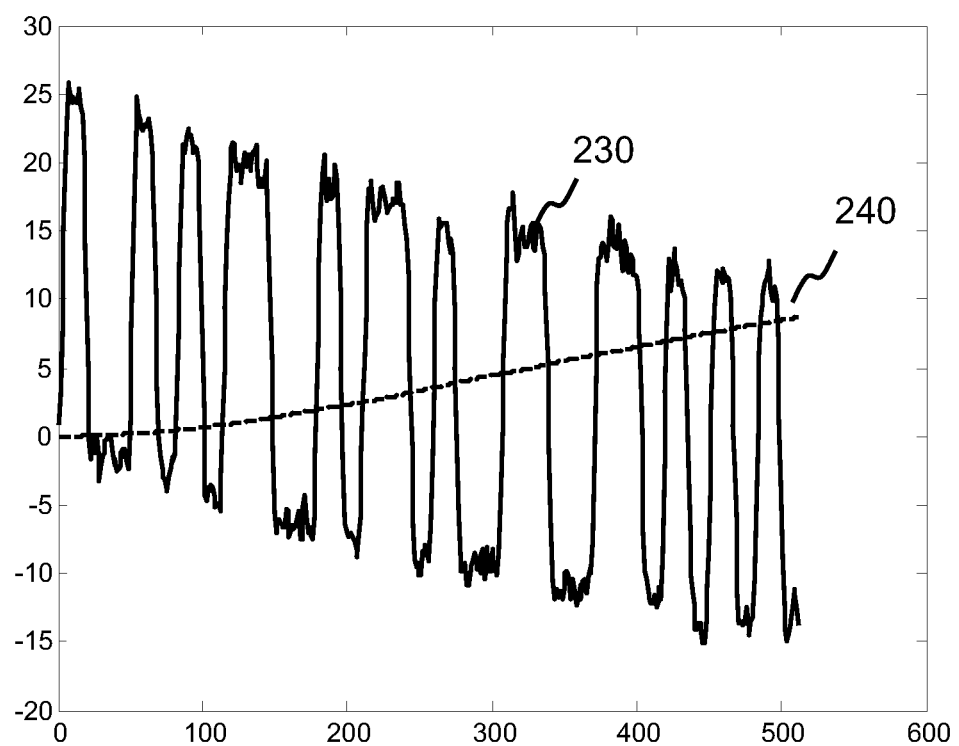
FIG. 3 overlays actual low and high pass filter outputs due to a 500 nsec received signal burst.

FIG. 3 overlays actual low and high pass filter outputs due to a 500 nsec received signal burst. High-pass signal 230 is seen to decay roughly 50% of the signal envelope, while the low-pass response 240 rises to half the magnitude of the signal envelope. As the effective comparator reference point moves through the signal envelope, the comparator binary output reflects signal slope behavior over a range roughly plus and minus two standard deviations due to modulation of the superimposed noise. At low signal-to-noise ratios, there is relatively small amount of movement of this slicing level relative to superimposed noise resulting in capture of slope information over the entire rising edge of signal transitions. At high signal-to-noise ratios, signal slope information is acquired over a narrow range near the comparator slicing level resulting in a modulation of the measured rising and falling edges to ever longer delays over the duration of the signal return.

Figure 4:
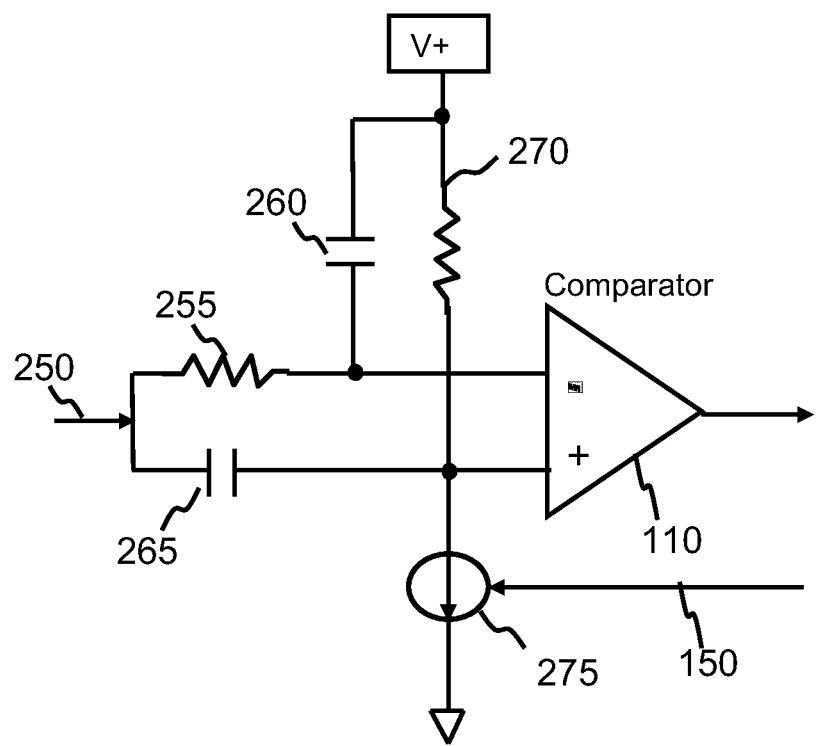
FIG. 4 details a practical implementation of comparator input filtering using single-pole high and low-pass filters.

FIG. 4 details a practical implementation of comparator input filtering using single-pole high and low-pass filters. The receiver output signal 250 drives R-C filter low-pass filter implemented by resistor 255 and shunt capacitor 260. The capacitor connects to the positive rail which is typically capacitive bypassed to signal ground. The received signal also passes to high-pass filter consisting of capacitor 265 and resistor 270, also positive referenced. A positive rail is used for terminating the filter networks to allow common mode canceling of voltage ripple coupled at the output of the receiver amplifiers due to high frequency power supply voltage noise. Since the high-pass filter does pass the operating DC level of the signal input, current source 275 is used to provide a drop across resistor 270 that allows the matching of the potential of the inverting and non-inverting nodes of the comparator. DC cancelation control signal 150 controls the current source operating point based on the duty cycle of the comparator output. The DC cancelation control monitors the comparator duty cycle during a period prior to the reception of the received signal using a control loop to maintain the comparator at 50% average duty cycle reflecting operation in the center of the receiver output noise distribution.

The circuit illustrated in FIG. 4 has a disadvantage of requiring the control of the DC cancelation current source over a relatively large operating range to maintain matching of the comparator input terminal voltages over temperature and optical background conditions. The receiver output voltage operating point varies due to changes ambient optical background lighting, receiver amplifier output voltage drift due to thermal induced changes in the receive circuitry, and changes in the comparator input terminal bias currents with temperature. The settling time of the DC cancelation circuit establishes minimum the time the receiver must be activated prior to the reception of a signal or reference burst. Since it may be desirable to shut down the receiver between signal transmissions to conserve power, the shorter the cancelation response time the longer the receiver can be shut down between acquisitions.

Figure 5:
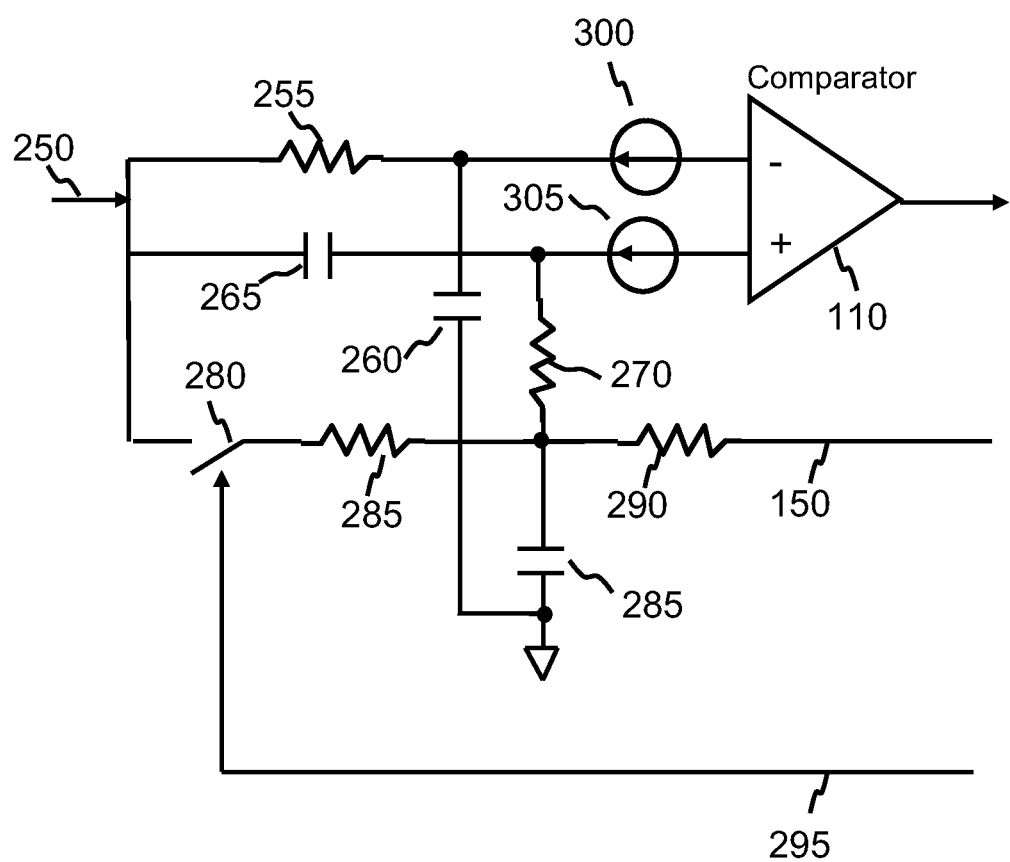
FIG. 5 shows a reduced setting time dc cancelation embodiment using an analog switch to minimize the voltage difference between comparator inputs prior to signal reception.

FIG. 5 shows a reduced setting time dc cancelation embodiment using an analog switch to minimize the voltage difference between comparator inputs prior to signal reception. Low-pass filer capacitor 260 is connected to ground, rather than the positive rail due to the assumption of a ground referenced output of the receiver. The high-pass filter shunt resistor 270 connects to signal offset storage capacitor 285 connected to the signal input through analog switch 280 and current limiting resistor 285. Input bias currents at the inverting and non-inverting nodes of the comparator are shown by current sources 300 and 305 respectively. These input currents introduce offset voltages between the input terminals if the resistances at the terminals are imbalanced. If the analog switch series resistor is small, and the filter network resistors are matched, then the comparator inputs will be equal with switch closure. When the analog switch is opened, during signal reception, charge from the input bias current 305 may slowly charge the signal offset storage capacitor. Additionally, a larger resistance may be desirable in series with the analog switch to reduce loading on the receiver signal output. This added resistance will increase voltage drift during signal reception. The comparator output duty cycle is monitored by the DC offset cancelation control circuitry as an indication of the voltage offset between comparator input nodes. The offset cancelation control signal 150 varies in response to the measured comparator output to maintain the desired 50% duty cycle. With the analog switch closed, the resistance seen between the comparator input terminals are imbalanced. Under closed loop conditions and with the switch closed, the current imbalance is compensated by a counter acting current flowing through resistor 290. This injected current by the DC cancelation circuitry forces the voltage across the switch and series resistance to zero due to equal voltages at the receiver signal output and signal offset storage capacitor. If the two voltages are equal, then no current flows across the analog switch and the associated series resistor. When the analog switch opens during signal reception, voltage drift across the signal offset storage capacitor is significantly reduced.

Figure 6A:
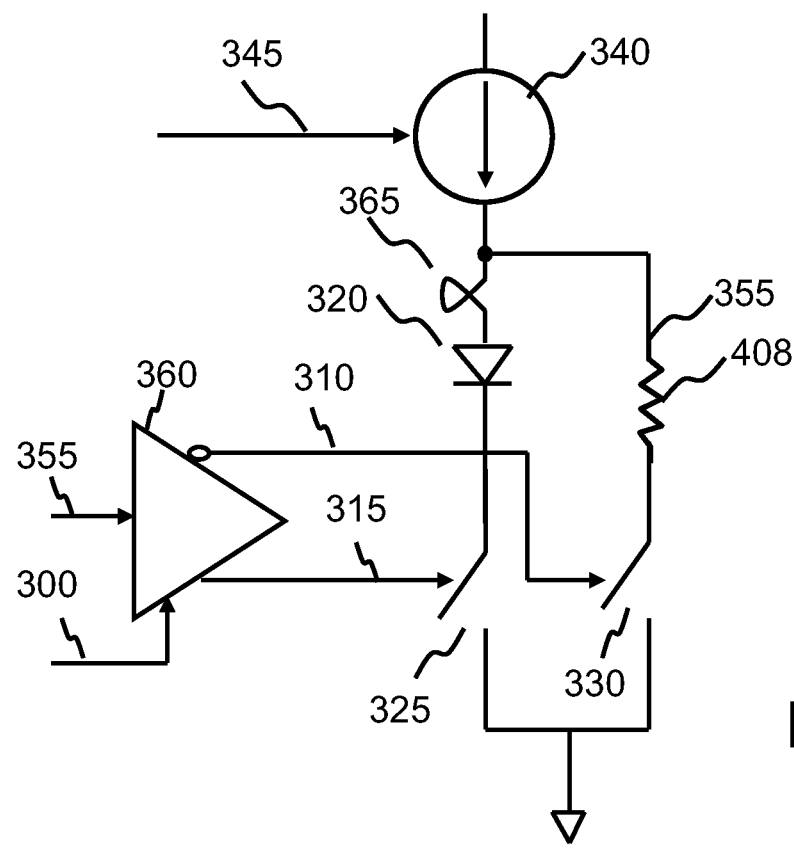
FIGS. 6A-6B detail a transmitter subsystem and associated waveforms for either the reference or external transmission paths.
Figure 6B:
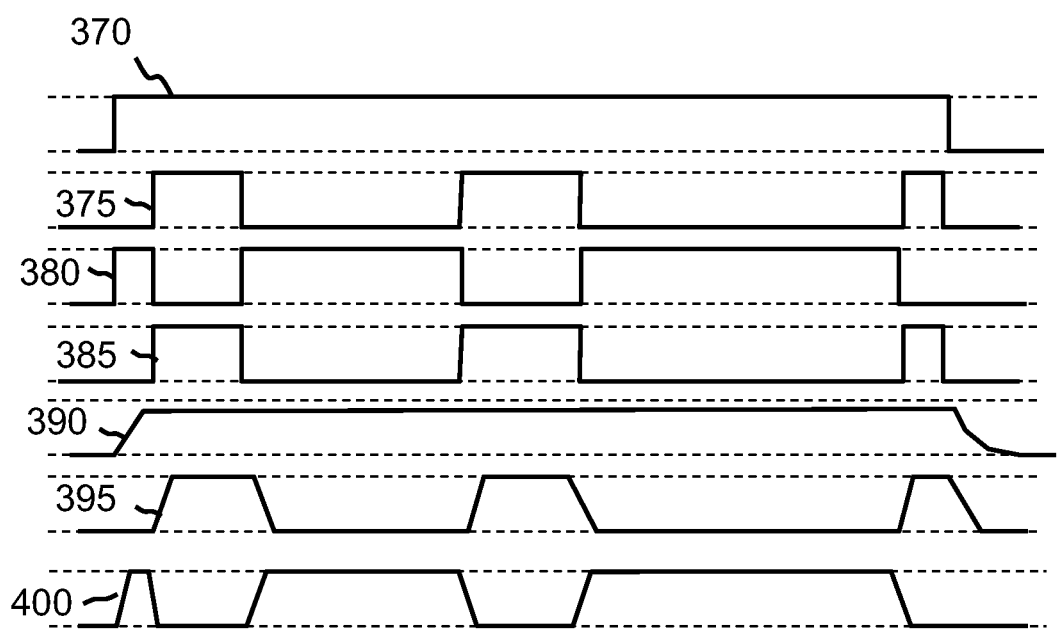

FIG. 6A details a transmitter subsystem to produce optical waveforms into either the reference or external optical transmission paths. Associated electrical waveforms are illustrated in FIG. 6B. The transmitter produces a modulated current which is converted to light by optical source 320. The selected optical source can be a light emitting diode LED or laser diode. Transmit modulation signal 355 enters differential driver 360 which produces complementary drive signals 310 and 315 which are shown as wave shapes 380 and 385. These signals alternately drive series and shunt switches 325 and 330 respectively. The series switch modulates current through the optical source while the shunt transistor bypasses current around the optical source. The current flowing through the optical source is shown as waveform 395 and the shunt current as 400. Current limiter 340, controlled through signal 345, establishes the maximum current delivered to optical source. Wave shape 390 shows the current passing through the current limiter with modulation. Ideally this current should remain steady with current modulation however stray capacitance and the finite output impedance of the current limiter can cause variations in the actual current. An enhancement mode mosfet transistor is typically used as a current limiter since it does not require base current to maintain current flow. This permutation of a differential laser driver has the advantage on not requiring the use of a switched low-side current source as in the prior art. The differential switching output devices are driven as ground referenced loads reducing the drive output peak voltage requirements. An inductance 365 can be added in series with the current source to raise its high frequency impedance and to provide and inductive kick to help overcome series inductance of the optical source. Additionally, a resistor 408 can be used in series with the shut path to equalize the voltage drop across the two paths during modulation, improving current limiter regulation and minimizing radiated and conducted noise emission.

Figure 7:
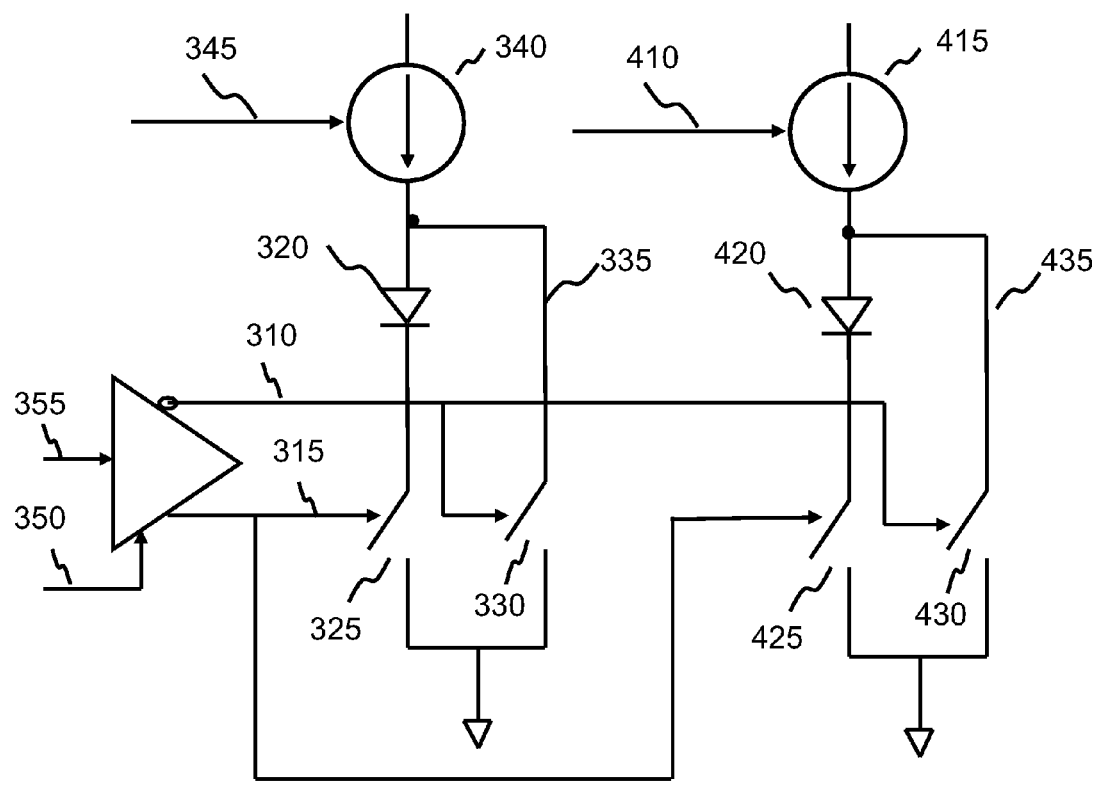
FIG. 7 shows an implementation of two matched transmitters sharing a common differential driver.

FIG. 7 shows an implementation of two matched transmitters sharing a common differential driver. The current limiter control signals 345 and 410 are alternately enabled allowing the selection of drivers supporting the external path optical source 320 or the reference optical source 420. The reference transmitter duplicates series and shunt switches used for the external path driver shown as 425 and 430 respectively. The pairs of series and shunt switches can share dual packages for the improved matching of switching behavior. The circuit layout of the output driver and output switches need to symmetrical allow matched performance between the reference and signal transmitter waveforms.

Figure 8:
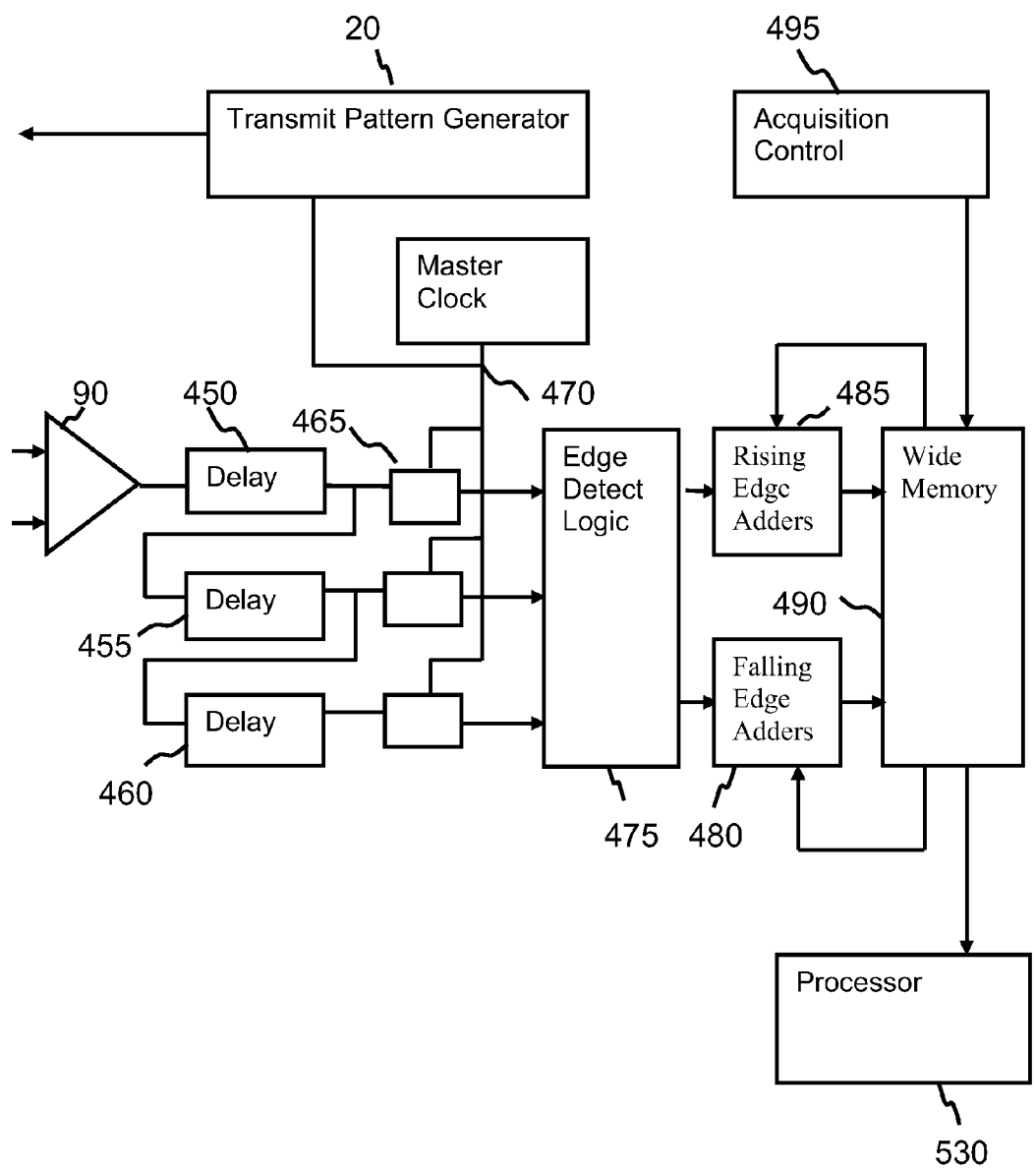
FIG. 8 illustrates a basic embodiment of the edge-based sample with edge accumulation and storage of sums of both rising and falling edges.

FIG. 8 illustrates a basic embodiment of the edge-based sample with edge accumulation and storage of sums of both rising and falling edges. Sampled delay line outputs 450, 455 and 460 are sampled by matching clocked latches 465 to produce an effective sampling rate a multiple of the master clock frequency 470. Edge detection logic 475 makes a determination of a rising or falling edge based on the logic state of successive samples of the output of the delay line latches. The edge detection logic determines whether a rising, falling or no transition occurred between successive pairs of signal samples. Based on the occurrence of either a rising or falling edge, rising and falling edge adders 485 and 480 accumulate the numeric total of edge transitions in wide memory 490. The wide memory allows the simultaneous storage of multiple edge samples based on the number of delay line tapes used to increase the effective sample rate. Acquisition control 495 supervises the signal acquisition process.

Figure 9:
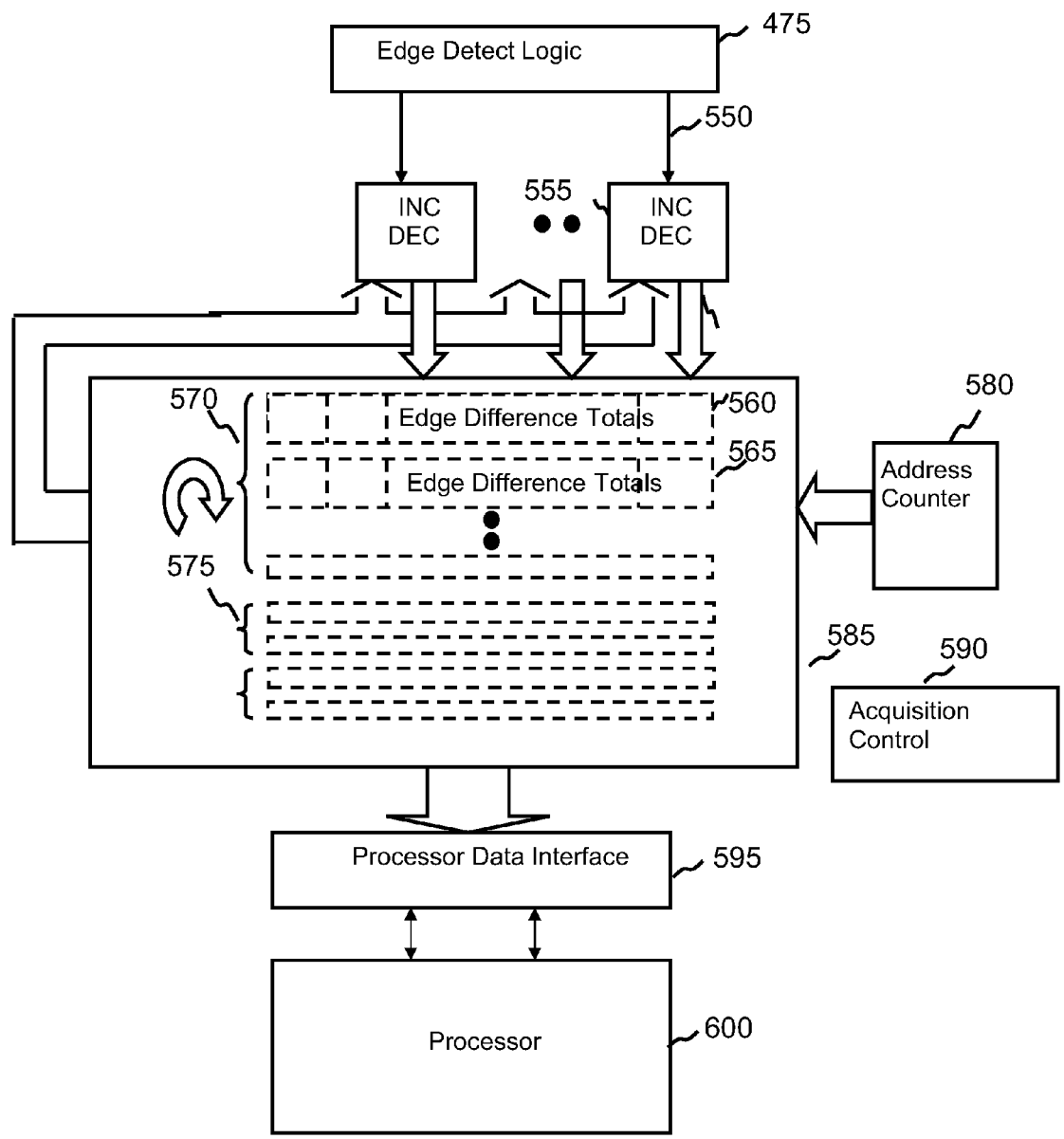
FIG. 9 shows an embodiment of edge-based sampler with simplified edge accumulation and reduced associated memory storage and logic complexity.

FIG. 9 shows an embodiment of edge-based sampler with simplified edge accumulation and reduced associated memory storage and logic complexity. The presence or lack of edge occurrence at one or more successive sample points is determined by edge detection logic 475. The output produces three data states indicating rising, falling or no transition of the external signal or reference signal. In the case of a rising or falling edge determination, adder 555 either increments or decrements an edge difference total stored in memory 585. Address counter 580 points to a location in memory 565 where one or more totals of the difference in the rising and falling edge count are stored. Typically at least a one full clock cycle delay is required between the reading of a memory address and the result store. Use of a dual port memory with separate read and write address busses can allow the reading of higher address value 565 while simultaneously writing storing the result in a lower address value 560. Alternatively, a single port memory can be used in which the edge total is stored at a higher address location depending on the cycle delay of the increment/decrement operations. The storing of the result at a higher address from the read operation requires the accounting of the increasing memory block base address with each signal accumulation cycle. The edge difference data can be stored in separate sections in memory 570 and 575 allowing the accumulation and storage of multiple signal waveforms. Processor data interface 595 allows an internal or external processor 600 to access data stored in the memory at the completion or during the acquisition of signal data.

Figure 10:
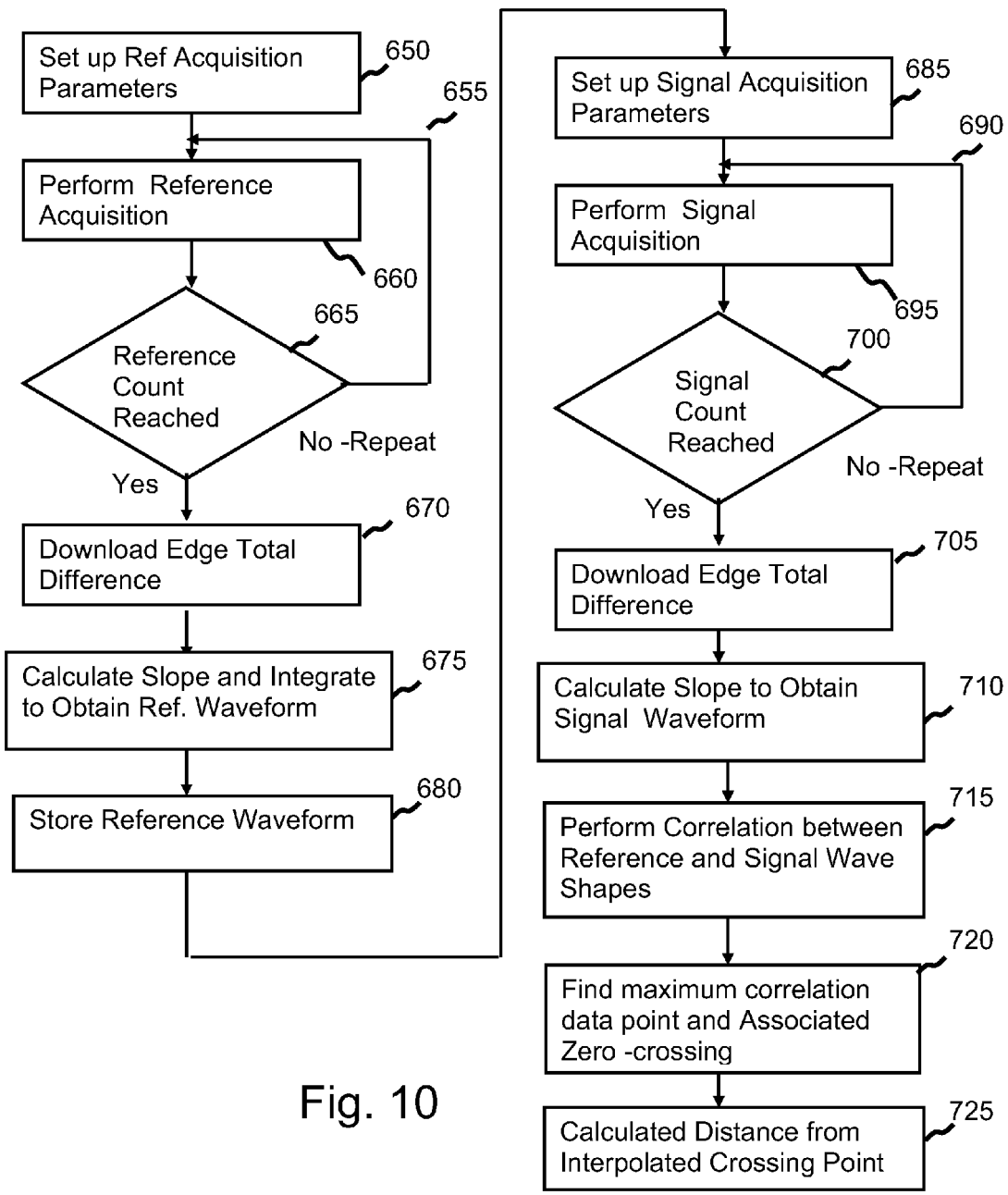
FIG. 10 shows a flow chart description of reference and external signal acquisition and processing.

FIG. 10 shows a flow chart description of reference and external signal acquisition and processing. Prior to beginning the acquisition process (Step 650) sets up the parameters required for acquiring a reference waveform. (Step 660) initiates the acquisitions of the data from a single transmit burst adding the rising or falling edges to previous totals. Comparison (Step 665) compares the number of signal acquisition cycles with the desired total and if the total is not reached the acquisition step is repeated. Once the desired numbers of acquisitions are reached, (Step 670) downloads the edge total difference data from the storage memory into a processor memory for further processing. The difference in the edge total provides a slope estimate which can be integrated to obtain a reference signal wave shape. (Step 675) The reference waveform is stored for future comparison with the external signal (Step 680). Step 685 sets up parameters for acquiring the external path return signal. Steps 695 and 700 repeat the signal acquisition process until the desired numbers of acquisitions are reached. The edge totals are downloaded (Step 705) and the only the signal slope is used to represent the external path waveform (Step 710). The reference and the external path return signal are mathematically correlated to estimate the difference in arrival times between the two waveforms (Step 715). The operation of correlation on two signals, one a signal derivative, is mathematically equivalent to taking the derivative of the correlation of two signal waveforms without differentiation. The derivative of the correlation is used to allow the estimation of the zero-crossing point of the maximum excursion of correlation wave shape rather than using conventional peak estimation. Step 720 finds the maximum peak of the correlation derivative and uses the following positive to negative zero crossing to estimate delay. Step 725 interpolates the positive and negative correlation values to estimate a zero crossing delay. The delay is converted to distance using the speed of light in the medium of the external optical signal path.

A critical factor in maintaining good measurement accuracy is insuring that the reference waveform is properly normalized; with symmetrical positive and negative signal excursions relative to ground or zero. Both the reference and signal returns have their DC component removed during edge processing used for signal recovery. Since only the slope of the return signal during correlation processing, no additional manipulation of the direct signal return is necessary beyond taking the difference between the accumulated positive and negative edge transitions. The reconstruction of the reference waveform using the integration of the edge differences, may not reflect sufficient wave shape stability for proper correlation processing. The reconstructed waveform may not be symmetrical around ground and there can be DC drift of the signal envelope due to slight imbalances in the accumulated edge values used for signal reconstruction. This limitation in DC stability of the reproduced reference waveform can resolved due the use of typically strong reference signal strength and prior knowledge expected signal shape and pattern.

Figure 11:
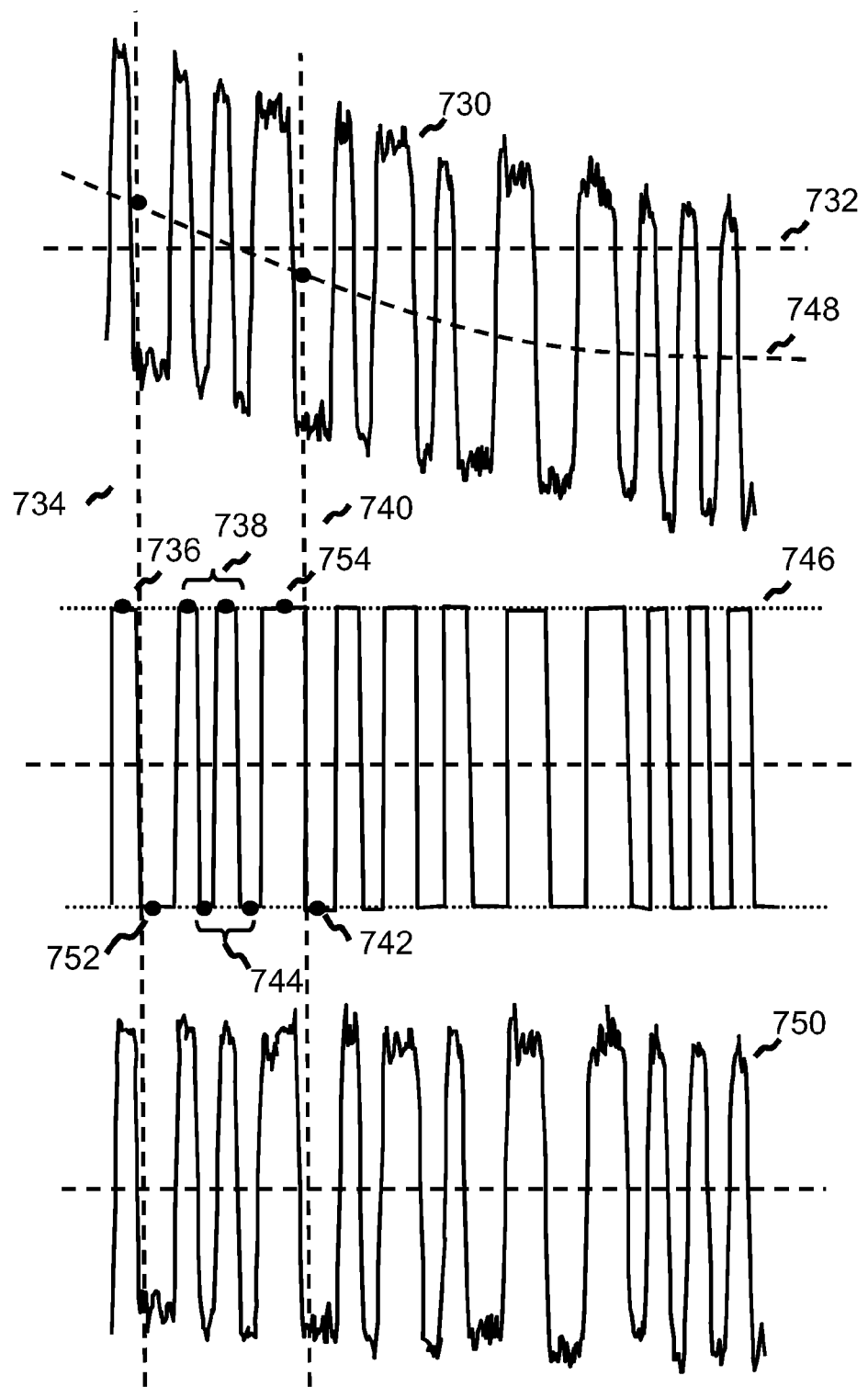
FIG. 11 illustrates an example reference signal wave shape with reconstruction error relative to the desired reconstructed waveform.

FIG. 11 illustrates an example reference signal wave shape with reconstruction error relative to the desired reconstructed waveform shown below. Reconstructed reference waveform 730 exhibits a DC level drift and asymmetry relative to zero reference level 732. Idealized reference waveform 746 has a series of reference points; positive points 738 located along the upper plateaus and negative points 744 along the negative waveform plateaus. These reference datum's, located approximately in the middle of the high and low portions of the waveform, are used to establish reference points from which offset error can be measured in the reconstructed waveform. A wave shape reflecting DC offsets over the extent of the waveform is subtracted from the reconstructed reference to eliminate this DC offset. Offset waveform 748 reflects this DC error and is generated by taking the difference between successive positive and negative reference time points 736 and 752 associated with reference line 734 or points 754 and 742 with reference line 740. These waveform reference points are effective since only a few nanoseconds of potential drift in the arrival time of the reference can be expected. Over small reference delay variations, these reference points will continue to reflect the upper or lower portions of the waveform over time. Corrected waveform 750 shows the reconstructed waveform with the offset error removed through subtraction. The offset error correction waveform can be least squares linear fit to the subtracted offset errors or reflect a higher order polynomial approximation.

Figure 12:
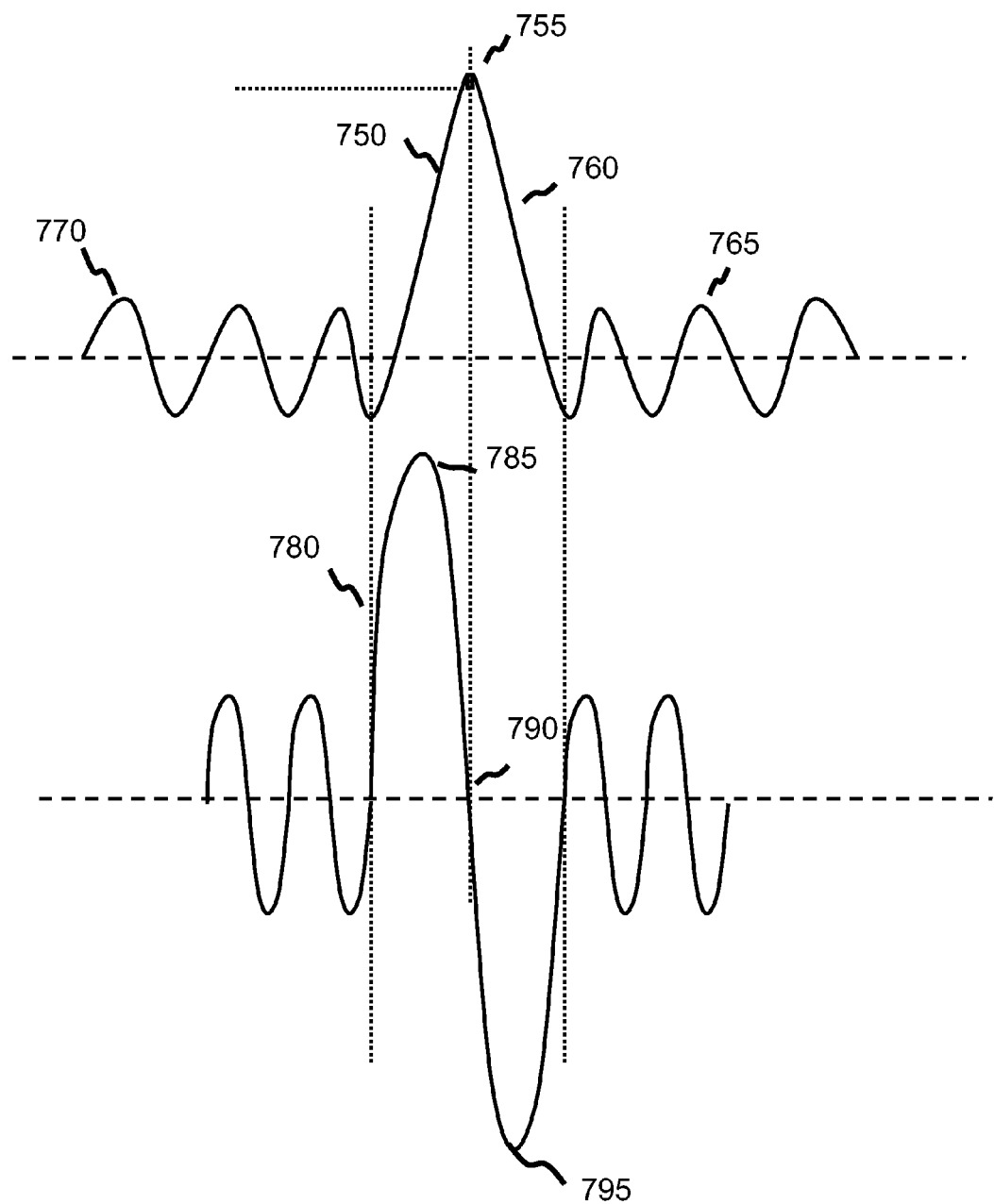
FIG. 12 shows an example autocorrelation waveform and derivative.

FIG. 12 shows an example autocorrelation waveform and derivative. An idealized auto-correlation waveform 770 exhibits a central peak 755 with side-lobe ripple 765. The correlation peak corresponds to zero delay between two identical signal patterns in time alignment. Shifted to shorter or longer delays, the correlation value drops off as represented by rising and falling slopes 750 and 760 respectively. The derivative of the correlation waveform is shown as waveform 780. The positive and negative peaks 785 and 795 occur at the maximum slope points of the central peak of the correlation waveform. The zero crossing point 790 occurs at the maximum inflection point of the correlation waveform and indicates the point of best delay match between the waveforms.

Figure 13:
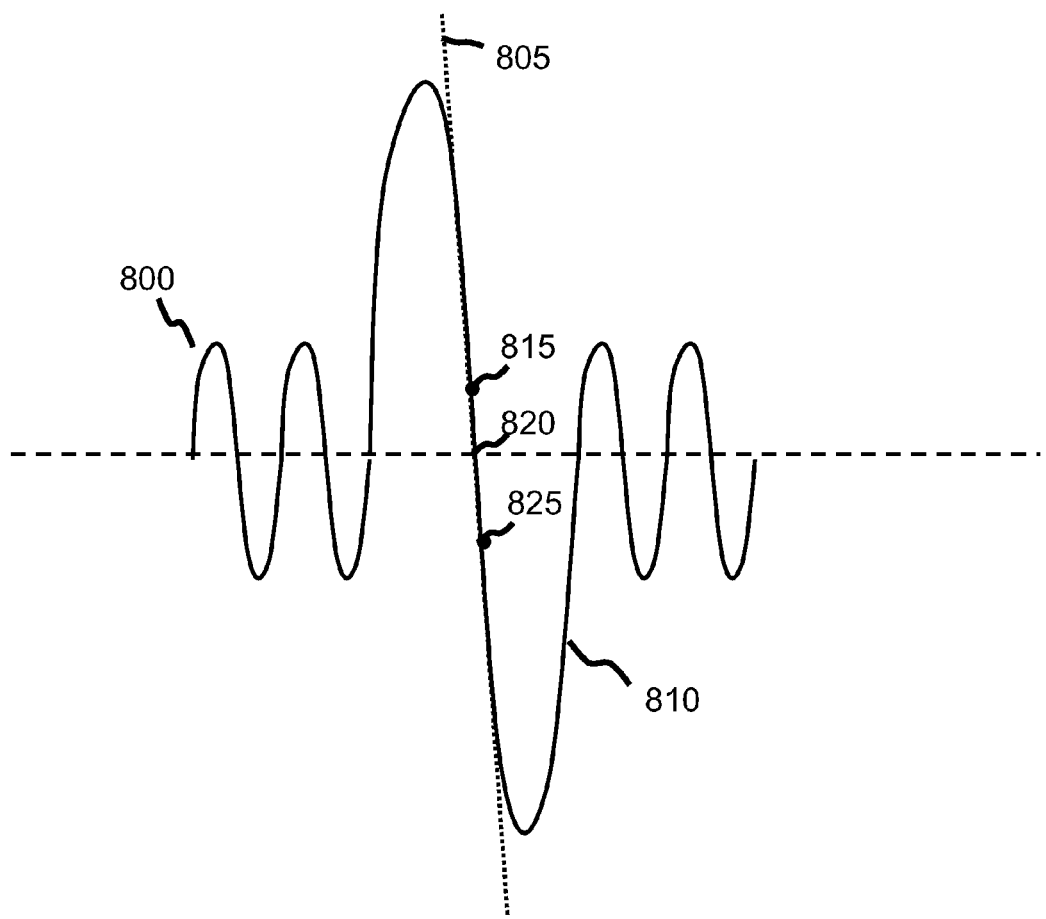
FIG. 13 show the correlation derivative with a successive calculation points identified on the falling edge.

FIG. 13 shows the correlation derivative with a successive calculation points as identified along the falling edge. The portion of the correlation derivative waveform 800 representing the approach of time alignment is shown by falling slope 805. Calculation points 815 and 825 identify the data points above and below the zero-crossing respectively. The zero-crossing identified by point 820 can be determined by a simple linear interpolation between the two points. A curve fit between a larger number of points above and below the crossing can improve the accuracy of the crossing estimate.

Figure 14:
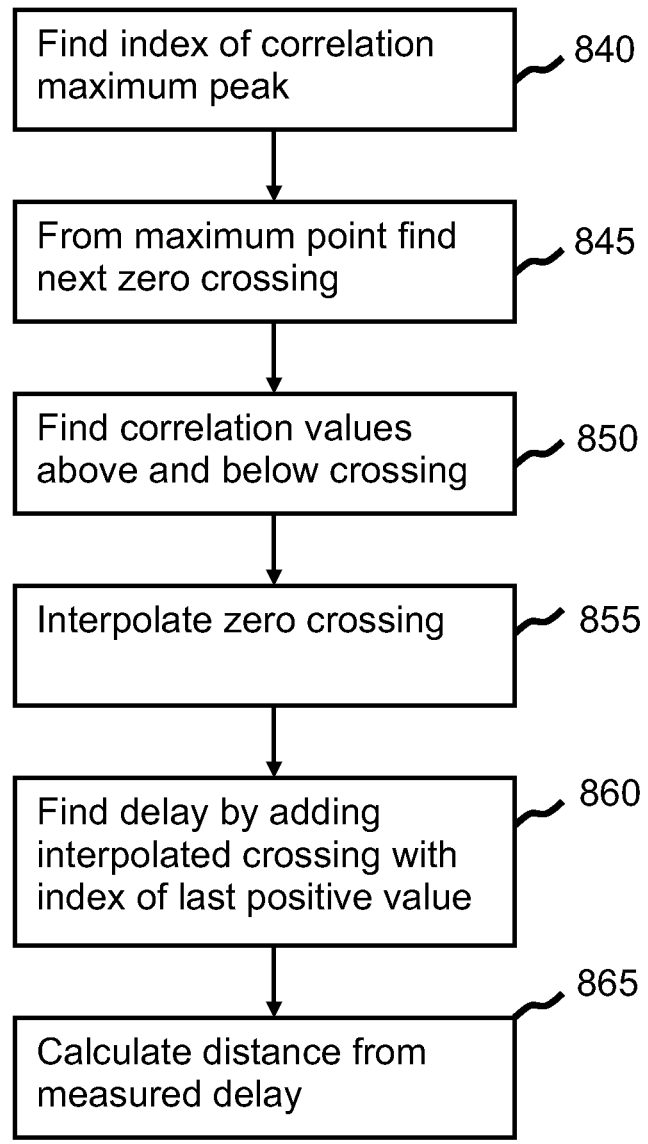
FIG. 14 shows a flow chart description the process of estimating delay from the correlation derivative.

FIG. 14 shows a flow chart description the process of estimating delay from the correlation derivative. The maximum positive value and associated memory index are identified (Step 840). The peak value is proportional to slope of the central peak of the un-differentiated correlation and reflects the relative signal strength of the external signal. Step 845 finds the next zero-crossing of the waveform. Step 850 locates calculated values above and below the zero crossing point. The zero crossing point is determined by interpolating between the positive and negative samples. Step 860 estimates the delay by adding the index of the positive data point before the zero crossing with the fractional value of the interpolated zero crossing point. The distance is then determined in step 865 based on the speed of light in the external path transmission medium.

Figure 15:
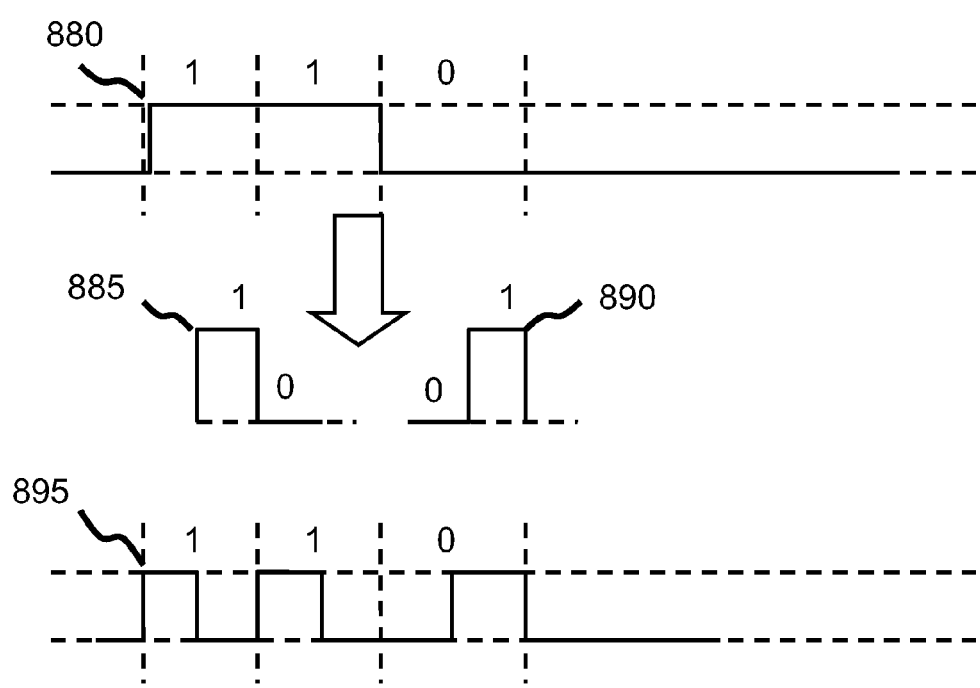
FIG. 15 shows an example of a 3-bit binary sequence with optimal side-lobe characteristics concatenated with a two-state pulse position encoding to remove DC content.

FIG. 15 shows a simple example of a 3-bit binary sequence with optimal side-lobe characteristics concatenated with a two-state pulse position encoding to remove DC content. Part of series of optimal binary code sequences, known as a Barker codes, it possesses the minimum possible peak side lobe ripple for a given code length. In RF radar applications, these code sequences are often phase modulated at the transmission carrier frequency to encode a one- or zero binary state. Since most optical time-of-flight ranging sensors do not employ carrier modulated and are incoherently detected in a photo-diode, some form of baseband encoding is necessary to remove DC content and allow transmission of a +1 or −1 state. Waveform 880 illustrates a 3 bit "110" pattern barker code. This sequence is concatenated with a two-slot pulse position modulation with "10" sequence 885 representing a one state while a "01" sequence 890 indicating a zero state. Waveform 895 shows 6-bit sequence resulting from a 3-bit binary sequence concatenated with the two-slot pulse-position modulation.

Two approaches can be used to sweep the detection threshold through the extent of the received signal. First the threshold level can be successively stepped through the signal envelope over multiple separate signal acquisitions. This method has the advantage of sampling at the same DC amplitude levels over the duration of the signal burst. The disadvantage of this approach is the inability to capture the wave shape of a signal using a single acquisition. Additionally it also requires prior knowledge of the return signal strength to set the start and end values of the signal sweep and the threshold increment step size. A second approach, disclosed earlier, uses a filter network prior to threshold detection to slice through the signal envelope during a single acquisition. Since this technique effectively slices the beginning of signal burst at the minimum DC value and moves up through the received signal waveform over the duration of the burst, different portions of the signal envelope are captured. Under small signal conditions, when the noise envelope dominates the signal excursion, the acquired slope data will cover the full extent of the rising and falling edges. When the signal becomes larger, where the slope information is only valid near the effective threshold detection level, signal fidelity is compromised. To compensate for this problem the base signal pattern can be repeated multiple times during a burst to allow capture of the entire signal envelope.

Figure 16:
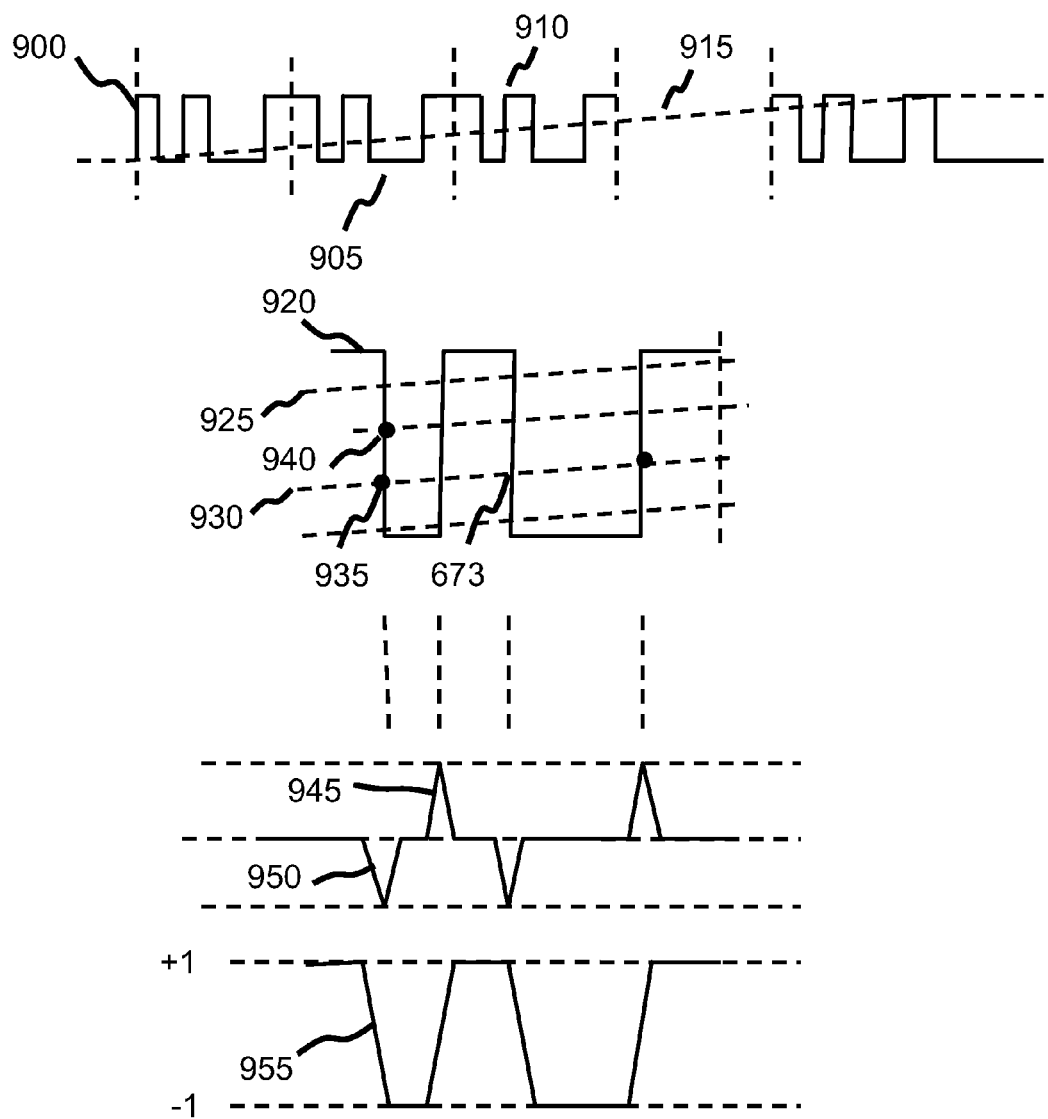
FIG. 16 shows an example of the previous example 6-bit concatenated binary sequence repeated to allow improved waveform reproduction using a self-sweeping threshold.

FIG. 16 shows an example of the example 6-bit concatenated binary sequence repeated to allow improved waveform reproduction using the self-sweeping threshold. Repeating pattern 900 repeats the 6-bit sequence 905 and 910 until the slicing threshold 915 has had the opportunity through the entire signal envelope. The time constants of the threshold comparator input filter is set based on the desired length of the binary sequence. To take advantage of this repeating pattern, a circular memory with a length sufficient to capture a single sequence segment can be used to overlay the accumulating edge data. Waveform 920 shows this 6-bit pattern with slicing levels shown as dotted lines, 925 and 930. Sampling points 935 and 940 show the capture if successive regions along a falling edge of a waveform segment. The accumulated edge difference or slope representation associated with a falling and rising edge of the waveform are illustrated by waveform peaks 950 and 945 respectively. The integration of this waveform 955 has been normalized to plus and minus one to represent a typical reference waveform used in the correlation calculation.

Figure 17:
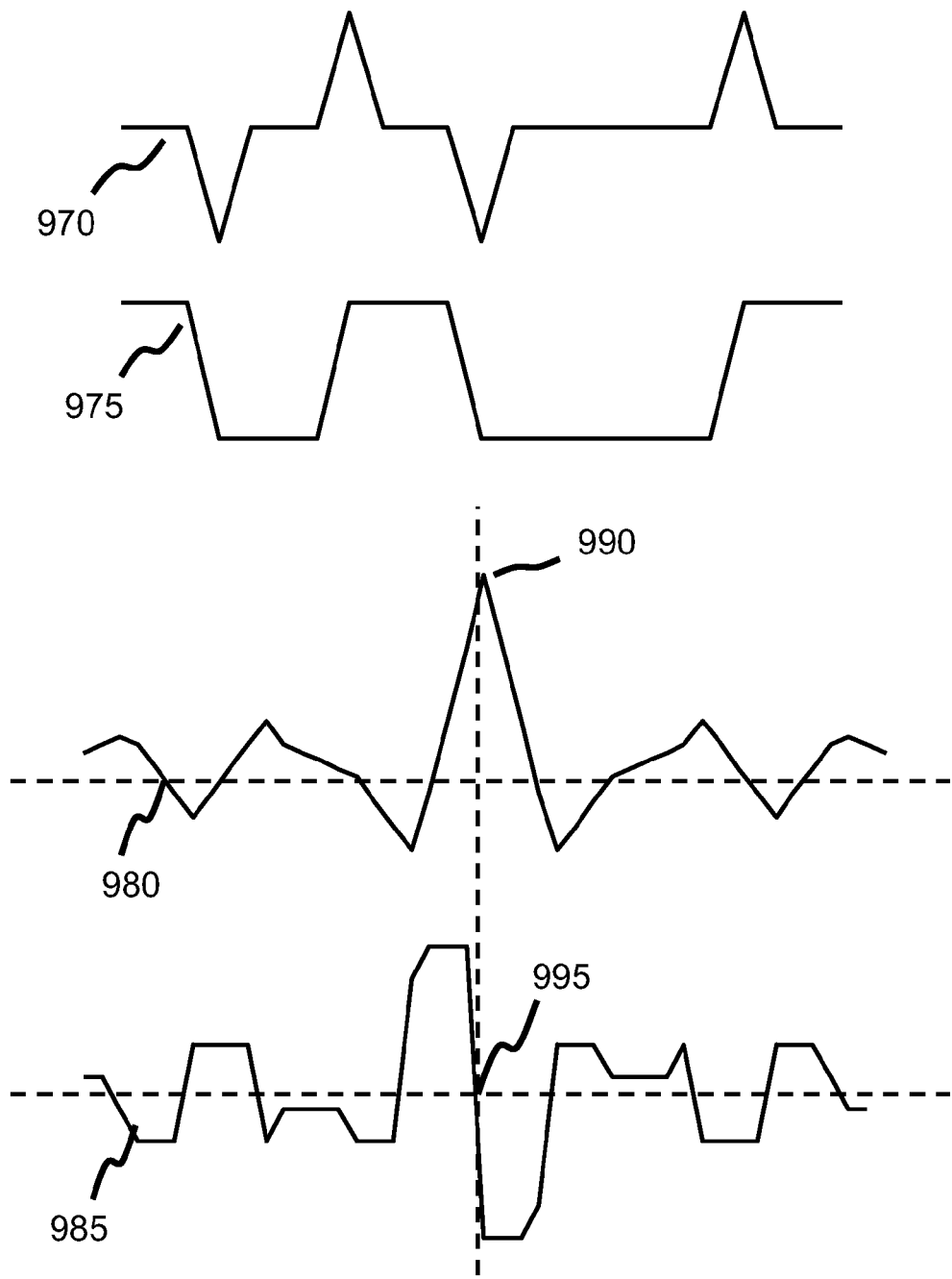
FIG. 17 illustrates the correlation of two identical sequences, one using reproduced waveforms normalized to pulse and minus one and a second using a reproduced waveform and its derivative.

FIG. 17 illustrates the correlation of two identical sequences, one using reproduced waveforms normalized to plus and minus one and a second using a reproduced waveform and it's derivative. Waveform 970 shows the slope of the signal waveform and its integral is shown as waveform 975. The waveform 980 represents direct correlation using reproduced waveforms normalized to pulse and minus one. The central peak 990 occurs with delay alignment. Waveform 985 represents the correlation the waveform normalized to pulse and minus one with its derivative. Zero crossing location 995 occurs with delay alignment.

Figure 18:
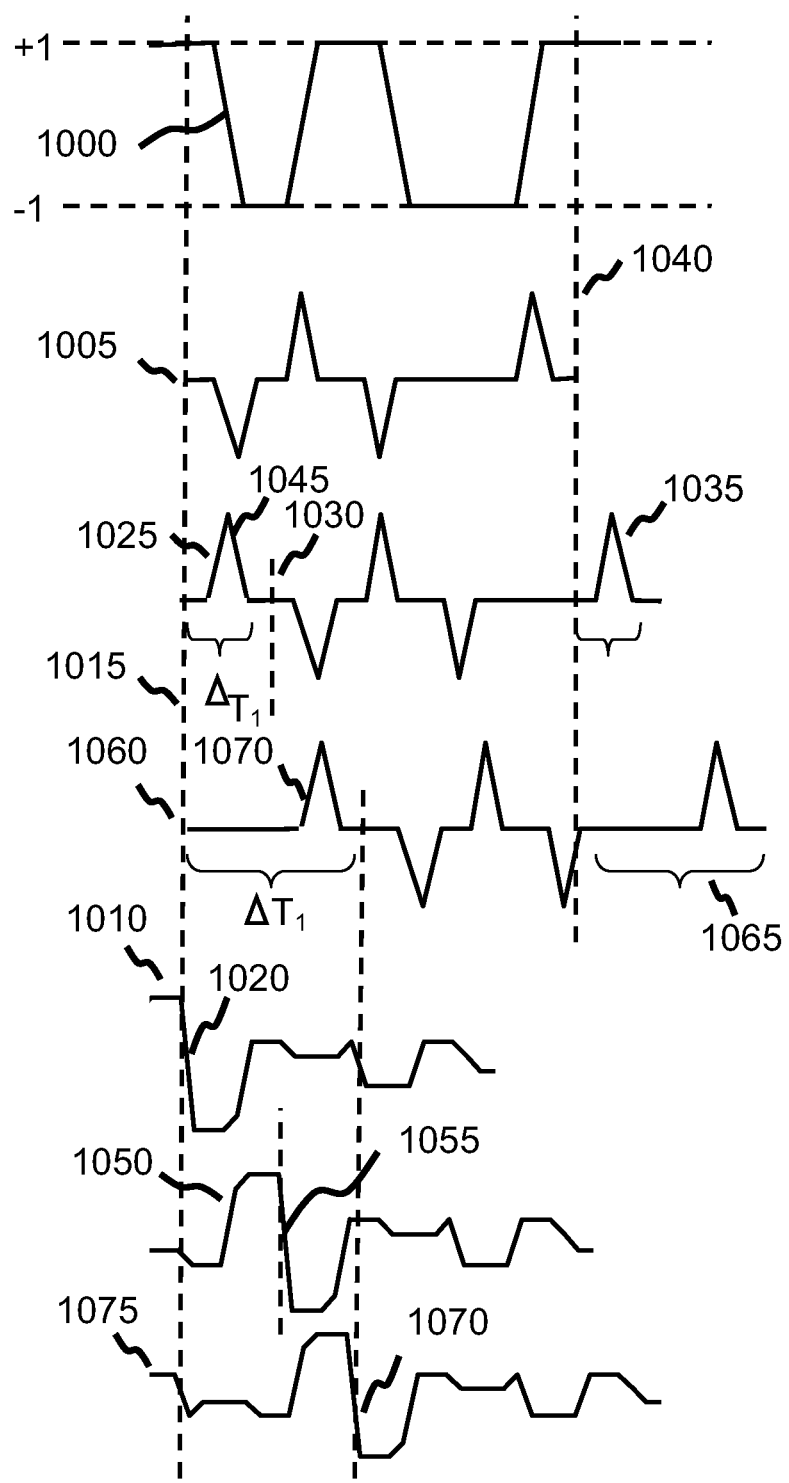
FIG. 18 shows an example of a series of correlations using a normalized reference waveform and a progressively delayed return signal.

FIG. 18 shows an example of a series of correlations using a normalized reference waveform and a progressively delayed return signal. This example uses a circular memory matched to the length of the repeated binary correlation code segment. The waveform 1000 represents a stored reference signal normalized to plus and minus one in amplitude. The slope representation of a baseline signal is shown as waveform 1005 and waveform 1010 shows the resulting correlation. Dotted reference line 1015, aligned to the zero crossing point 1020, indicates zero delay. Waveform 1025 is arbitrary delayed in waveform 1030 and the delay is seen as rightward shift of the wave form by delta T. A signal portion 1035, shifted past the end of the window marked by dotted line 1040, is folded back to the beginning of the memory block and is marked as waveform segment 1045. The correlation waveform 1950 associated with this delayed signal has a zero-crossing shifted to the right and is noted as 1055. The last delayed signal 1060 has a long signal segment 1065, shift back to the beginning of the block as signal segment 1070 with a correlation shown as 1075.

Signal memory storage using a circular memory to overlay a repeated signal segment is less desirable when longer measurement ranges are required. The use of circular memory for signal storage allows for high accuracy signal reproduction, measurement ranges are limited to the length of the repeated segment to prevent range ambiguities at longer ranges. For example, if a transmission burst is limited to 500 nanoseconds and the signal segment is repeated four times, the signal segment will be limited to 125 nanoseconds. A 125 nanoseconds roundtrip delay corresponding to a 60 foot maximum range is great limitation in many longer range applications such as sporting rangefinder which require operation to a kilometer or longer.

The range limitation of the circular memory can be avoided by using a continuous signal memory, but the use of a repeating correlation sequence introduces performance limitations. The repeating correlation binary sequence produces a triangular enveloped comb pattern of the repeated segment's autocorrelation peaks with the central peak corresponding to the best correlation match. Detecting the largest central peak in the comb pattern can be resolved by selecting the largest value; however the minimum detectable signal is compromised due the increased probability of falsely detecting a lower amplitude comb peak as the strongest signal. In addition the comb pattern makes it very difficult to separate the comb patterns produced from reflections of multiple targets.

A single correlation pattern can be used to avoid the detrimental impact of using a repeated correlation pattern if the autocorrelation result is only required. The increasing region of slope detection within the received signal burst incompletely captures the dynamic range over the full duration of the correlation sequence. The low portion of the rising and falling signal segments of the received signal are captured during the beginning of the burst moving upward towards the upper portions of the signal transitions at burst termination. This shift in the edge sampling level produces a time delay shift over the duration of the received signal burst which becomes more evident as the received signal strength improves. This delay shift should be expected to introduce measurement accuracy changes; however it typically produces only a few centimeters of measurement shift from small to large signal conditions. The relatively small change in the delay observed in the correlation function output shifting symmetrically to shorter effective edge delays at the beginning of the burst to longer delay in the later portions of the signal burst. This delay dispersion over the signal burst results in broadening the central correlation peak while the location of maximum remains relatively constant. This equalization of the delay dispersion effects becomes less effective with less symmetry in the shape of the rising and falling signal edges relative to the center of the waveform.

The calculation of signal and reference correlations is computationally intensive and for longer range windows this overhead can significantly reduce the achievable measurement update rate. For example, a 500 nec signal transmission burst with a range window of one microsecond would require in excess of 250,000 multiply accumulation operations to perform delay calculation. Even using a fast microcontroller this can require one-half second or longer to complete a single distance measurement delay calculation. Implementation of the signal correlation using an application specific digital signal processor used for signal acquisition and storage can significantly reduce this required process time. Adding a correlation module implemented in a field-programmable gate array running at 150 Mhz, results in a processing time of only a few milliseconds for the previous example. Even with range windows exceeding several kilometers, requiring processing signal storage memories of 10,000 elements, can still be processed in less than 50 milliseconds using a single high-speed multiplication and accumulation core associated with an application specific correlation processor.

Figure 19:
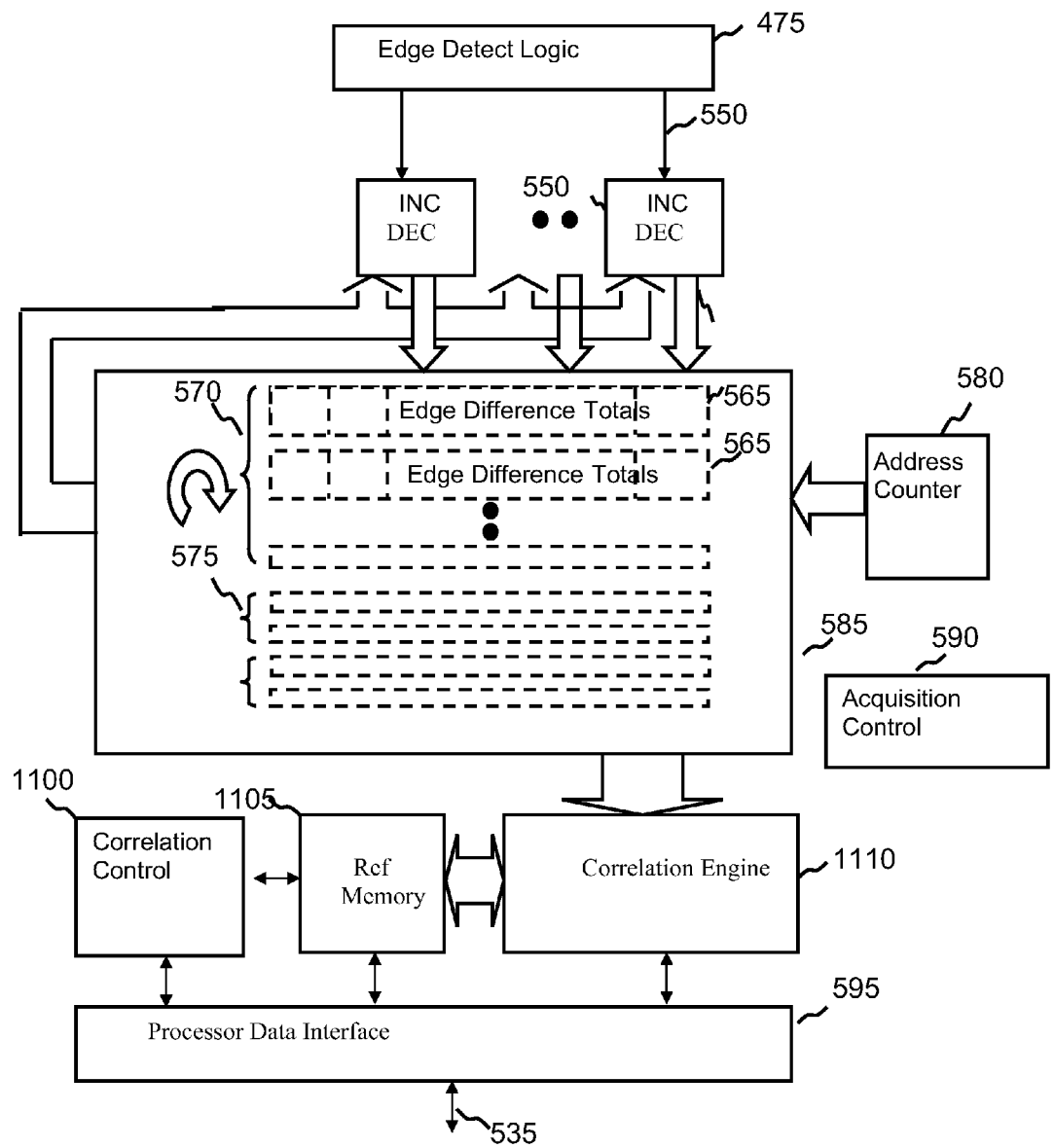
FIG. 19 combines the edge processor and memory storage with a correlation engine for improved processing throughput.

FIG. 19 combines the edge processor and memory storage with a correlation engine for improved processing throughput. A correlation engine 1110 performs multiplication and accumulation of data stored in the edge accumulation memory 585 with a reference waveform stored in a reference memory 1105. Correlation data is stored in a dedicated memory within the correlation engine. The correlation process control 1100 coordinates the multiplication and accumulation process. Processor data interface 595, transfers the correlation waveform to a processor core at the completion of the correlation process.

Figure 20:
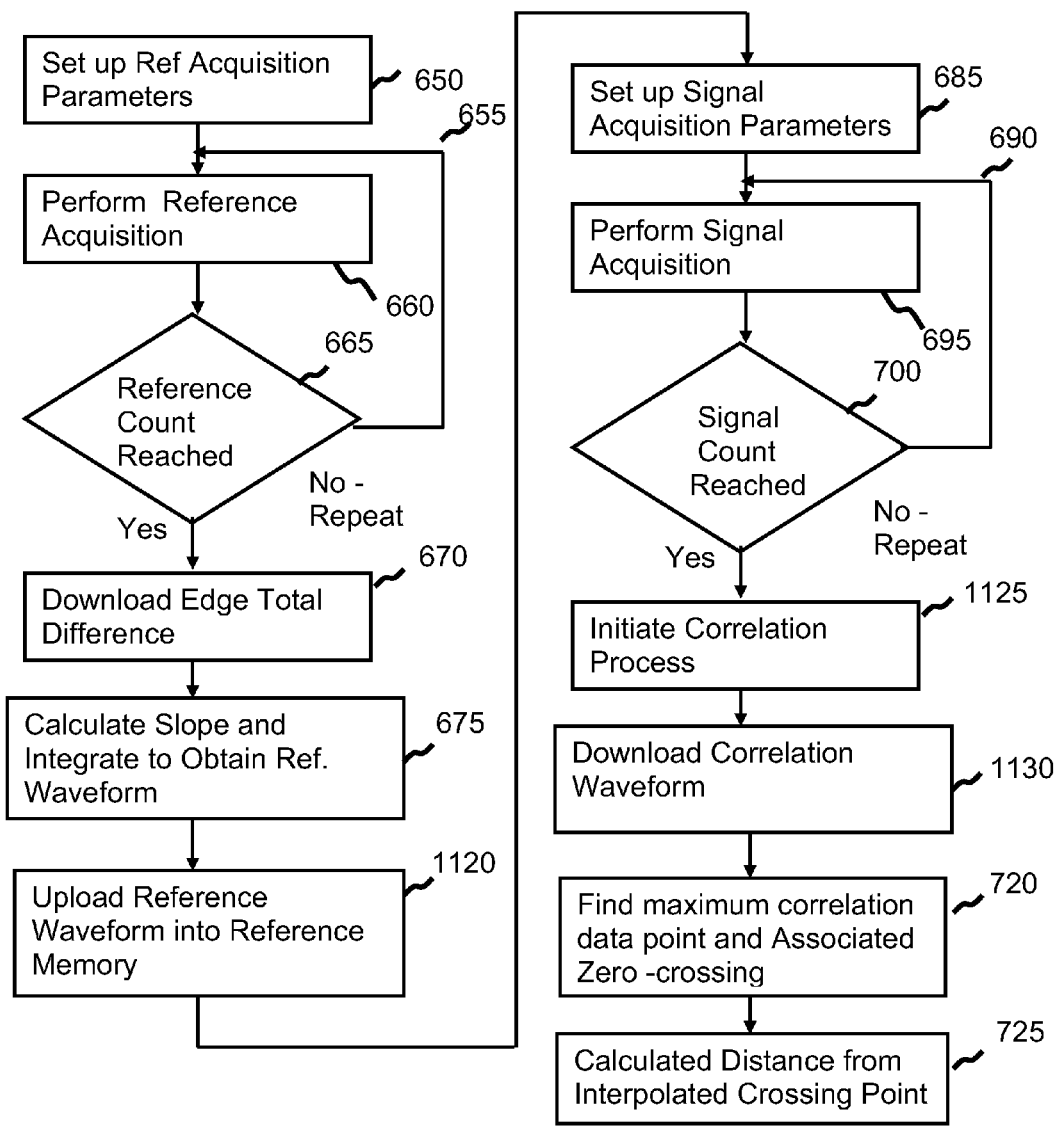
FIG. 20 shows a modified signal and reference processing flow diagram to accommodate processing the correlation in the dedicated digital processor.

FIG. 20 shows a modified signal and reference processing flow diagram to accommodate processing the correlation in the dedicated digital processor. As in the previous flow description, a reference waveform is acquired and accumulated with the result is downloaded to the processor. Within the processor the waveform is reconstructed and normalized. Rather than storing the result in a local processor memory, the waveform is uploaded to a dedicated reference memory in the digital processor (Step 1120). A return signal acquisition is then performed with edge transitions accumulated and stored in the dedicated digital processor. At the completion of the acquisition process, the processor initiates a correlation process (Step 1125) and the correlation data is downloaded (Step 1130) into the processor memory. The correlation data is then processed to extract the delay and distance.

Figure 21:
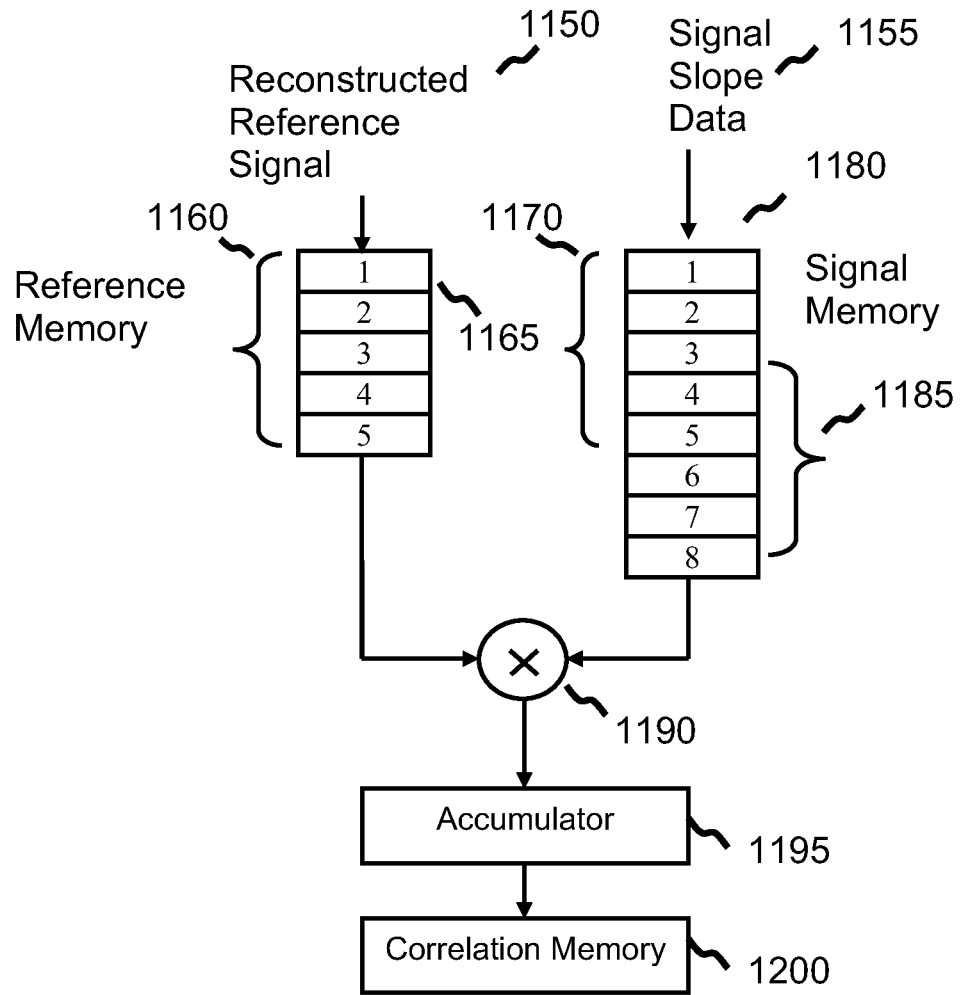
FIG. 21 shows a conceptual block diagram detailing the functional elements of a correlation module.

A conceptual block diagram detailing the functional elements of a correlation module is shown in FIG. 21. A reconstructed reference signal waveform 1150 is stored in sequential elements of reference memory 1160. Accumulated edge difference data 1155 representing signal slope is stored in sequential elements of signal memory 1180. The data stored in the reference memory represents a template or shape signature of the transmitted signal and is assumed to have zero propagation delay. The reference waveform may be based on the integral of signal slope data acquired from the difference of accumulated edges or it may be based on stored comparator logic levels from the reception of a large amplitude reference signal. In either case, the waveform is normalized to plus and minus one. The process of correlation involves sliding the stored reference or template data set through a longer data set of stored signal data. In this example, the reference memory has five elements 1165 with locations labeled 1 through 5. Within the signal memory, a matching block 1170 is identified. To provide the first correlation data point, elements 1-5 are multiplied directly with corresponding elements 1-5 in the signal memory. Multiplier 1190 provides a fixed point or floating point product of these elements which are accumulated by accumulator 1195. At the completion of the product and accumulation of the last pair of elements the accumulation of the 5 pairs of elements are stored in an address within correlation memory 1200. On the next correlation accumulation cycle, the reading of the reference memory is repeated beginning with the first element while the base address of the base address of the matching block in signal memory is incremented by one. The correlation process is completed when the last element of the signal memory is reached at the end of a correlation data point processing cycle. A portion of signal memory identified by 1185 illustrates the location of the last block of data correlated using this process.

Figure 22:
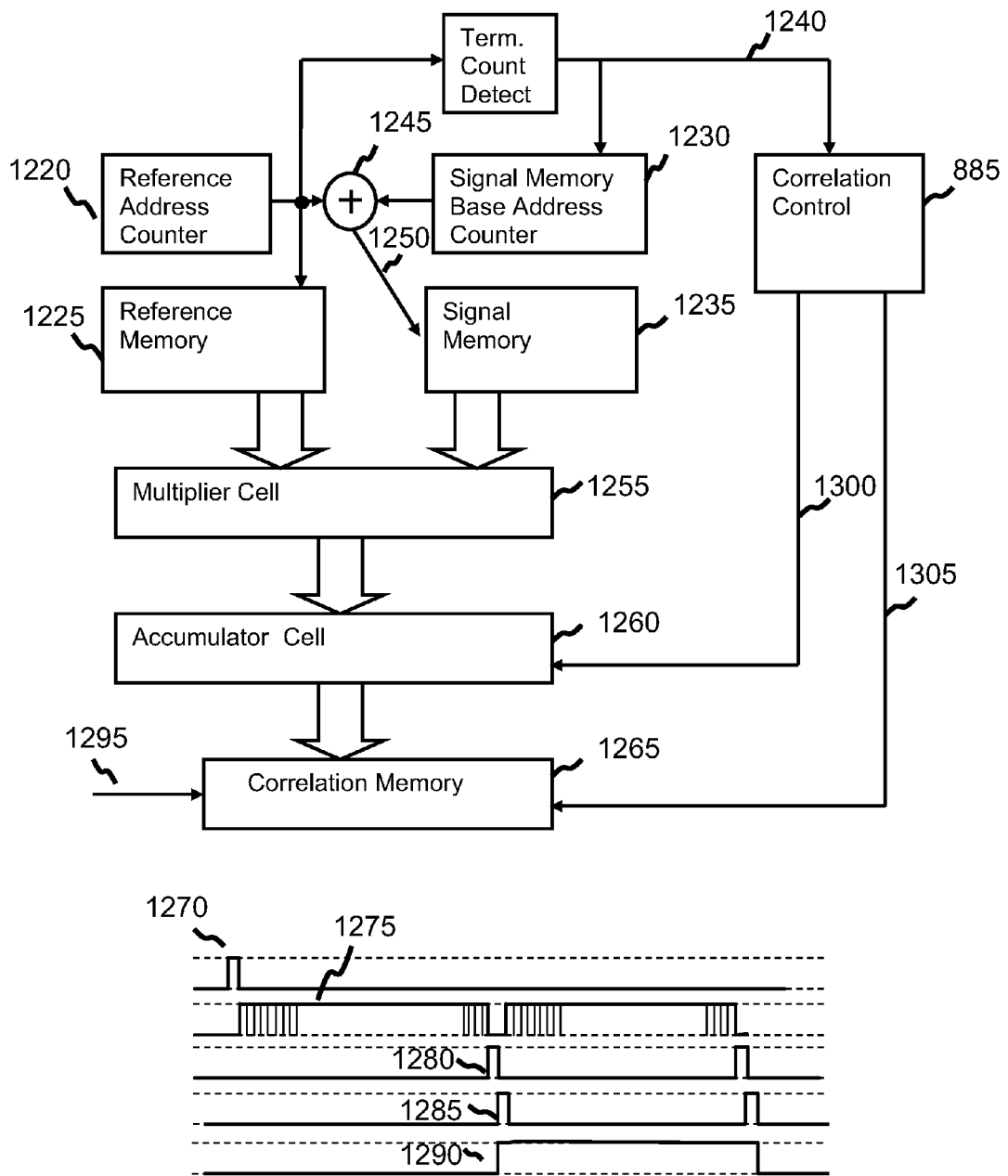
FIG. 22 details a functional block diagram and timing waveforms for a practical implementation of the correlation function.

FIG. 22 details a block diagram and timing waveforms for a practical implementation of the correlation function. Prior to the correlation data from the acquisition of signal and reference are stored in signal memory 1235 and reference memory 1225 respectively. At the beginning of the process a clear signal initializes reference address counter 1220, signal memory base address counter 1230, and the summation value stored in accumulator cell 1260. The clear signal is shown as a positive going pulse of waveform 1270. The correlation process begins with the initiation of a counting sequence in the reference address counter shown as waveform 1275. Adder 1245 adds the reference address with the base address of the signal memory counter to obtain signal memory address 1250. The contents of the reference memory and a block of data within the signal memory are read sequentially, multiplied and accumulated until the terminal count of the reference memory is reached. Terminal address comparator detects the last address and provides a signal 1240 indicating the end of an accumulation cycle. The final count signal initiates the incrementing of the signal memory base address and initiates a write command 1305 from the correlation control element 1290, transferring the contents of the accumulator to the correlation memory. The write signal is shown as a positive going pulse in waveform 1280. The transfer of data to the correlation memory coincides with the clearing of the accumulator initiated by clear signal 1300 shown as positive going pulse 1285. The address used to store data in the correlation is the signal base address 1295. Waveform 1290 shows the change of state of the lowest significant bit of the signal base address in response to the reaching of the terminal count of the reference address counter. This process is repeated until the final element is reached in the signal memory.

Due to the large signal record sizes encountered when processing long range windows, signal correlation processors with parallel processing cores may be desirable. The advantage of the processing of multiple correlation data points in parallel is decreased correlation processing time or to reducing the required clock rate to support a given update measurement rate.

Figure 23:
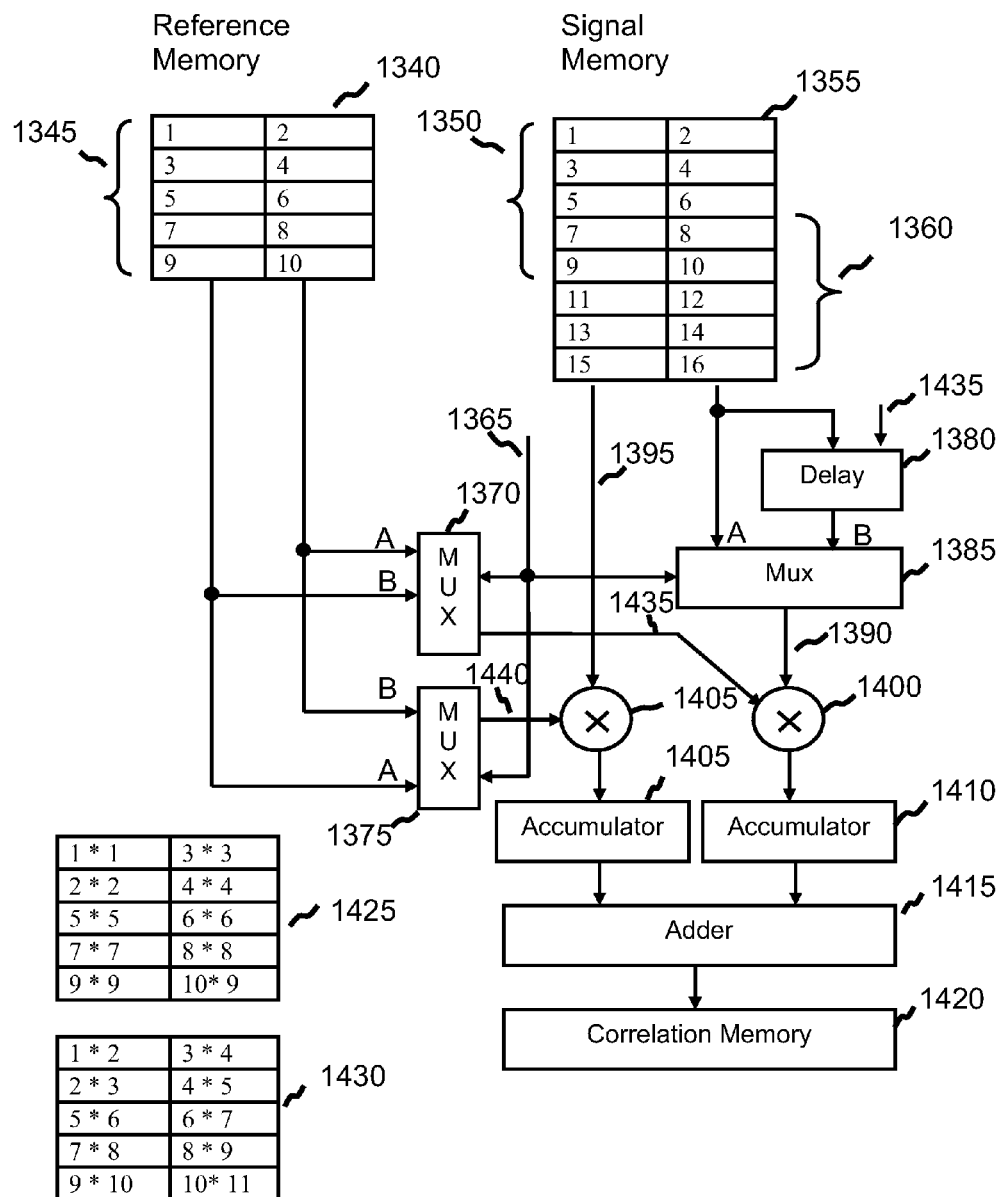
FIG. 23 shows an example of a correlation processor implementing more than one multiplication and accumulation per calculation cycle.

FIG. 23 shows an example of a correlation processor implementing more than one multiplication and accumulation per calculation cycle. Reference memory 1340 is organized with a wide word size to allow the storing of two successive reference waveform elements at a specific address. The reference memory can be implemented using a dual-port memory with a write word size half the read size or the data can be packed into a larger word size using a data multiplexer and a pair of latches to create a larger word size. The signal memory 1355 is also organized with two data points per addressed word. Operation is similar to the previous single channel example, with the contents of the reference memory and a block of data within the signal memory are read sequentially, multiplied and accumulated until the terminal count of the reference memory is reached. Modifications are necessary to maintain proper alignment between the reference and the signal memory data values when the signal memory has an odd numbered base address.

If the signal memory has an even numbered base address, such as in the beginning of a correlation cycle, a ten element block of correlation reference data 1345 aligns with a corresponding segment of signal data identified as block 1350. The least significant bit of the signal memory base address 1365 selects the A inputs of multiplexers 1370 and 1375. This forwards the first element of the reference memory to multiplier input 1440 and the second element to multiplier input 1435. The signal memory base address references the $1^{st}$ and $2^{nd}$ signal elements which are passed to multiplier input 1395 and, through the A input of multiplexer, to multiplier input 1390. Multipliers 1400 and 1405 multiply the presented elements which are accumulated in separate accumulators 1405 and 1410. Adder 1415 combines the two accumulator values and that result is stored in correlation memory 1420 at the completion of the summation process of the partial products. Table 1425 shows the memory address location of elements multiplied during this first sweep of the reference through a section of signal memory. At the beginning of every "even" processing cycle, the $2^{nd}$ element at base address is saved for use in the next "odd" accumulation cycle in delay latch 1380 by disabling the delay latch for the remainder of the correlation cycle.

On odd correlation processing cycles, i.e. the base address of the signal memory has an odd numbered value, the data locations in the signal memory are not properly aligned with elements of the reference memory. On odd cycles, when the least significant bit of the signal base address is one, both the reference and the signal multiplexers pass the B input. The selection of the B input on the reference multiplexers reverse element order passed to the multipliers. On the signal path the signal multiplexer takes a one cycle delayed value except for the first cycle where has stored the data value from the previous base memory address. Thus the data element order from the reference path follows 2-1, 4-3, 6-5, 8-7 and 10-9. The data element order for the signal memory follows 3-2, 5-4, 7-6, 9-8 and 11-10. The products of the first odd accumulation cycle are shown by table 1430.

Figure 24:
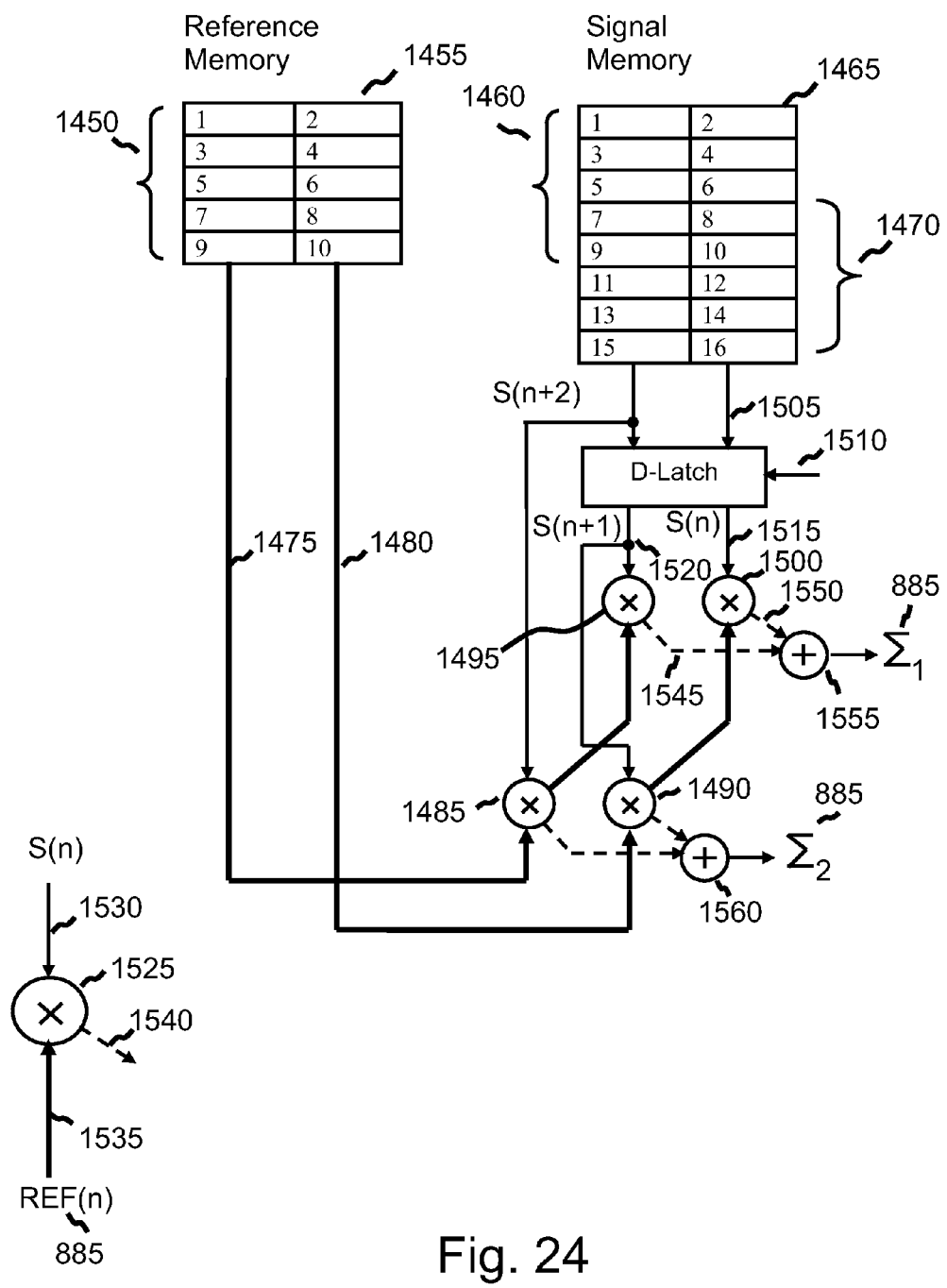
FIG. 24 shows a simplified example correlation processor using four multipliers to handle all the product terms.

A simpler configuration for the correlation processor using four multipliers to accumulate product terms associated with two correlation function values is shown in FIG. 24. Implementation of more than two parallel processing channels requires a change in the processing architecture due to the increasing complexity of properly ordering of the signal and reference data presented to the multipliers. The storage of two words packed into each memory address for both the reference and signal memories are maintained from the previous two channel example. Four product terms, calculated from the data addressed in each memory location, are calculated resulting in the simultaneous calculation of two successive correlation data points. A ten element block of correlation reference data 1450, aligns with a corresponding segment of signal data block 1465. Left side words in the reference memory feed to multipliers 1485 and 1495 along signal path 1475. Right side elements follow signal path 1480 to multipliers 1490 and 1500. The signal memory outputs feeds data storage latch 1505 that is clocked 1510 to provide a 1 cycle delay for the data fed to associated multipliers. The latch allows signal elements n, (n+1) and (n+2) where n is the last signal memory address to be present to the multiplier array. Due to the delay of the data storage latch the address counter associated with the signal memory needs to lead the reference memory counter by one clock cycle. A representative multiplier cell 1525 takes the product 1540 of a reference data value 1535 and a signal data value 1530. The terms of the first pair of product terms 1550 and 1545 are accumulated by adder cell 1555. At the end of the accumulation cycle, the accumulated sum of the product terms of signal pairs n and (n+1) and the reference data are stored as a the first correlation data value. The second pair of product terms is accumulated by adder cell 1560. The accumulated sums of these terms correspond to the product of signal pairs (n+1) and (n+2) with the reference data and are stored as a second correlation data value.

Figure 25:
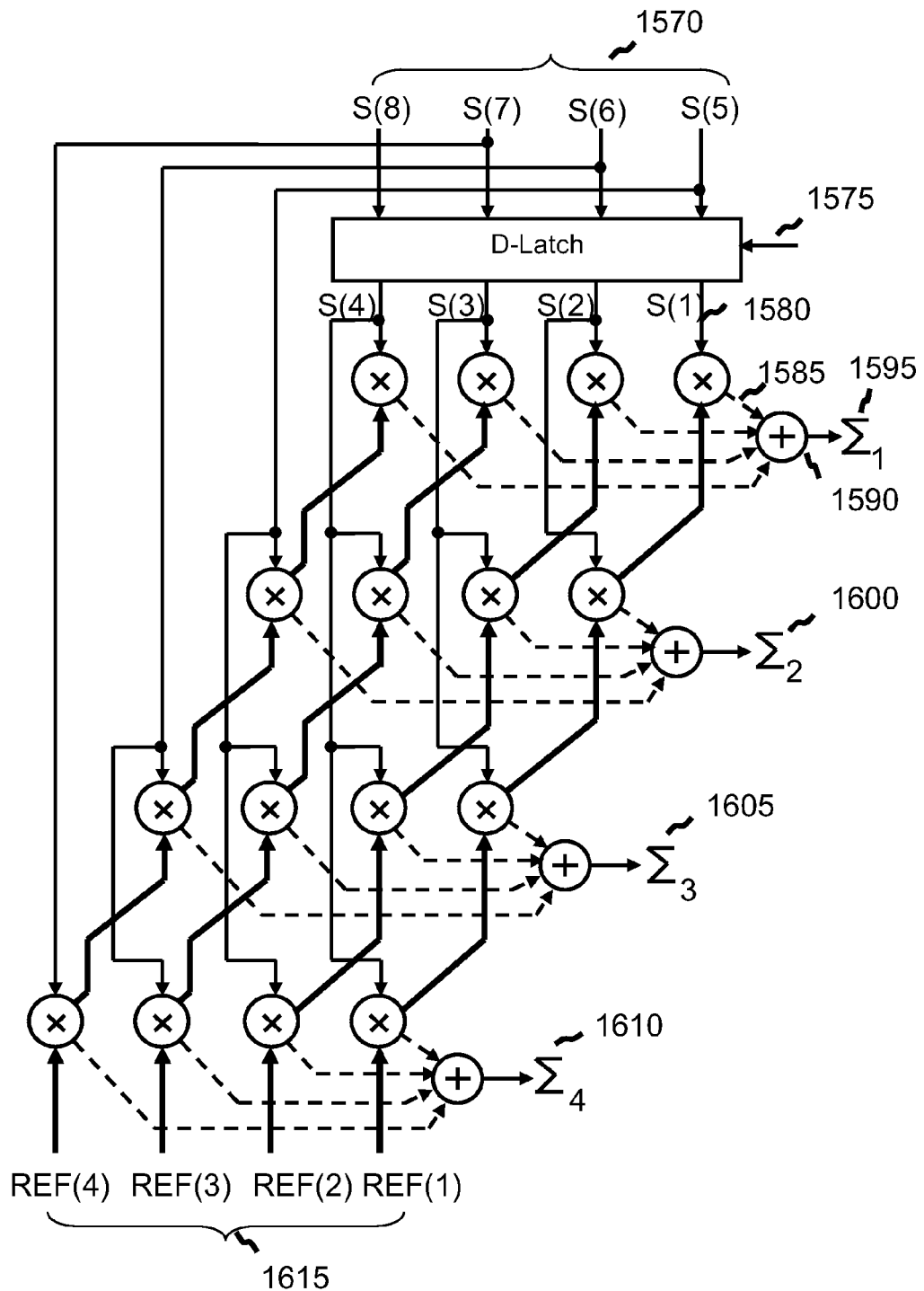
FIG. 25 shows a multiplier and accumulation array for processing four reference and signal values simultaneously.

FIG. 25 shows a sixteen core multiplier and accumulation array for processing four reference and signal data values simultaneously. The four parallel data values from the signal storage memory 1570 are captured by signal storage latch 1575. The signal data at the latch output 1580 labeled S(1), S(2), S(3) and S(4) represent four data values from the previous signal memory address. The values labeled S(8), S(7), S(6) and S(5) at the input of the latch represent four data values from the present signal memory address. Reference data elements 1615 labeled REF(1), REF(2), REF(3) and REF(4) reflect data elements at the present reference memory address. The reference data passes to the four groups of multiplier arrays, each accumulating a correlation data point. Four products are accumulated by an adder 1590 and at the completion of an accumulation cycle reflect the first of 4 correlation data points. Accumulations 1600, 1605 and 1610 reflect values associated with the second through fourth correlation data points respectively.

Figure 26:
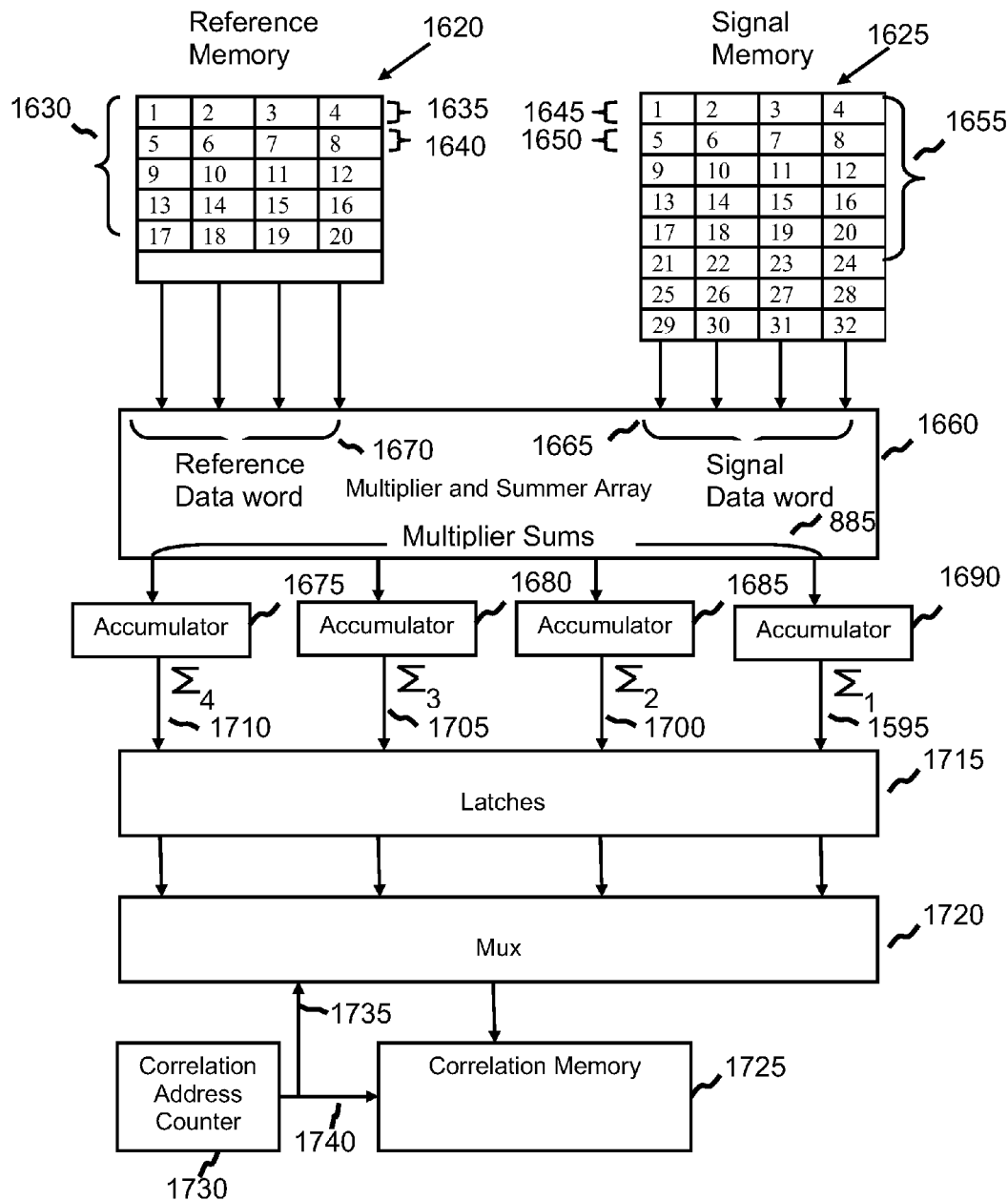
FIG. 26 illustrates a correlation module incorporating a sixteen core multiplier and accumulation array to process for correlation values simultaneously.

FIG. 26 illustrates a correlation module incorporating a sixteen-core multiplier and accumulation array to process four correlation values simultaneously. Reference memory 1620 stores four values within each addressed memory location 1635 and 1640. Signal memory 1625 also packs four signal data elements in each word 1645 and 1650. The reference memory block 1630 is shown as five elements deep by four elements wide for a total data length of twenty elements. A corresponding segment 1655 of twenty signal elements of the signal memory represent a sliding window over which each correlation cycle is performed. The parallel outputs of the reference memory provide four reference data points 1670 for the multiplier and accumulator array. The four corresponding four elements of the signal array are labeled 1665. The multiplier and accumulator array 1660 incorporates sixteen multiply and accumulate elements to provide four multiplier sum values. Four accumulators 1675, 1680, 1685 and 1690 produce four successive correlation values which are captured by latch 1715 at the end of each accumulation cycle. The latched correlation data values are written to the correlation memory 1725 through four input multiplexer 1720 over four successive counts of the correlation address counter 1730. The multiplexer address 1735 uses the two least significant bits of the correlation memory address 1740.

A substantial reduction in the complexity of correlation processor can be achieved by performing the correlation at the completion of each signal acquisition and accumulating the correlation results. The logic complexity of associated performing a multiplication roughly goes up with the square of the word size. A simple 2-bit multiplier required for multiplying a normalized +/−1 value of a reference signal with a positive rising value or negative falling edge value of the external signal results in a roughly thirty-fold reduction in multiplier core complexity. The multiplying the reference and signal on each acquisition reduces the size of signal and reference memories by four times assuming 2 bits are required for each reference and signal value. An additional factor-of-two reduction in signal memory size can result from storing the raw comparator data rather than performing the signal edge determination prior to memory storage.

Figure 27:
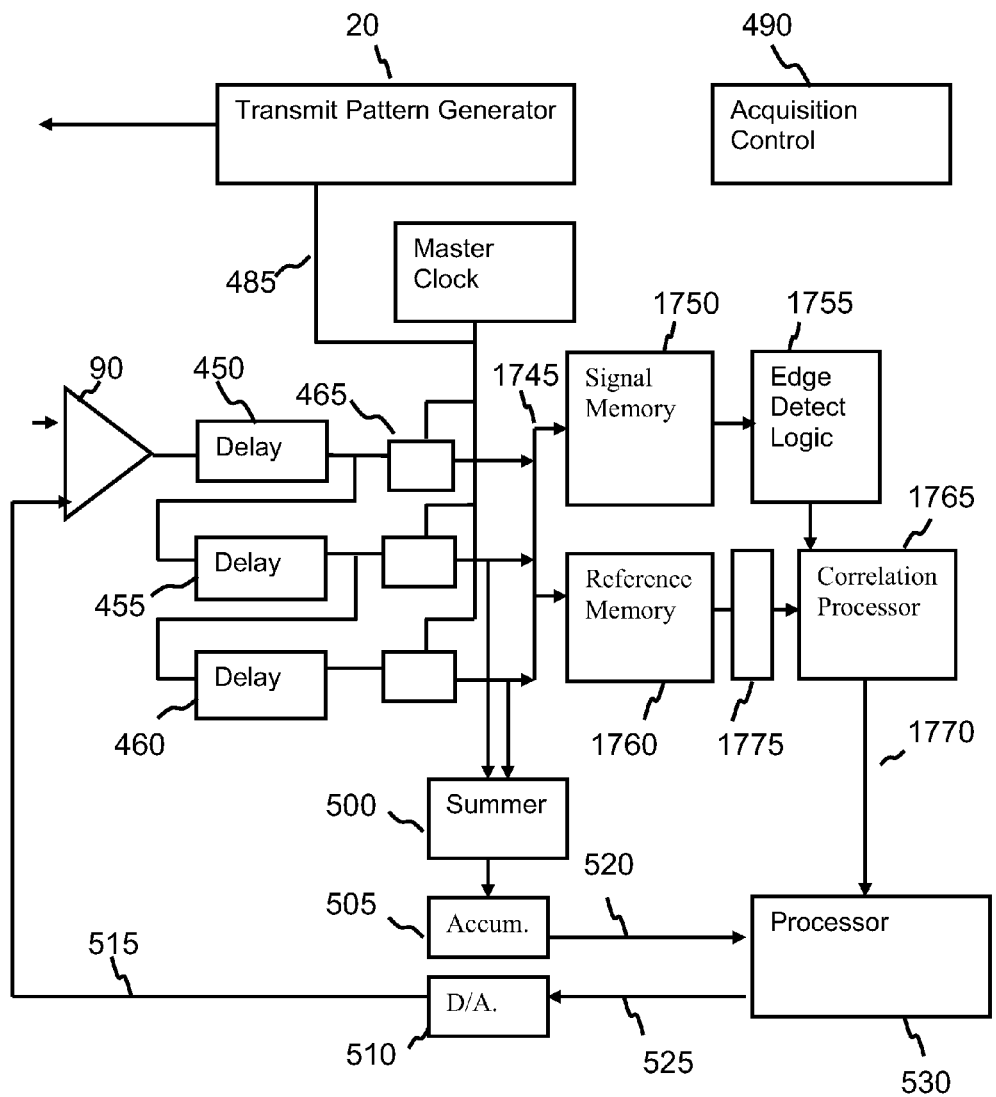
FIG. 27 shows a block diagram of a reduced complexity edge-based sampler incorporating a correlation processor capable of performing a correlation after each signal acquisition cycle.

FIG. 27 shows a block diagram of a reduced complexity edge-based sampler incorporating a correlation processor capable of performing a correlation after each signal acquisition cycle. In this implementation, sampled delay line latched outputs 1745, are stored directly into a single-bit width signal memory 1750 or reference memory 1760. The reference memory may be updated during the beginning of the signal acquisition process and maintained as constants over multiple acquisition periods or updated prior to each signal acquisition. At the completion of each signal acquisition the signal memory and reference memories are read into the correlation processor to provide data values for the correlation process. Data outputted from the signal memory first must be translated into edge transition states by edge detect logic 1755 while data from the reference memory is mapped from 0 and 1 binary states to +/−1 valued 2-bit data. Within the correlation processor, reference values are multiplied by the signal edge states and accumulated to generate a correlation waveform after each acquisition. These acquisitions are then added and stored with previous correlation data sets until all the signal acquisitions are complete. Correlation memory output 1770 allows the processor to determine the delay and range information from the correlation waveform zero crossings.

Figure 28:
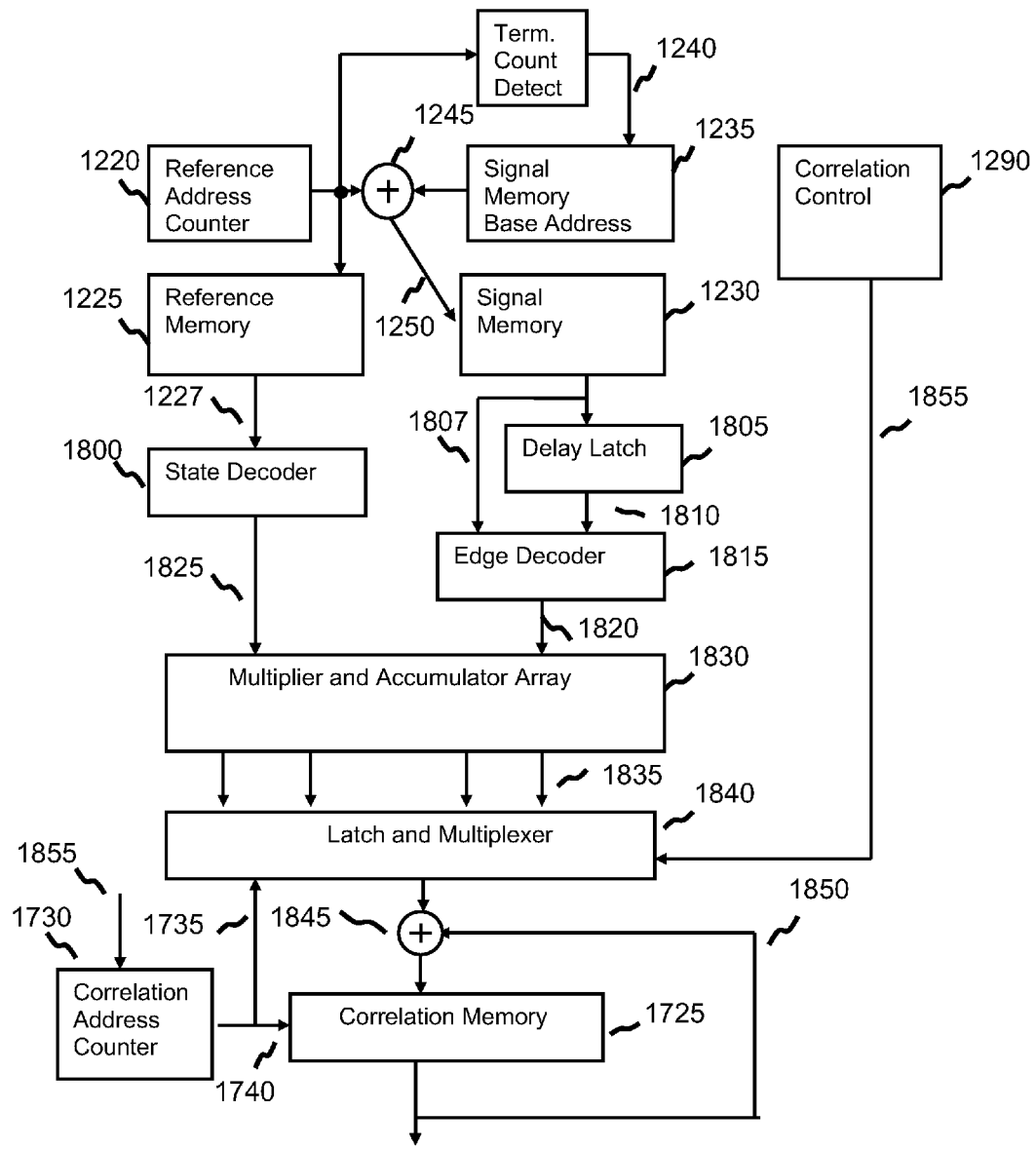
FIG. 28 shows a block diagram reduced complexity edge-based sampler detailing memory addressing.

FIG. 28 shows an updated block diagram of the reduced complexity edge-based sampler detailing signal and reference memory addressing and control. As in described in previous examples, prior to the beginning the correlation process single-bit data from the acquisition of signal and reference are stored in signal memory 1230 and reference memory 1225 respectively. At the beginning of the process, reference address counter 1220, signal memory base address counter 1235, and the accumulators within multiplier and accumulator array 1830 are cleared. The correlation process begins with the initiation of a counting sequence in the reference address counter. Adder 1245 adds the reference address with the base address of the signal memory counter to obtain signal memory address 1250. The contents of the reference memory and a block of data within the signal memory are read sequentially with the data outputs feeding the reference state decoder 1800, data latch 1805 and edge decoder 1815. The state decoder translates the binary output of the reference into +/−1 value. The edge decoder takes the present and previous state of the signal memory and storage latch to decode signal edges. The edge states 1820 and signed reference data 1825 feeds a multiple cell the multiplier and accumulator array 1830. The sum of multiple correlation data points 1835 are accumulated until the terminal count of the reference memory is reached. Terminal address comparator detects the last address and provides a signal 1240 indicating the end of an accumulation cycle. The final count signal initiates the incrementing of the signal memory base address and initiates a write command 1855 from the correlation control element 1290, transferring the contents of the accumulator array into the correlation latch and multiplexer 1840. The transfer of data from the correlation latch and multiplexer to the correlation memory requires the summation of multiple accumulated correlation values with the sum of previous correlations stored in the correlation memory. The latching of values into the multiplier initiates operation of correlation address counter 1730 from its present count value. Multiplexer address 1735 uses one or more of the least significant bits of the correlation memory address 1740 with the number of multiplexer bits depending on the number of sequential correlation values reflected the multiplier outputs. Beginning at the first correlation counter address, the contents of the correlation memory is added to a correlation data point based on the multiplexer address. Incrementing the correlation address counter continues until all of the multiplexer inputs have been addressed. At the completion of a correlation memory update cycle, the counter terminates at the next correlation address waiting for the completion of accumulation the next set correlation data points. This process continues until the final address of the correlation memory is reached, terminating the correlation processing cycle until the completion of the next signal acquisition. Prior to the beginning of the signal and reference acquisitions, the correlation memory and correlation address counter are cleared.

An inadvertent effect of the single-bit encoding of the reference is the introduction of high frequency component into the correlation waveform, increasing the noise floor and decreasing the probability of identifying the correct correlation peak and its associated zero crossing at low signal-to-noise ratios. Previously the reference was reconstructed waveform from the accumulated edge transitions reflecting the transmitted pulse shape with signal transitions edges reflecting the rising and falling slope of the optical signal along with softening due to the limited bandwidth of the optical receiver. The abrupt transition from minus one to plus one, or its inverse, from the threshold detection of a relatively strong reference signal introduces high frequency content to the reference waveform. This added frequency content can by removed by manipulating the rising and falling edge of the reference signal to soften the edges or this added noise can be filtered prior to, during, or after the processing of the correlation waveform.

Figure 29:
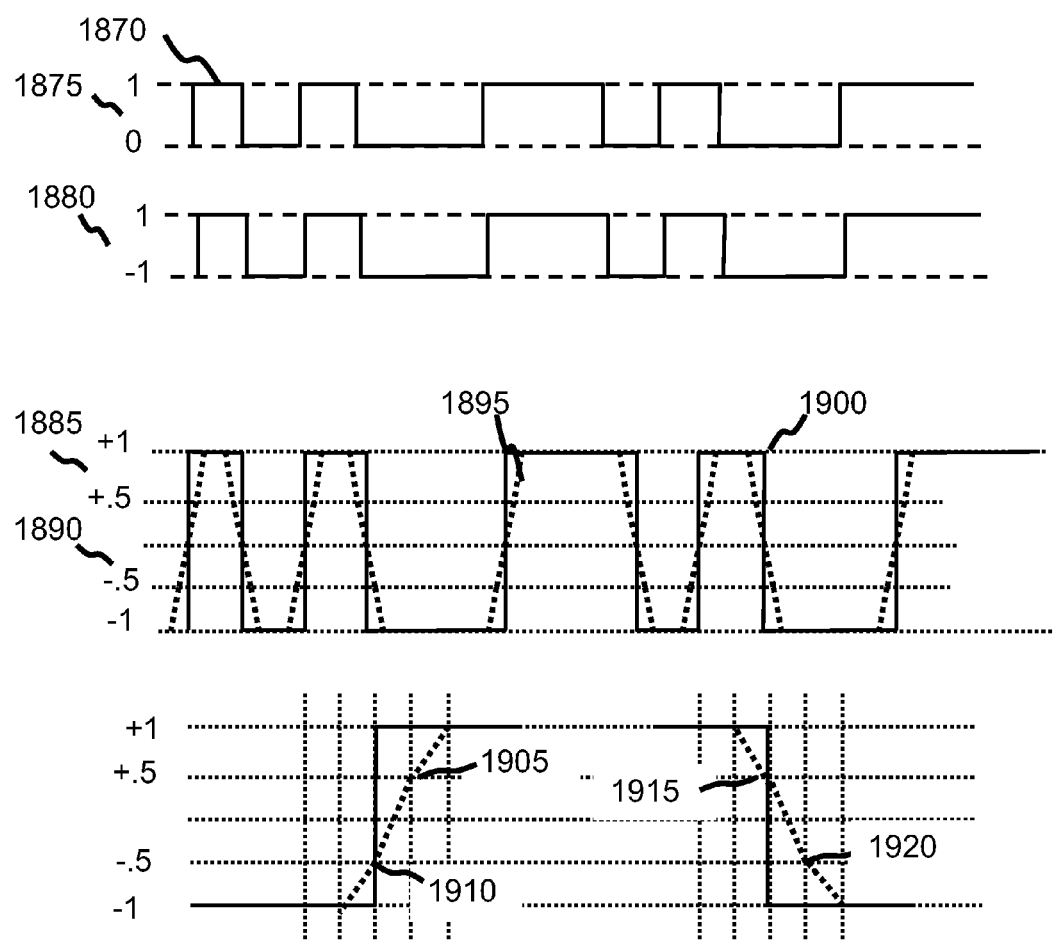
FIG. 29 illustrates a modified reference decoding process to introduce sloped edge transitions to reduce high-frequency reference signal content prior to correlation.

FIG. 29 illustrates a modified reference decoding process to introduce sloped edge transitions to reduce high-frequency reference signal content prior to correlation. Waveform 1870 is representative of the raw binary data output of the reference memory. The zero and one states of the data 1875 are first translated to plus and minus values shown in waveform 1880. This plus and minus normalized signal 1900 is shown with dotted line waveform 1895 with sloped edges between pulse and minus transitions. Intermediate amplitude values 1885 and 1890 reflect pulse or minus 0.5 respectively. At each rising or falling edge, intermediate data values are introduced to create a sloped edge that introduce added delay which shows up as a fixed delay offset in the correlation that can be eliminated during the delay estimation process. On a rising edge, the negative one value prior to the positive-one state is changed to minus 0.5 data point 1910. The positive one value at the transition is changed to 0.5 at data point 1905. Conversely on the falling edge, data points 1915 and 1920 mark changed positive 0.5 and minus 0.5 values respectively. The interpolation of data values at the edge transition can be produced using a state-decoder which uses the present and previous reference data values to substitute transition data points at locations suitable for value substitution. In practice, the interpolated waveform is amplitude scaled to pulse or minus two so the interpolated values can be scaled to pulse or minus one for fixed point integer multiplication and accumulation.

Figure 30:
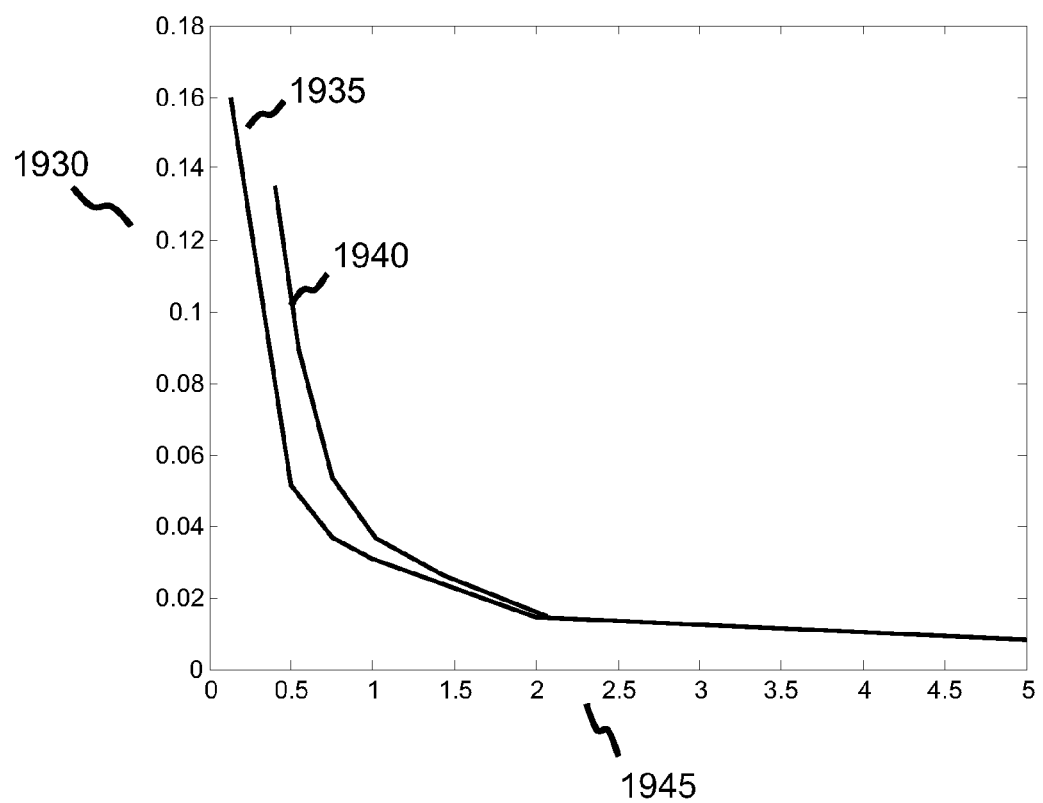
FIG. 30 shows plots of input signal-to-noise verses root-mean-square distance measurement error for correlation based distance calculation using abrupt and softened reference signal edges.

FIG. 30 shows plots of input signal-to-noise verses root-mean-square distance measurement error for correlation based distance calculations using abrupt and softened reference signal edges. The x-axis shows received signal-to-noise ratio at the input signal comparator while the y-axis represents root-mean-square distance measurement error in meters. The calculation is based on a 500 nsec long. 32-bit correlation sequence repeated 64 times with a receiver bandwidth is 100 MHz. Graph 1940 represents the measurement error without reference edge softening while graph 1935 reflects the improvement in both the measured distance error and the ability to detect the correlation zero-crossings at very low signal-to-noise ratios. With edge softening the correlation was able to detect a valid distance at roughly half the minimum signal-to-noise of the un-softened edge example.

Figure 31:
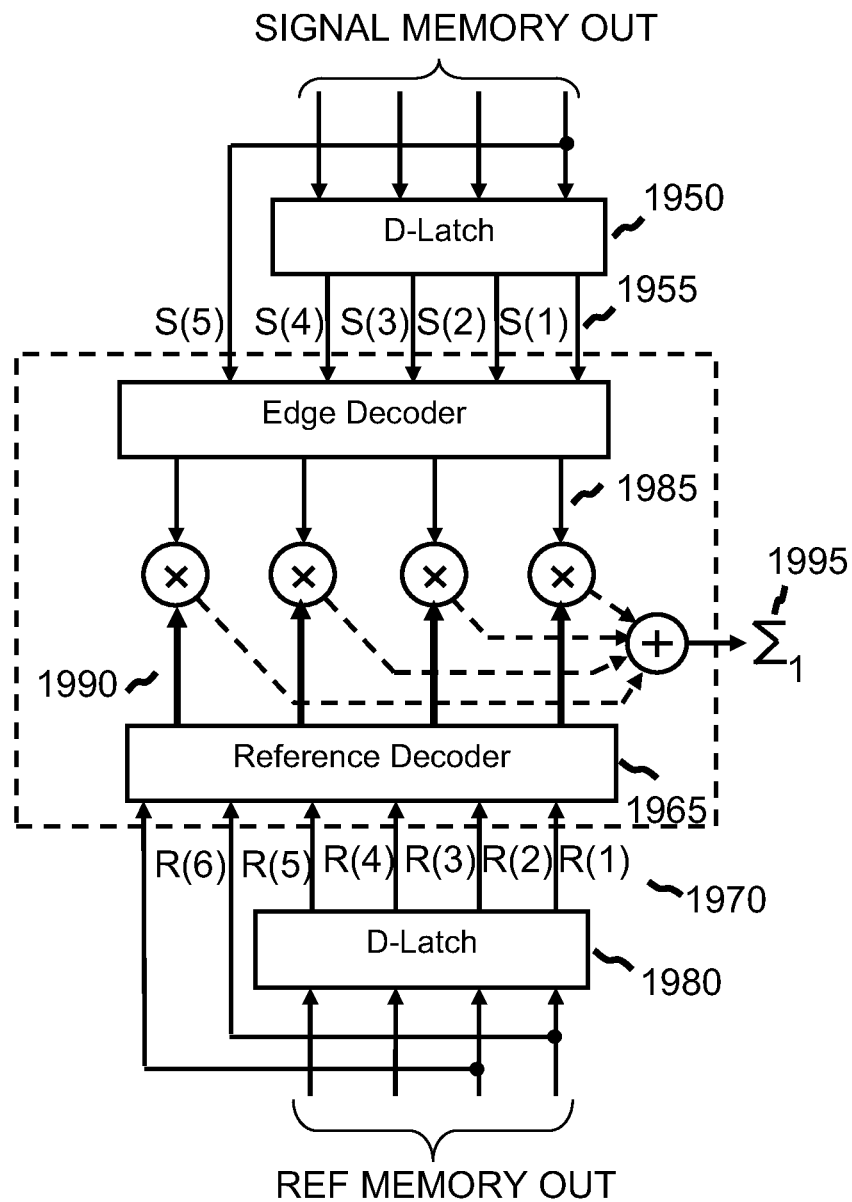
FIG. 31 shows a block diagram of an array of four multiplier cells, edge and reference decoders required to produce and sum the partial products of one correlation data point.

State reduction techniques can be used to reduce the complexity of the multiplier arrays by combining multiplier output states with the reduced states associated with edge extraction the pre-processing of reference data. State reductions can be of great benefit due to a reduced number of binary output states expected based on the characteristics of the reference and external signals. FIG. 31 shows a block diagram of an array of four multiplier cells, edge and reference decoders required to produce and sum the partial products associated with one correlation data point. Signal data latch 1950 presents the previous output state of the signal memory output data which is combined with the earliest present data point to present 5 consecutive signal data samples 1955 to edge decoder 1960. The edge decoder uses the difference in sequential data samples to determine edge status. The edge decoder presents the rising or falling edge state of this the signal data set through multiplier inputs 1985. The output of the reference memory is delayed by reference data latch 1980 and combined with two of the present values to form 6 consecutive reference data points 1970 to the reference decoder 1965. The decoded amplitude states of the reference data 1990 feeds the other input of the multiplier cells. The sum of these four product states are presented in signal output 1995.

Figure 32:
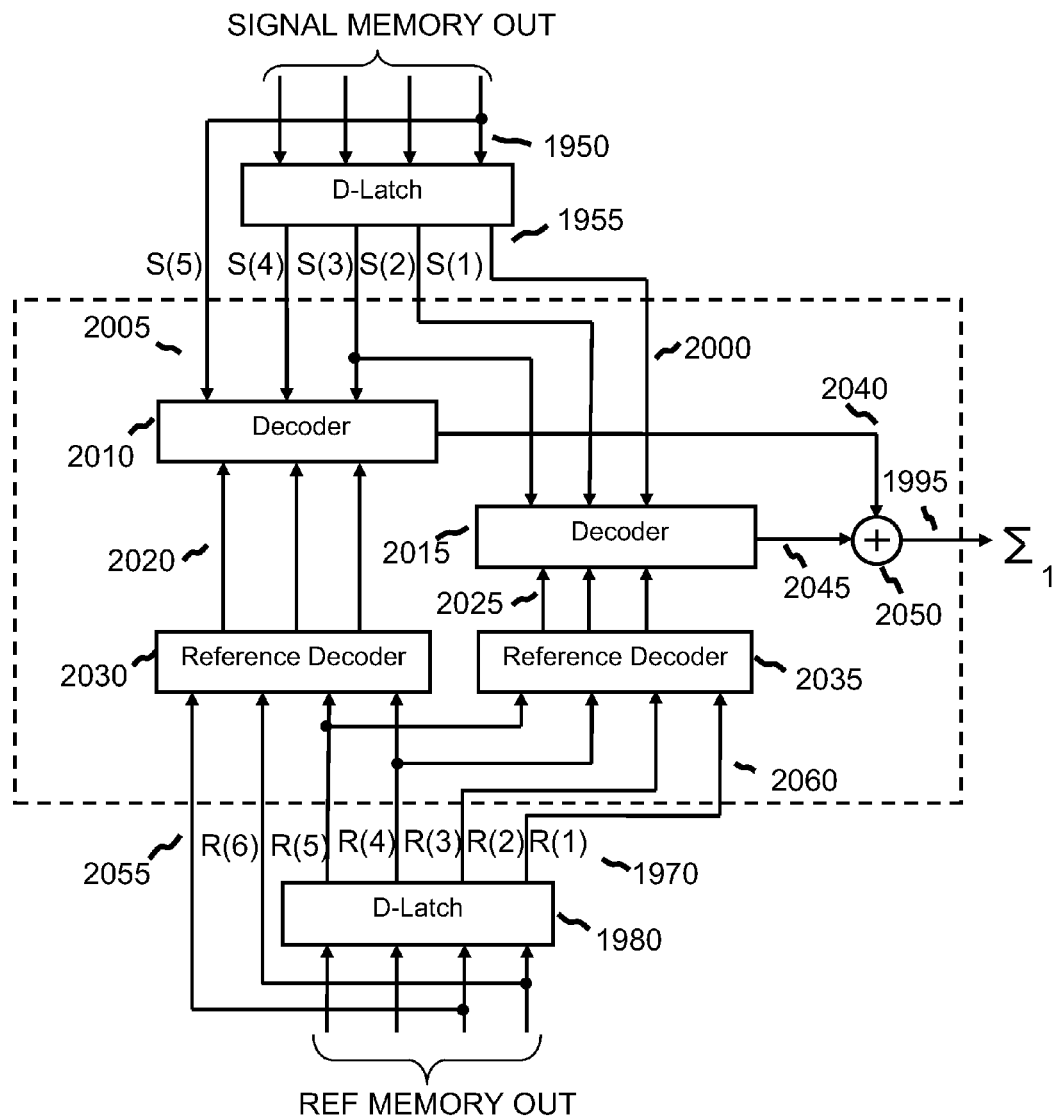
FIG. 32 shows a block diagram illustrating the use of decoders to process signal edge status, reference waveform softening and partial products generation.

FIG. 32 shows a block diagram illustrating the use of state decoders to process signal edge status, reference waveform softening and partial products generation. Five consecutive data states of the signal memory, split into two groups of three data points 2000 and 2005, feed two edge state and partial product multipliers decoders 2010 and 2015. Each decoder generates the sum of two partial products shown as signal 2040 and 2045 which are summed together by adder 2050. The partial product decoders have 3-bit outputs and 64 input states resulting from the combination of a three-bit reference decoder output and three bits of the signal memory output. The six consecutive reference memory data points 1970 are split into two groups of four data points 2055 and 2060 to feed reference decoders 2030 and 2035 respectively. The reference decoders each process two reference data points, but require a data point before and after to properly decode the waveform state. The reference decoder compresses four consecutive reference data points into 3-bits or 8 unique output states. Reference decoder outputs 2020 and 2025 feed the two multiplier decoders.

Figure 33:
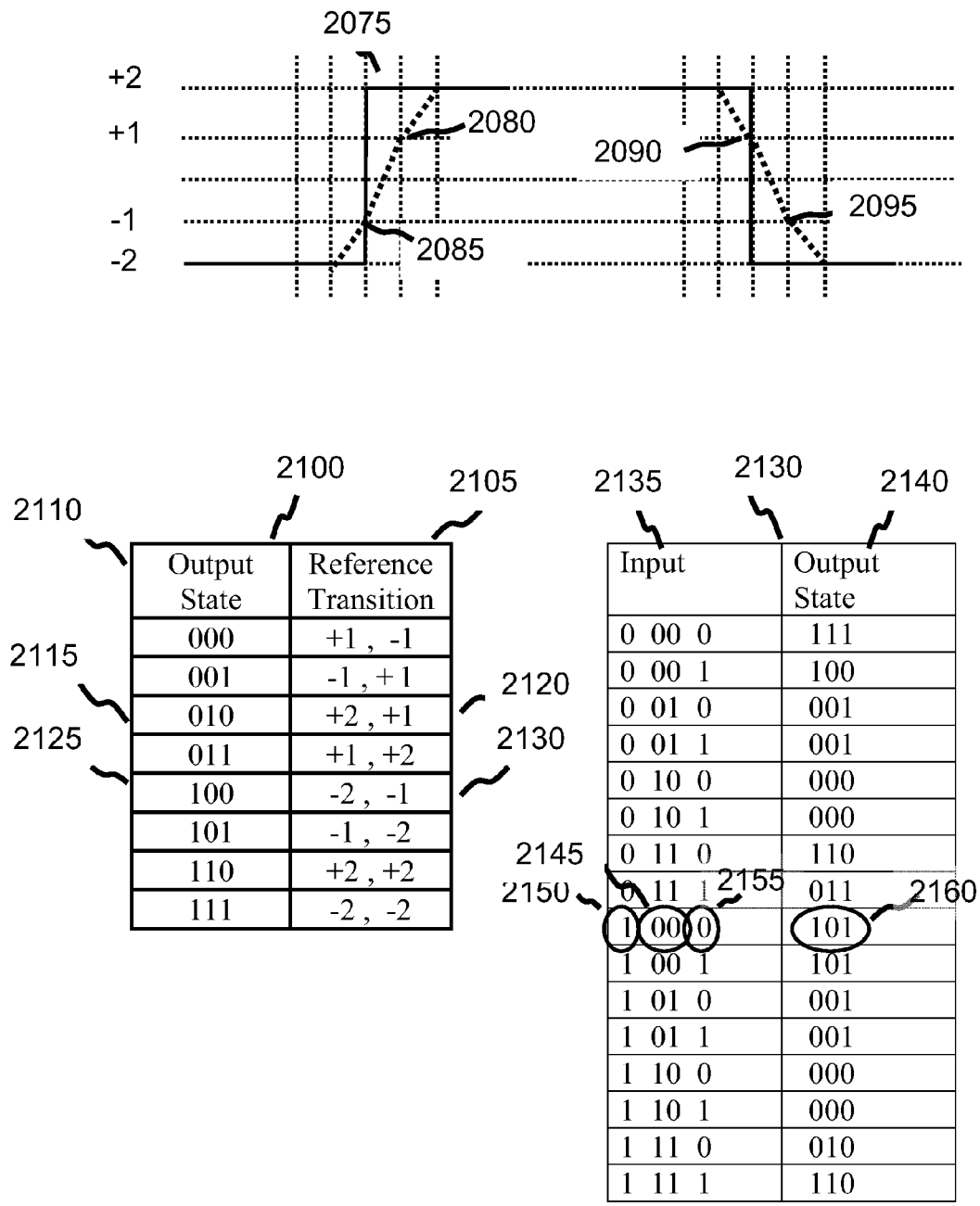
FIG. 33 illustrates the syntheses of reference decoder input and output states based on an example reference waveform.

FIG. 33 illustrates the syntheses of reference decoder input and output states based on an example reference waveform. Original reference data shown by solid line 2075 illustrates a case of a rising and falling edge transition. The waveform has been scaled been scaled to +/−2 to reflect the desired output after decoding. On a rising edge, the dotted line represents the desired shape produced from modifying of data points 2080 and 2085 to a value plus one and minus one respectively. On the falling edge, data points 2090 and 2095 are changed to plus one and minus one. The output state table 2100 shows the decoder output state 2110 for a given reference edge transition 2105. A change of state from +2 to an inserted value of +1 is shown in cell 2120 which has been mapped to a decoder output state of "010" at cell 2115. Another case, a transition from –2 to an inserted value of –1 is shown in cell 2130. The output state for that transition is "100" shown in cell 2125. The decoder input and output state table 2130 shows the relationship between the possible input states of the four-bit input value and the three-bit output state. The input column 2135 presents the 16 possible reference input states while the output state column 2140 shows the mapped output binary state. The input is shown with the earliest reference sample 2155 rightmost bound by the latest sample 2150 on the left. The two bits in the center 2145 represent the two input states associated with the two-bit output. In this example, reflecting a rising reference input has the earliest state of 0 which transitions 1 on the last sample. The output state is "101" 2160 reflecting the substitution of –2 for the $1^{st}$ zero state, and a transition element of –1 associated with the second zero state prior to the one transition.

Derivation of the edge state and partial product multiplier decoder output states are based on the output states associated the 3-bit reference decoder multiplied by the possible edge states reflected in the three bit segment of the signal input. The decoder input is formed by combining into a single 6-bit value, the 3-bit edge state value and the 3-bit reference decoder output state.

Figure 34:
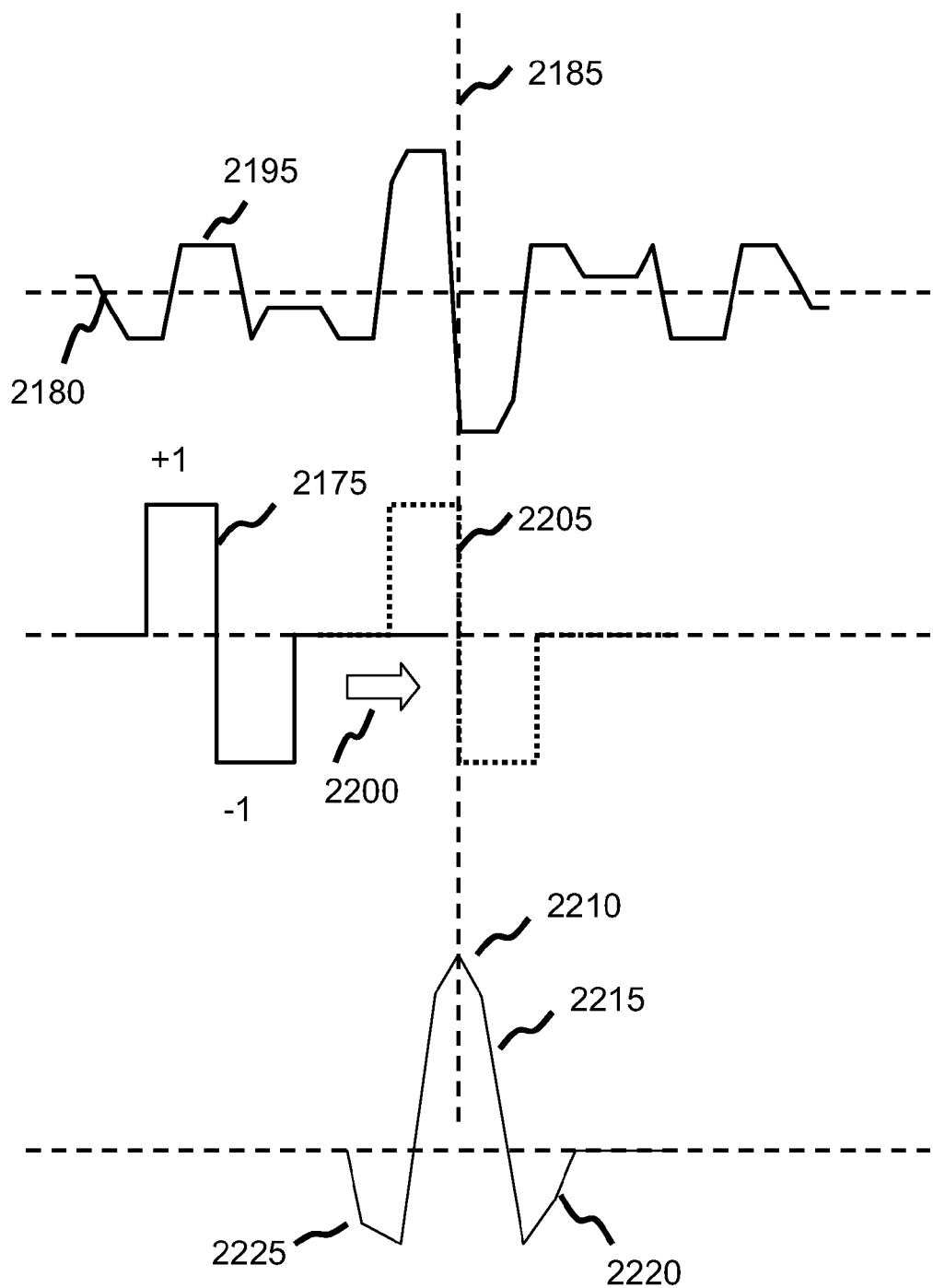
FIG. 34 shows a representative correlation output waveform, matched filter characteristic and filtering result.

FIG. 34 shows a representative correlation output waveform, matched filter characteristic and filtering result. Correlation output waveform 2195 with a correlation match indicated by zero-crossing is shown by vertical dotted line 2185. Side lobe peaks and variation due to noise are present on both sides of the center peak and zero crossing are often large enough to obscure the location of this central peak. The locating of this signal return peak can be broken into two steps: locating the correlation peak within the extent of the signal delay uncertainty and finding the zero-crossing associated with that peak. A filtering wave shape 2175 with normalized values of plus and minus one is "matched" to the bipolar shape of this desired peak response. The wave shape passed through the length of the signal detection widow and for each position the products of matching elements in the correlation waveform and filter wave shape are the accumulated. The sliding process, mathematically known as convolution, is represented in this diagram by arrow 2200. The waveform located below the filter function noted as 2215 represents the response of this matched filtering process near the correlation maximum. Referring back to the filter wave shape, the dotted line filter function with the a falling edge matched with the zero-crossing vertical line produces the largest output in the filter function at peak 2210. As the filtering function is moved above and below the central peak the filter response decreases ending in a pair of roughly matched negative excursions marked as 2220 and 2225. The maximum value of this matched filter response is used to identify this central peak.

Figure 35:
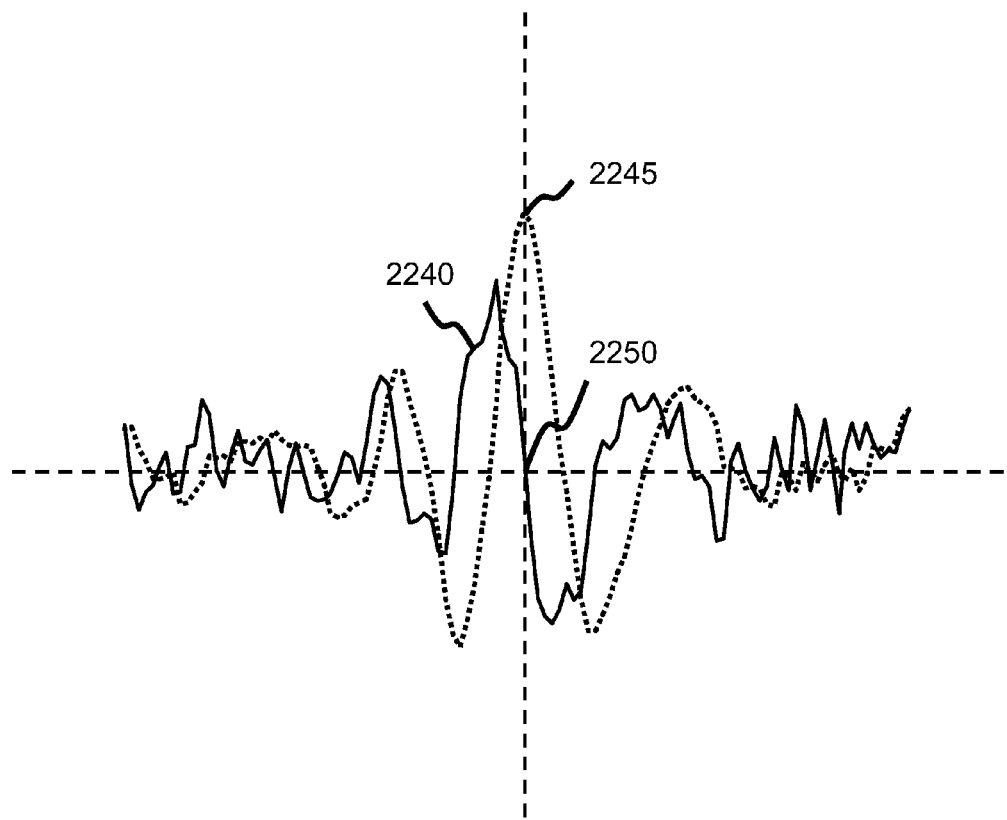
FIG. 35 shows superimposed data of a correlation waveform and an associated scaled filter function output.

FIG. 35 shows superimposed data of a correlation waveform and an associated scaled filter function output. The raw correlation output is shown by solid line waveform 2240 along with the dotted line matched filter response 2245. The data was taken at the small-signal detection of limit at a received signal-to-noise ratio 0.2:1. The filtered waveform is peak detected and the unfiltered correlation zero-crossing can be used for the delay estimation. The filtered waveform is only as approximate location of this peak and defines a narrow search region over which the actual zero crossing 2250 is identified.

Figure 36:
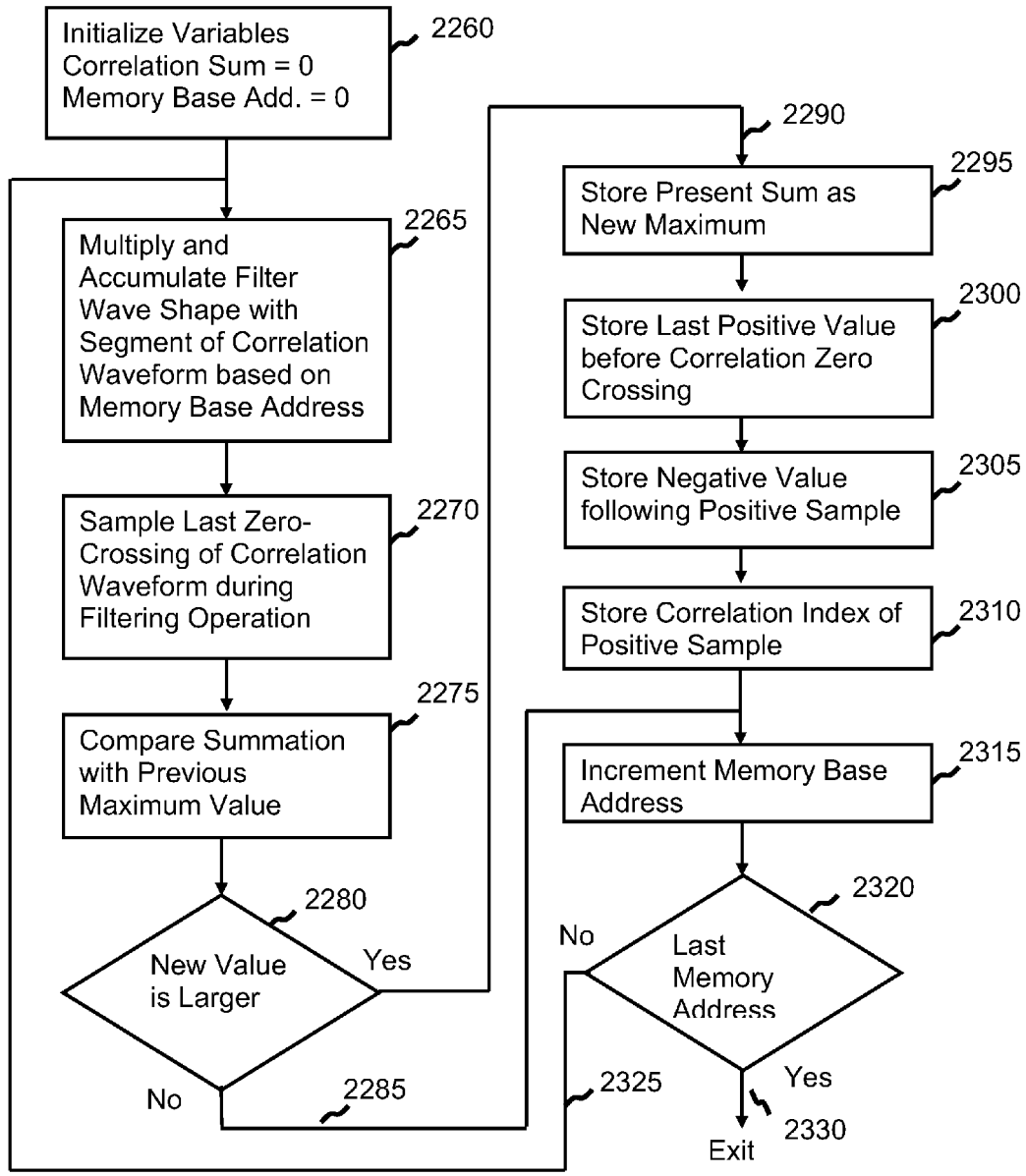
FIG. 36 shows a flowchart of the correlation peak filtering and zero-crossing estimation process.

FIG. 36 shows a flowchart of the correlation peak filtering and zero-crossing estimation process. The correlation memory address is initialized and the filter sum and maximum register output are cleared (Step 2260). The filter function is multiplied and accumulated element-by-element with a corresponding section of correlation memory (Step 2265). The last zero-crossing of the correlation waveform during the filtering operation is sampled (Step 2270). The summation value at completion is compared with the previously stored maximum value (Step 2275) and if the new value is larger 2290, the present sum is stored as a new maximum 2295. In the vicinity of the peak, the last positive and flowing negative value of the raw correlation 2300 and 2305 are stored. The index associated with the last positive value is stored (Step 2310). If the summation value peak value was not higher than the previous maximum value 2285, the storing of peak values, zeros crossings and index values are skipped. At the completion of value storage or determination that a new peak was not reached, the filter sum is cleared and the correlation memory base address is incremented Step 2315. If the final memory is reached the filter process is terminated 2330 and the peak value, positive and negative crossing values and the crossing index are passed to the next processing step for delay estimation. If final correlation address is not reached 2325, the process returns to multiplication and accumulation of the next filter window within the correlation memory.

Figure 37:
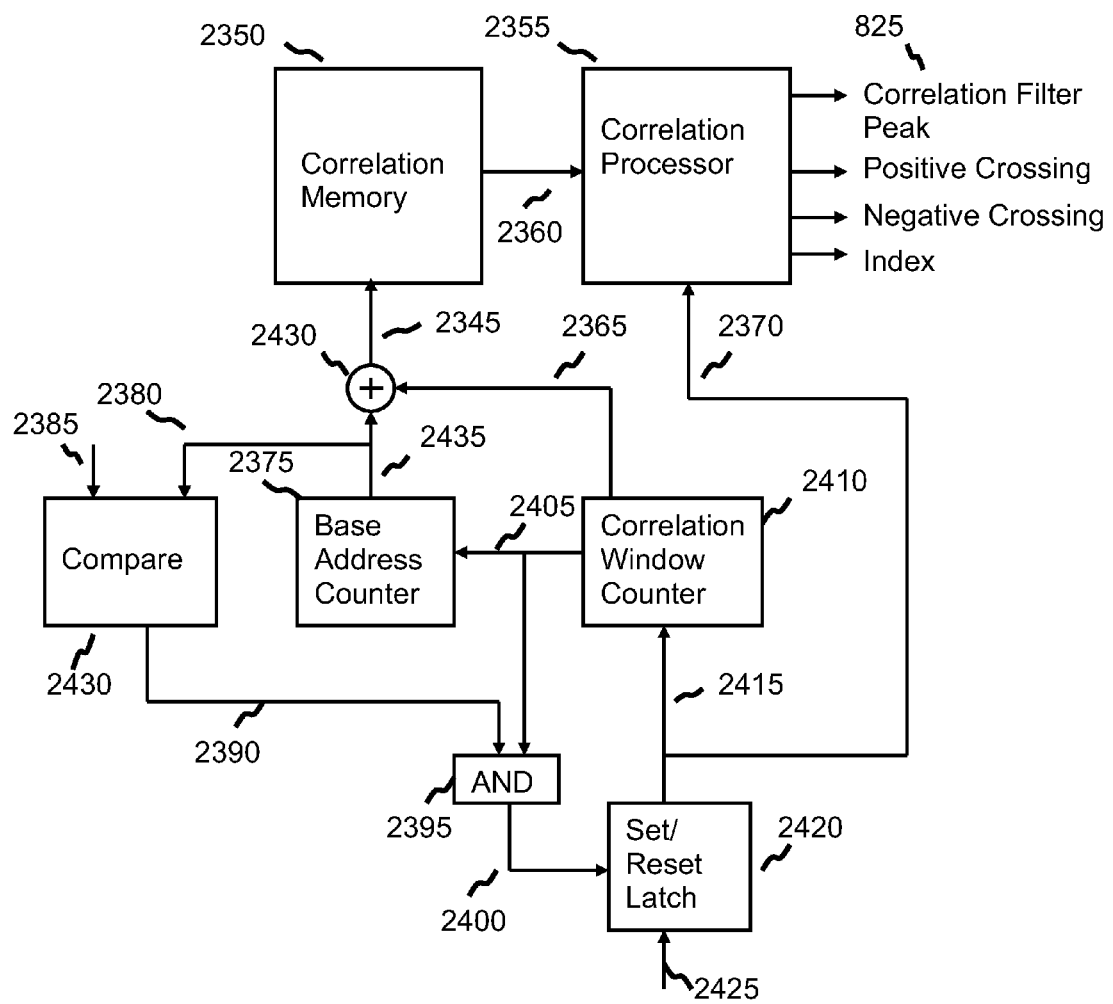
FIG. 37 shows a functional block diagram for controlling the correlation peak filtering and zero-crossing functions implemented in a correlation output processor.

FIG. 37 shows a functional block diagram for controlling the correlation peak filtering and zero-crossing functions implemented in a correlation output processor. To begin the correlation filtering process, a trigger signal 2425 from the correlation controller, sets latch 2420. Correlation window counter 2410 and its output value 2365 are added to the output of base address counter 2375 using adder 2430. Correlation memory 2350, with correlation address 2345, outputs the addressed correlation data value 2360 to the correlation processor 2355. The presently addressed correlation address is also fed to the correlation processor as an index for the delay. The correlation processor provides a correlation data filter, peak detector, index register and output registers for the closest positive and negative correlation values near the zero crossing. At the completion of accessing a windowed block of data, beginning at the base address, base address counter is incremented by a correlation counter carry indication 2405. Typical windowed data blocks accessed by the correlation window counter are 8 or 16 elements. Digital comparator 2430 compares the final count value 2385 with the base counter value 2380. When terminal count is reached comparator output 2390 goes high and on the next final count of correlation window counter, and gate 2390 produces a reset signal 2400 to the control latch terminating the correlation filtering operation.

Figure 38:
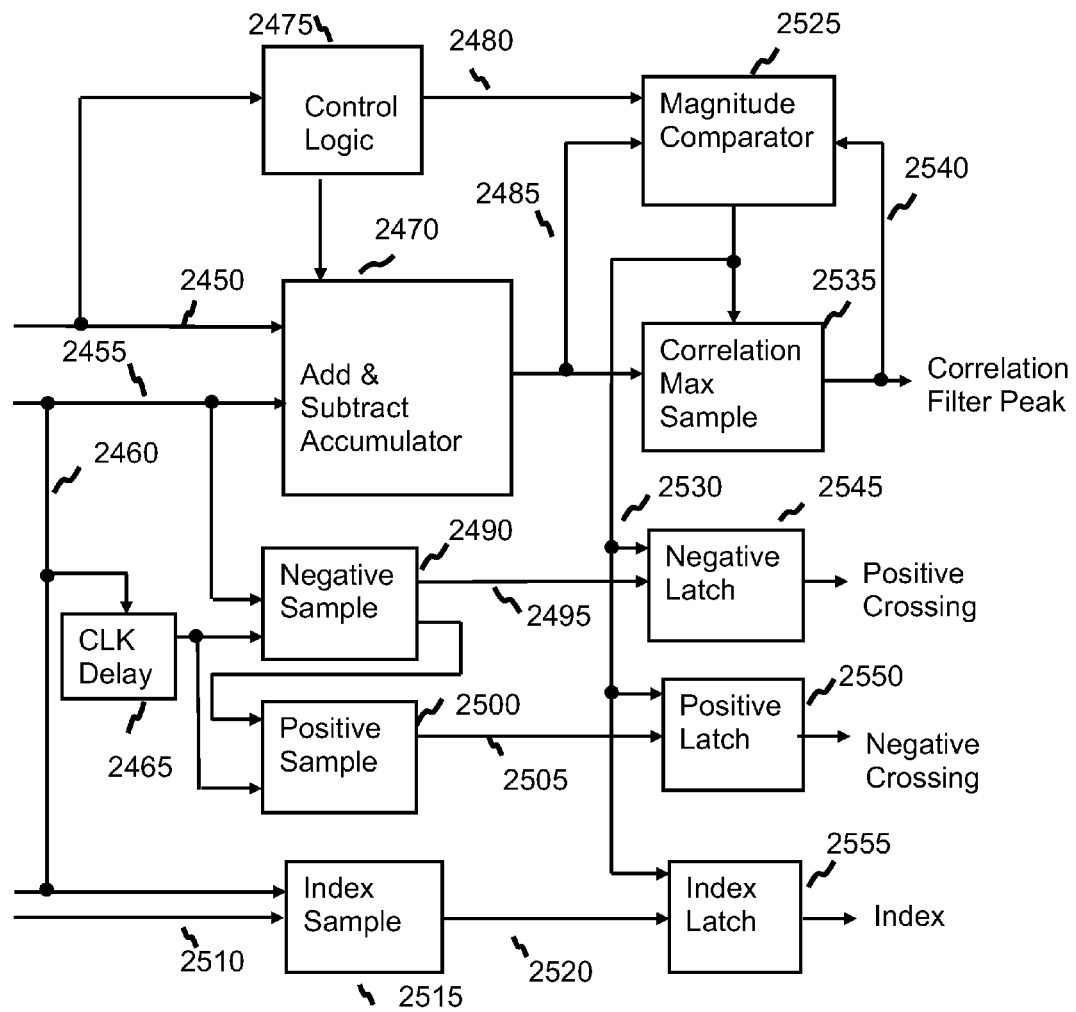
FIG. 38 details the functional elements of the correlation processor.

FIG. 38 details the functional elements of the correlation processor. Correlation output data 2455 from the correlation memory feeds addition and subtracting accumulator 2470, negative sample latch 2490. The output of the negative sample latch feeds positive sample latch 2500. The sign bit of correlation values 2460 passes to single clock delay 2465 and index sample latch 2515. A positive delayed correlation sign value enables the negative and positive sample latches. When the input correlation value swings negative, the negative sample latch remains enabled for one cycle allowing the latch to capture the first negative data value after the zero crossing. The positive sample latch, with correlation data delayed by one cycle by the negative latch, captures the last positive value before crossing zero. The index sample latch enabled by the correlation sign captures the index of the last positive sample. The addition and subtraction accumulator provides a matched filtering function sum for groups of data points out of the correlation memory. The number receive samples relative to the minimum pulse duration of the received signal waveform establishes the width of the central autocorrelation peak, and correspondingly the width the roughly equal duration high and low cycles of the correlation derivative. Synchronization signal 2450 or sync has total period roughly equal to the central correlative peak and it is synchronized to the windowed block of correlation data passed to the correlation processor for each data point. During the low cycle period of the sync the accumulation adds the incoming data and during its high cycle incoming correlation values are subtracted. On the high-to-low transition of sync, control logic 2475 enables the comparison between the previously stored peak value in the correlation maximum sample latch 2535 and the final accumulation value. This sync transition initiating the clearing of the accumulator value allowing a new accumulation to begin. If the new value is larger, magnitude comparator outputs an latch enable 2530 triggering the capture of the new maximum value, positive and negative samples in negative latch 2545 and positive latch 2550 and the sampled index value in index latch 2555. At the completion of the processing of a windowed portion of the correlation memory, the base address of the windowed section is incremented by one and the process repeats until the correlation data is evaluated.

Figure 39:
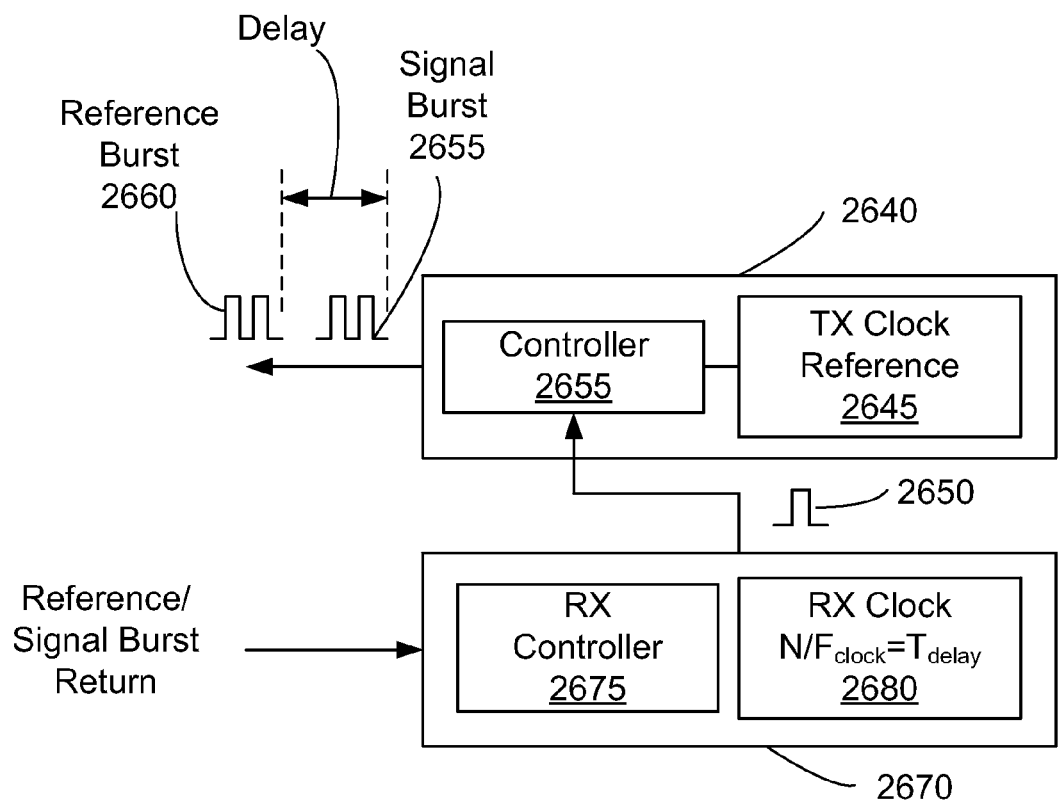
FIG. 39 is a block diagram of a transmitter and receiver operating from separate clocks to allow the separation the transmitter and receiver control circuits for noise sensitive applications.

FIG. 39 shows a block diagram of a transmitter and receiver operating off separate clocks to allow the separation the transmitter and receiver control circuits for noise sensitive applications. A transmitter 2640, operating off of transmit clock reference 2645, receives a trigger signal 2650 into controller 2655. The controller initiates the transmission of a reference burst 2660 which is followed after a fixed delay by the transmission of a signal burst 2665. The transmitted reference and signal patterns are padded with an extra transmitted data element to accommodate expected transmission bit-period of synchronization jitter between the transmitter and receiver. Upon triggering the transmitter, receiver 2670 initiates the acquisition and storing data in the reference and signal memories within the correlation processor. Receiver acquisition control 2675 provides a delay initiating the acquisition and storage of the reference and signal returns. Receiver clock 2680 frequency is selected such that an integer number delay timing cycles to provide the same delay as used in the transmission of the reference and signal waveforms as shown in waveform 2685. At the completion of the reference and signal acquisitions, correlation processing is initiated with accumulation with previous acquisitions and storage in the correlation memory.

Figure 40:
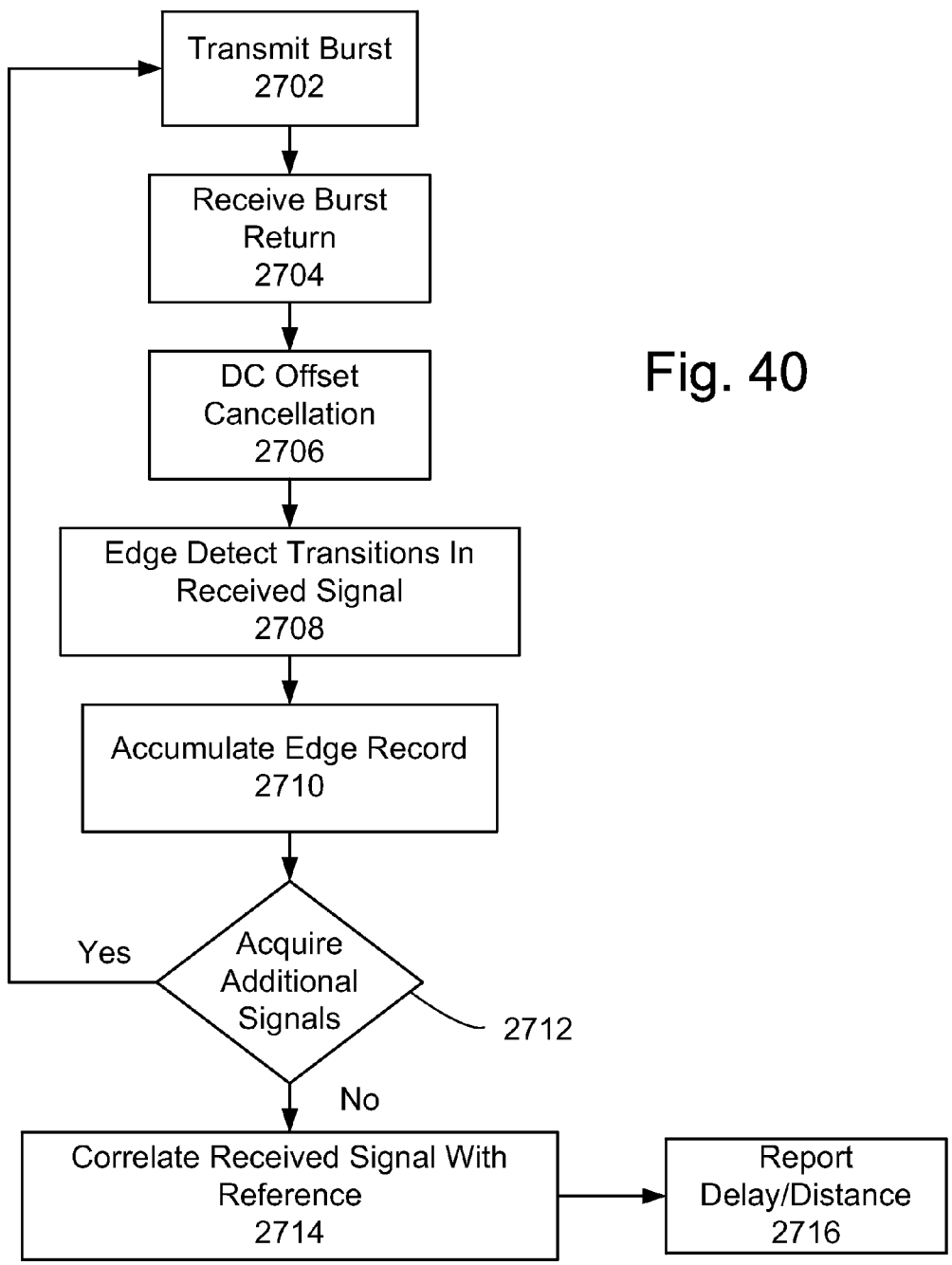
FIG. 40 is a block diagram of a representative method of obtaining range estimates.

FIG. 40 illustrates a representative method of range estimation. At 2702, an optical burst is transmitted toward a target and at 2704 a portion of the optical burst returned from the target is received and detected. The transmitted burst is generally selected based on one or more codes have suitable correlation properties, such as Barker codes. At 2706, DC offset is cancelled, generally by applying a different between high frequency and low frequency filtered portions of the detected optical signal. DC cancellation or compensation is generally applied by directing the detected optical signal through high pass and low pass filters to respective comparator inputs. Signal edges are detected at 2708 by determining differences between temporally adjacent signal amplitudes. Edge records are accumulated in a memory at 2710. A number of signal acquisitions is evaluated at 2710, and additional signals can be acquired based on additional bursts at 2702. If no additional signal records are needed, at 2714 the accumulated edge records are correlated with a reference at 2714 and one or more ranges can be output at 2716 based on the correlation. The reference can be obtained based on an additional optical signal, retrieved from a memory, or based on a time varying electrical signal.

Figure 41:
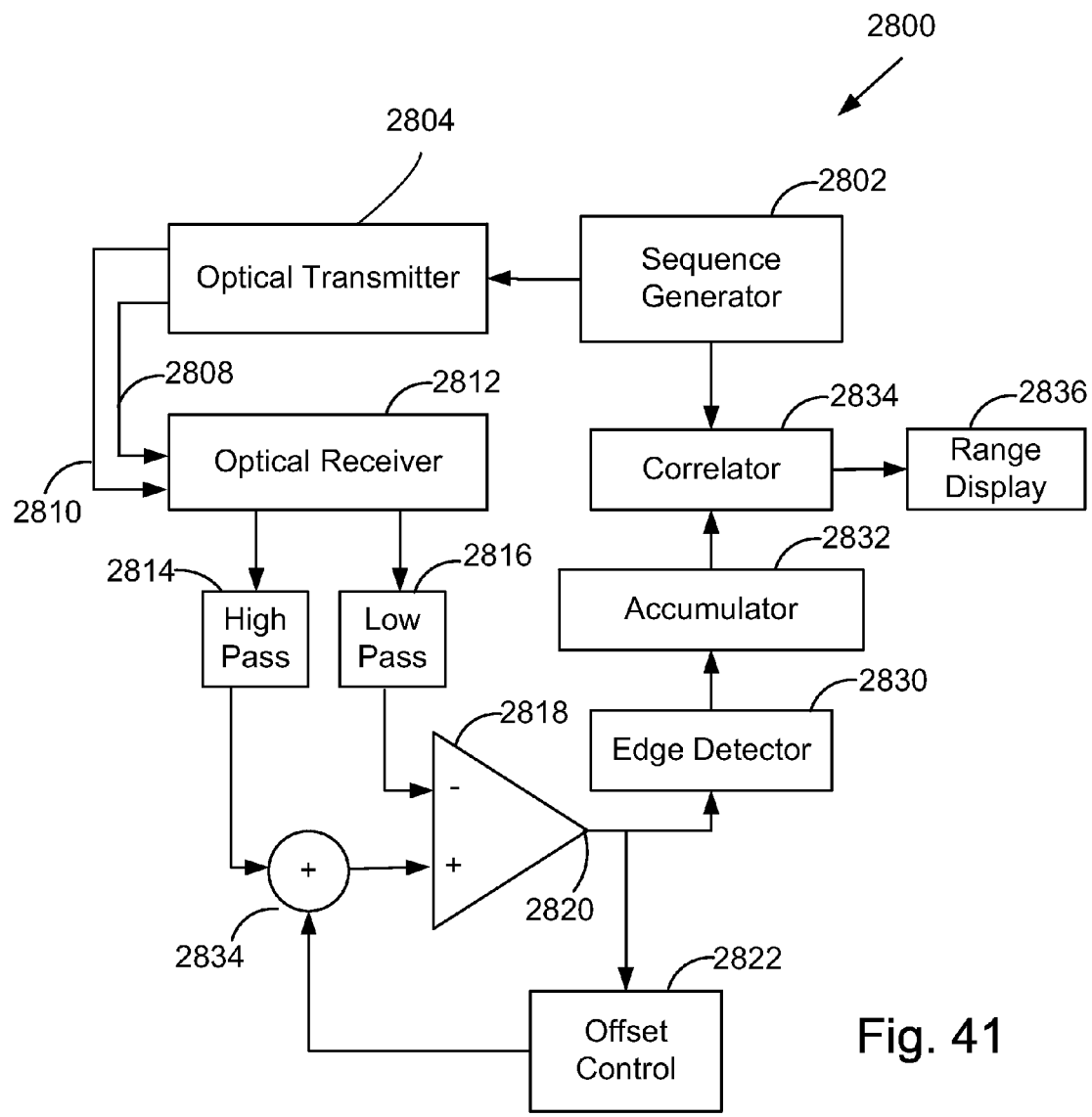
FIG. 41 illustrates a representative optical rangefinder.

A representative optical range finder 2800 is illustrated in FIG. 41. A sequence generator 2802 is coupled to an optical transmitter 2804 that produces one or more optical output bursts that are directed along a reference path 2808 and an object path 2810. Typically, the reference path is internal to the rangefinder 2800 and the object path 2810 is associated with a distance to be estimated. In some examples, the reference path can be omitted, and an electrical reference can be provided. Optical beams from the reference path 2808 and the object path 2810 are coupled to an optical receiver 2812 that provides an associated electrical signal to a high pass filter 2814 and a low pass filter 2816. Respective filter outputs are coupled to a comparator 2818. A comparator output 2820 is coupled to an offset controller 2822 that is summed the high pass filter output at a summing node 2834 and coupled a comparator input 2817. The offset controller 2822, the high pass filter 2814, and the low pass filter 2816 are configured to provide DC offset control during a received burst. DC offset control effectively establishes a bipolar signal based on unipolar optical intensity signals. The comparator output signal is provided to an edge detector 2830 that is configured to determine signal transitions (edges) based on signal amplitudes as a function of time, and the edge detected signals are provided to an accumulator 2832 that produces a signal record of edge transitions based on one or more edge detected signals. A correlator 2834 receives the accumulated signal and provides a range estimate to a range display 2836. The correlator 2834 can determine range based on an autocorrelation of the accumulated signal or a correlation of the accumulated signal with a reference obtained directly from the sequence generator 2802. The various components of the range finder 2800 are illustrated as hardware components in FIG. 41, but one or more of these components can implemented based on computer executable instructions executing on a processor. Thus, components can be provided in hardware, software, or combinations thereof.

Figure 42:
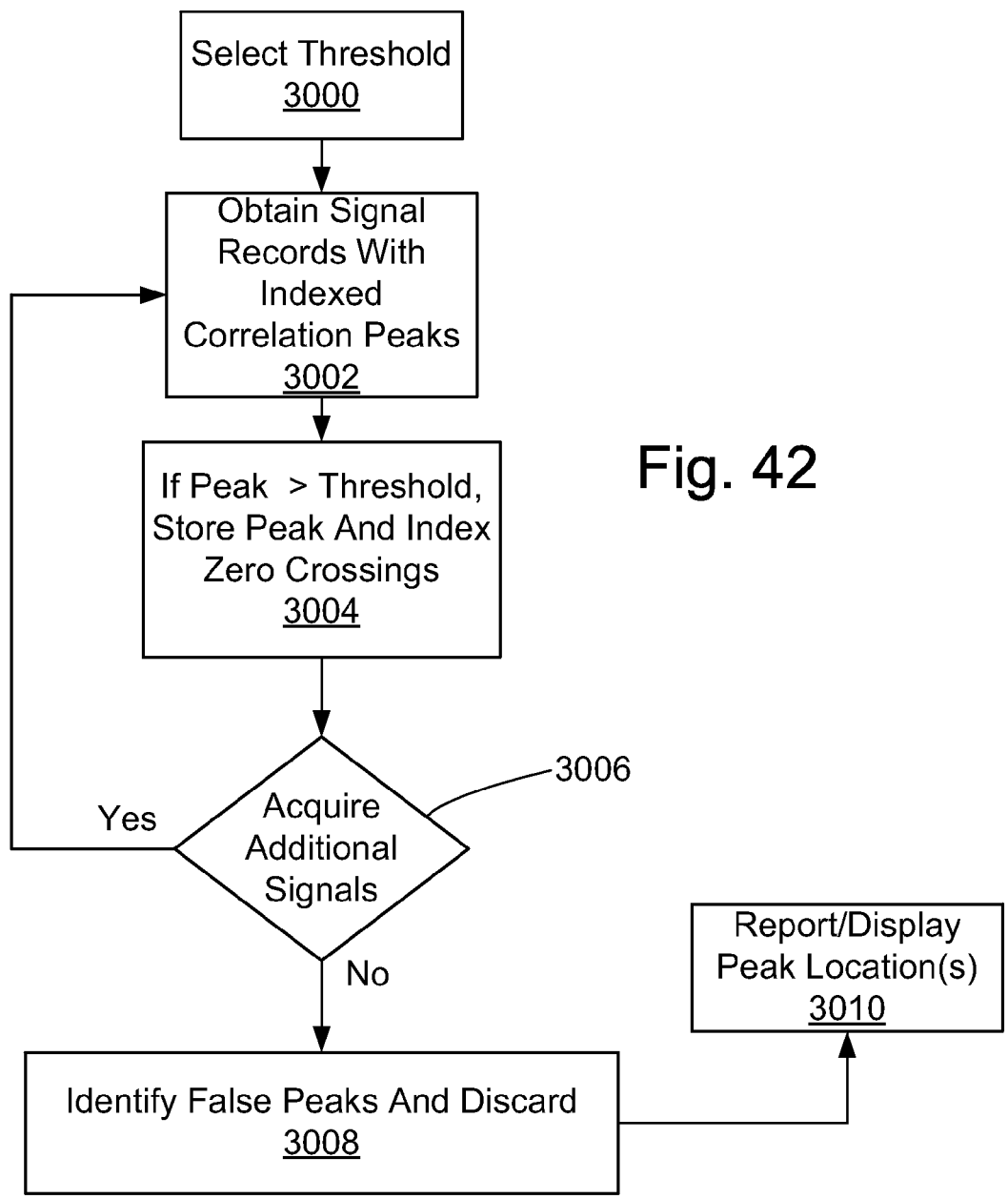
FIG. 42 is a block diagram of a representative method of identifying false correlation peaks.

It is often desirable to locate multiple peaks within a correlation record. Multiple signal return echoes may be present due to passing though transparent interfaces or due to inadvertent reflections caused by rain, snow or other transient obstructions. Multiple peaks may also be encountered when operating at very low signal-to-noise ratios and with long correlation records resulting in a high false detection probability. As shown in FIG. 42, a detection threshold can be established at 3000 and used to reduce the number of suitable detection peaks based on the known statistical behavior of peak-to-peak excursions of the correlation waveform. At 3002, a signal record that includes indexed correlation peaks is obtained. At 3004, peak amplitudes are compared with the threshold, and peaks greater than the threshold and their associated zero crossings and indices are stored. For example, correlation peaks and associated crossing and index information can be latched into a storage via first-in, first-out buffer or FIFO when a correlation peak drops below the detection threshold. Operation can continue with the correlation peak value reset and data stored over a series of above threshold peak detections. At 3006, a determination of whether additional signal records are to be processed is made. If so, an additional signal record is obtained at 3002 and processed as described above. If no additional records are to be obtained, at 3010 false correlation peaks are identified and at 3012 one or more peak locations can be displayed. In some examples, after the accumulation of series of peak data sets, one or more of the closest, farthest or strongest correlation peak may be selected. False peaks can be identified based as, for example, peaks that are not at the same distance in different correlation signals. In one approach, valid echoes can be associated with peaks that appear in numerous signal records at a common distance.

Figure 43:
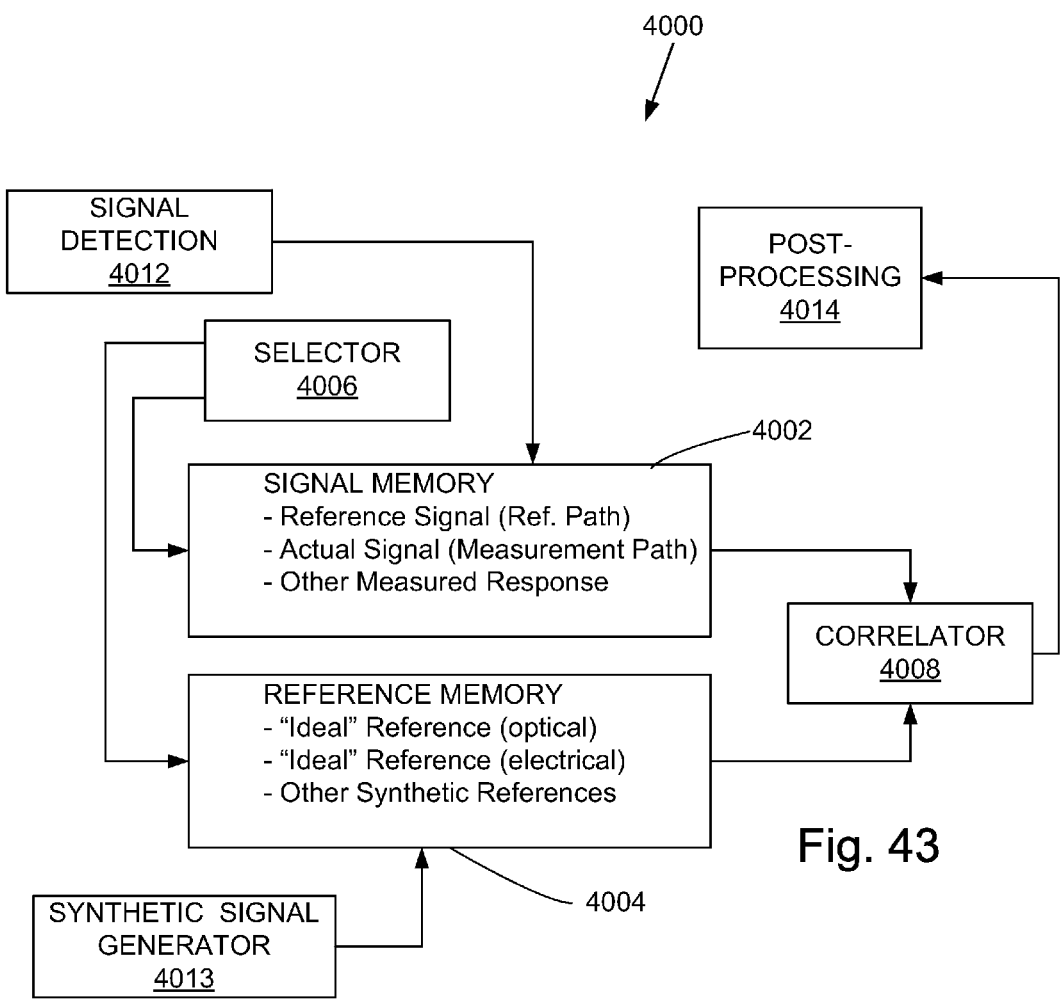
FIG. 43 is a block diagram of a representative correlation system that includes signal memory and reference memory.

Referring to FIG. 43, a representative correlation system 4000 includes a signal memory 4002 and a reference memory 4004 that are configured to provide signal records to a correlator 4008. A signal detection system 4012 is configured to produce signals associated with optical reflections from one or more objects whose range is to be estimated. In some cases, then signal detection system 4012 is also configured to produce electrical signals associated with propagation of optical or electrical signals along a reference path. The signal memory 4002 is generally configured to store one or more signal records associated with transmission and detection of an electrical or optical signal along a reference electrical or optical path. In addition, the signal memory 4002 can be configured to retain measured signals associated with optical power returned from one or more objects in a space to be measured. The reference memory 4004 is configured to retain one or more signal records associated with so-called "ideal signals" or model signals that can correspond to estimates or predictions of return signal levels. Such ideal signals can be associated with optical or electrical signals, and the reference memory 4004 can be configured to store a variety of such signals. A synthetic or model signal generator 4013 can be configured to produce such signals and couple the signals to the reference memory 4004. A selector 4006 is coupled to the signal memory 4002 and the reference memory 4004 to select which signals are to be provided to the correlator 4008. Typically, at least one signal from each is coupled to the correlator 4008. The correlator output is coupled to a post-processor 4014 that can produce a range display or other range associated output.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implement in a single hardware or software module, or separate modules can be provided. The particular arrangements above are provided for convenient illustration, and other arrangements can be used. For example, in some disclosed examples signals are described as normalized within a range of 0 to 1. In other examples, signal normalization can be used to restrict signal values to any convenient numerical range.

In view of the many possible embodiments to which the principles of the disclosure may be applied, it should be recognized that the illustrated embodiments are examples only and should not be taken as a limitation on the scope of the invention. For instance, various components of systems described herein may be combined in function and use. I claim as my invention all subject matter that comes within the scope and spirit of these claims. Alternatives specifically addressed in these sections are merely exemplary and do not constitute all possible alternatives to the embodiments described herein.

I claim:

1. A range finding device, comprising a receiver that includes:
    a detector configured to convert a received optical signal from an object into an analog signal;
    an analog filter configured to apply a dc offset associated with the received analog signal over the duration of a received signal burst;
    a zero-crossing detector configured to convert the received signal into binary logic states at successive sample points;
    a correlator configured to compare a stored transmit code sequence with one or more stored edge detected signal records to produce a derivative of a delayed correlation function; and
    a delay estimator configured to estimate a delay based on a zero-crossing point of the delayed correlation function.

2. The device according to claim 1, further comprising a transmitter configured to emit and direct one or more code sequence modulated optical bursts into at least one transmission channel to the object so as to produce the received optical signal.

3. The device according to claim 2, wherein said code modulated optical burst is a binary convolution sequence concatenated with a second binary code so as to define a code sequence with a 50% average duty cycle.

4. A device according to claim 3, wherein said second binary code is a two-slot pulse position code.

5. The device according to claim 2, wherein said transmitter comprises:
    a differential driver configured to alternately activate one or more pairs of series and shut switches; and a series switch and a shut switch;
    an optical source with a negative terminal connected to the series switch and a positive terminal connected to a shunt switch; and
    a voltage controlled current limiting element connected to the positive terminal of the optical source and shunt switch.

6. The device according to claim 1, wherein said correlator uses a transmit code sequence derived from a received signal stored using a transmission channel providing a zero delay reference signal from the transmitter.

7. A device according to claim 6, wherein said zero delay reference signal is provided by a dedicated optical transmitter with an enable signal.

8. The device according to claim 1, wherein said analog filter is configured to provide:
    dc restoration so as to attenuate a received signal offset in the filter output prior to signal acquisition,
    high-pass and low-pass filtering with roughly equal time constants, and
    subtraction of high and low pass filter outputs.

9. The device according to claim 8, wherein the dc restoration is based on the output duty cycle of the zero-crossing detector the zero crossing detector comprising:
    a duty cycle detector;
    a processor configured to generate an offset signal based on the measured and previous history of duty cycle measurements; and
    a digital to analog converter providing a offset correction value.

10. The device according to claim 9, wherein the differential inputs of an analog comparator are coupled to produce a difference of the high-pass and low-pass function outputs.

11. The device according to claim 10, wherein the clocked sampling network comprises at least two delay line outputs with associated commonly clocked latches.

12. The device according to claim 10, wherein the clocked sampling network comprises at least two poly-phase clocked latches sharing a common input with phase shifting latches to bring the latch outputs into a common clock domain.

13. The device according to claim 1, wherein said zero-crossing detector comprises an analog comparator and a clocked sampler.

14. The device according to claim 1, wherein said correlator is configured to detect a signal edge based on a difference of positive or negative edge transitions at sample points associated with successive pairs of previous and present logic states of the zero-crossing detector, and further comprising:
   a memory configured to store a record of received signal states, a record of the transmitter code sequence, and the correlation output; and
   a multiplier and accumulator configured to generate data points associated with a delayed correlation function.

15. The device according to claim 14, wherein said correlator is configured to accumulate multiple edge detector records resulting from the transmission of more than one modulated optical burst.

16. The device according to claim 15, wherein said multiplier and accumulator comprise two parallel multipliers coupled to two successive elements stored within single addresses of the reference and signal memories with two associated accumulators each of which is configured to add half the partial products associated with a data point of the delayed correlation function.

17. The device according to claim 14, wherein said correlator is configured to store a sum of a present correlation and an accumulation of previous correlation data points.

18. The device according to claim 14, wherein said multiplier and accumulator comprise a single multiplier coupled to an output of the reference signal memories with a single accumulator to add partial products associated with a data point of the delayed correlation function.

19. The device according to claim 14, wherein said multiplier and accumulator comprises:
   an n-by-n array of multiplier cells configured to produce the partial products associated with n successive correlation data points, wherein n is an integer greater than or equal to two; and
   n summing elements to add the partial products associated with a correlation data points.

20. The device according to claim 19, wherein the said multiplier cells have two or more bits of resolution to multiply a signed reference value and a signed signal edge state.

21. The device according to claim 20, wherein said edge detectors and multiplier cells comprise at least one state decoder.

22. A range finder, comprising:
   a transmitter configured to emit one or more code sequence modulated optical bursts towards an object; and
   a receiver as recited in claim 1 situated to receive an optical signal based on an interaction of the one or more modulated optical bursts with the object and produce a range estimate.

* * * * *